J. BRICKEN.
ELECTROCALCULOGRAPH.
APPLICATION FILED AUG. 29, 1911.
1,157,079.
Patented Oct. 19, 1915.
28 SHEETS—SHEET 13.
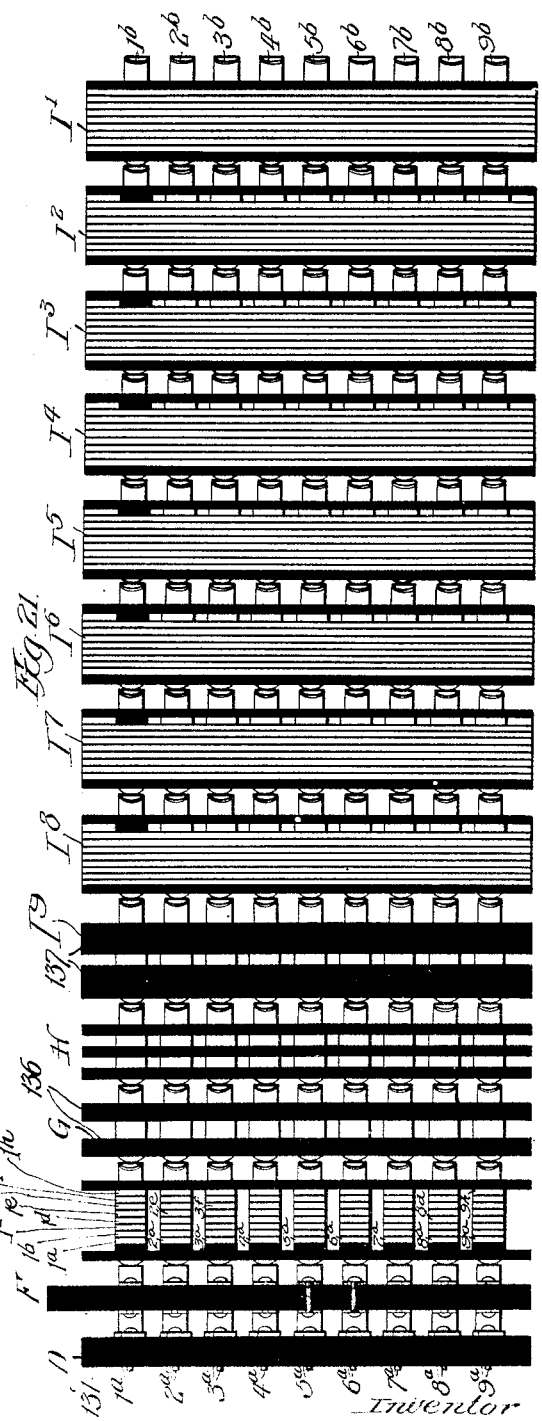

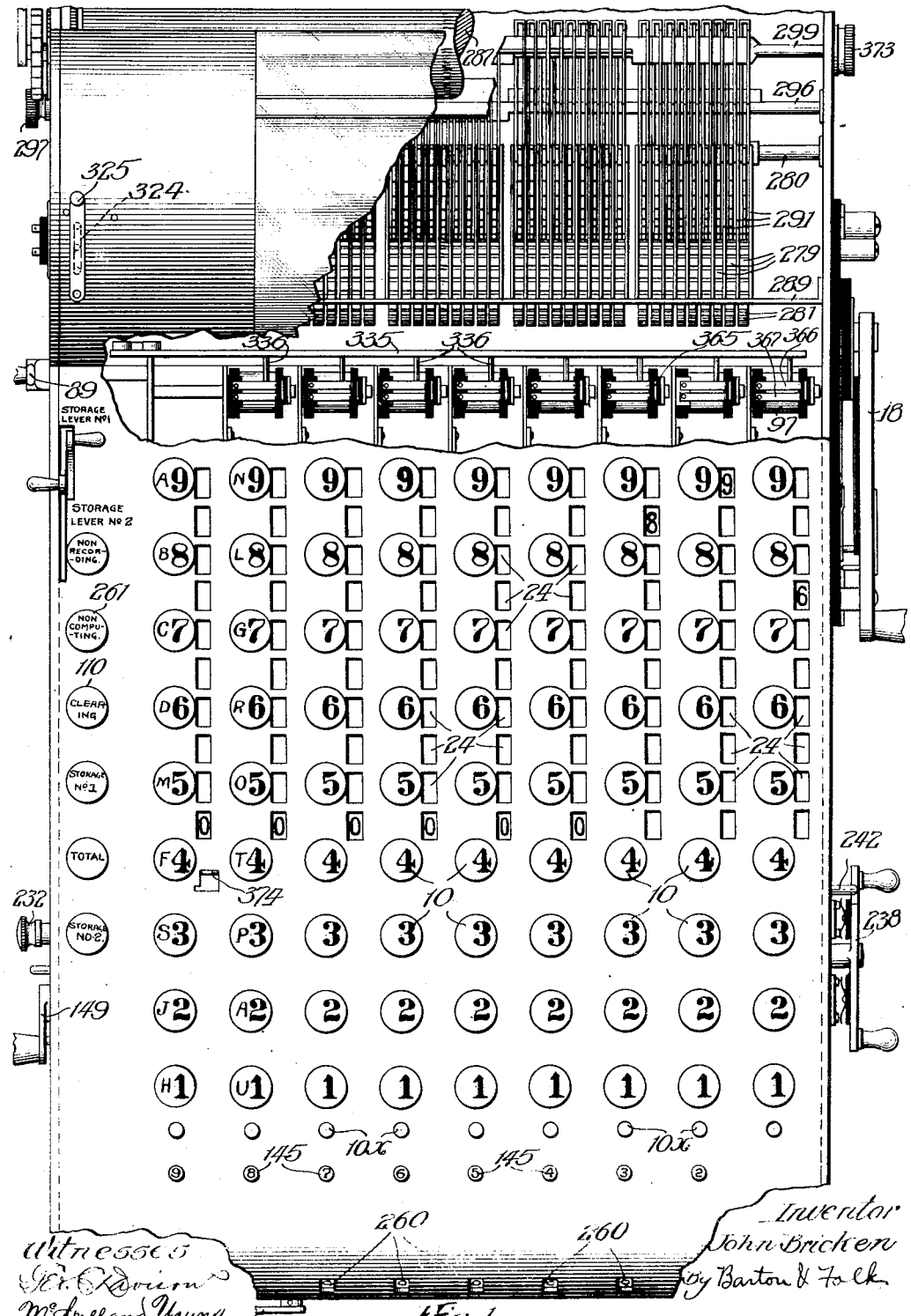

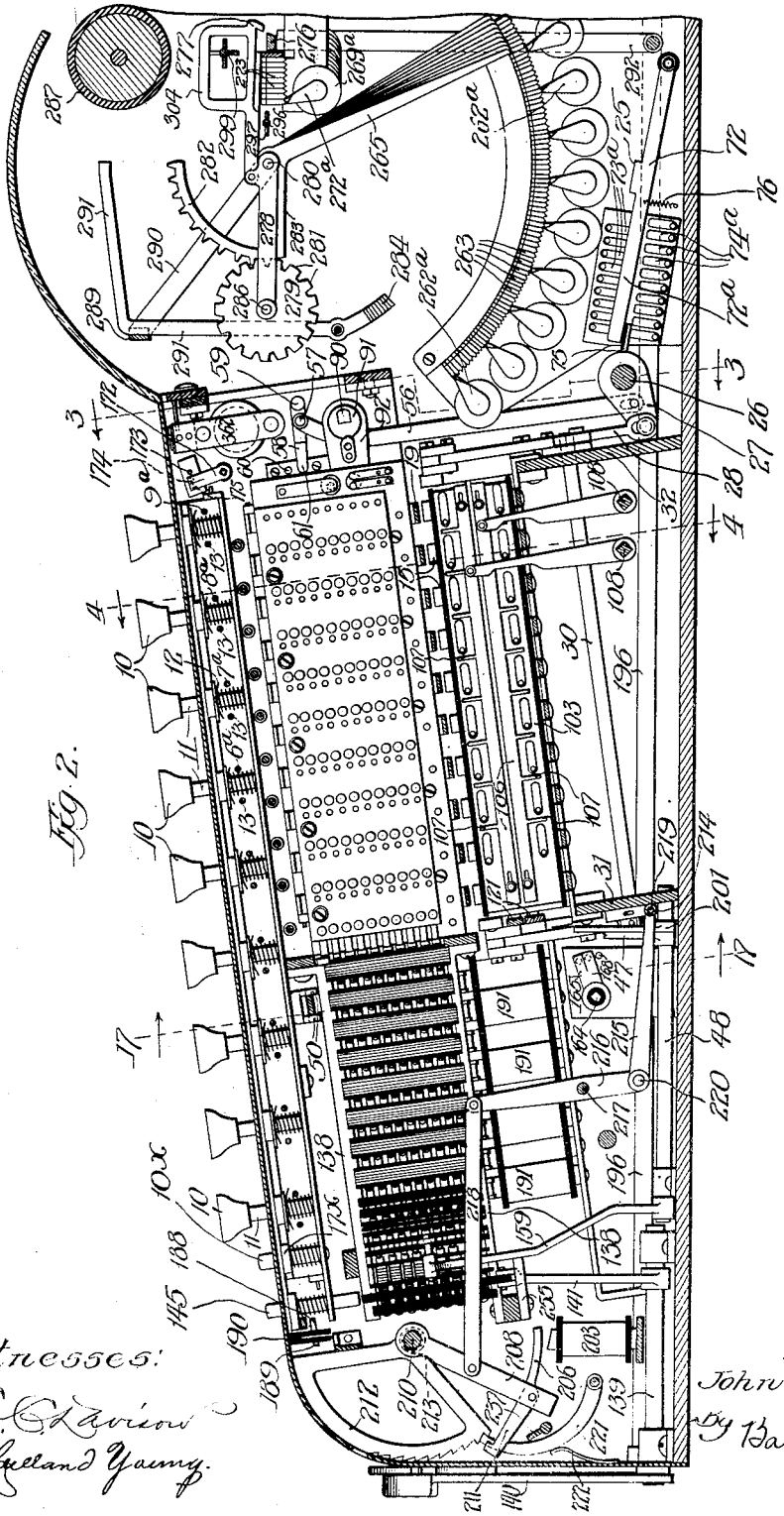

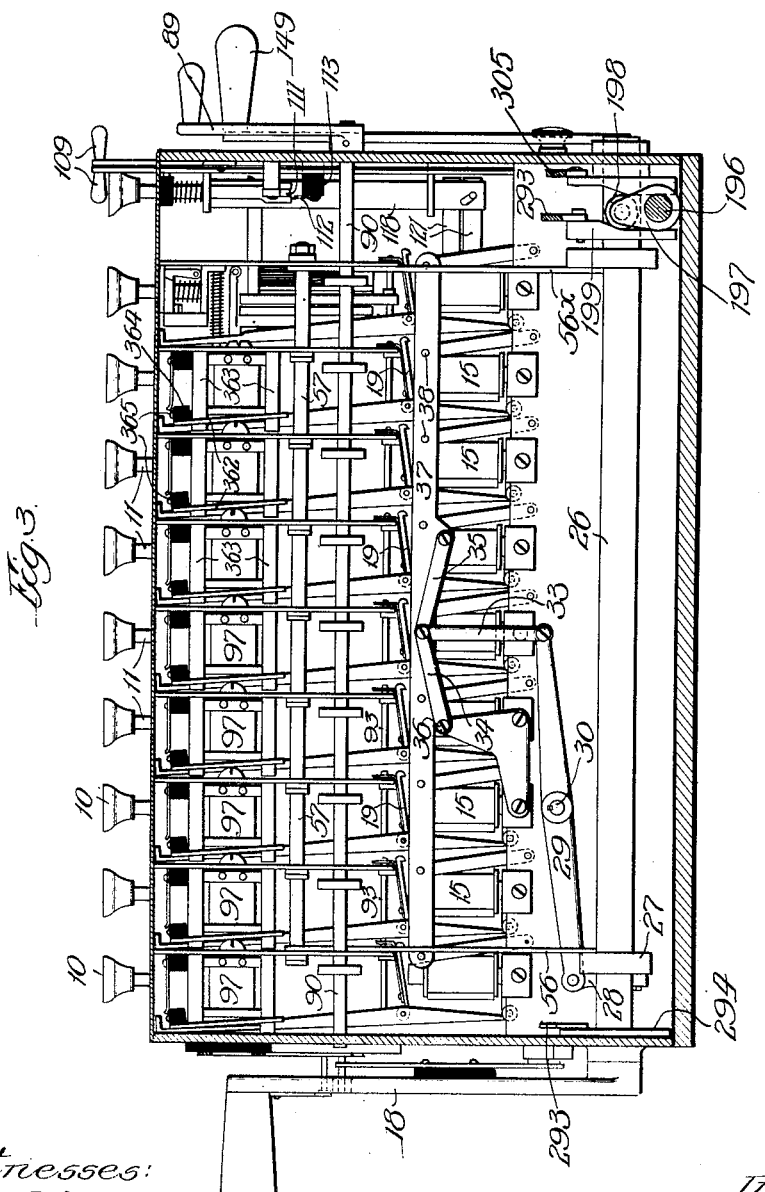

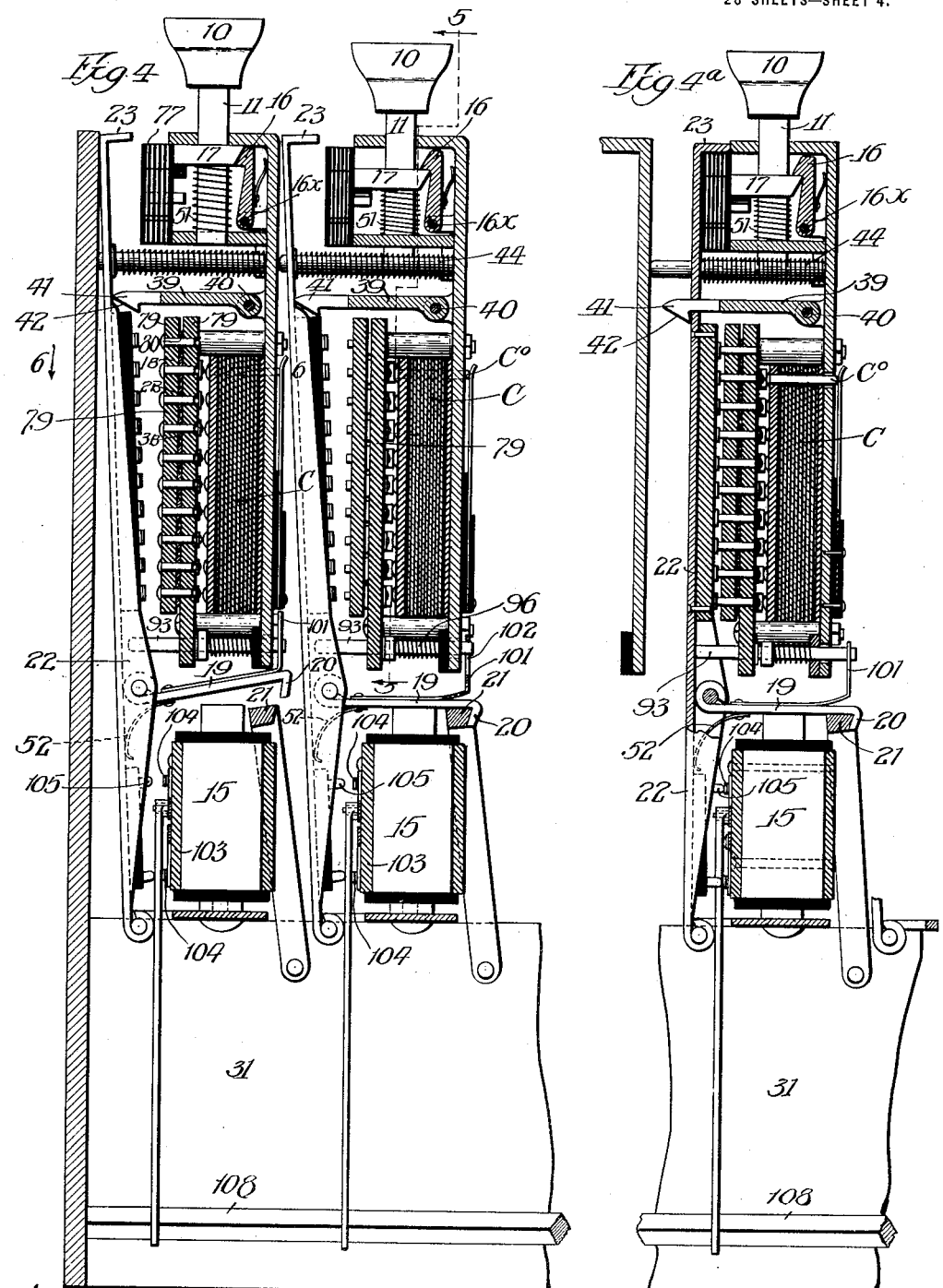

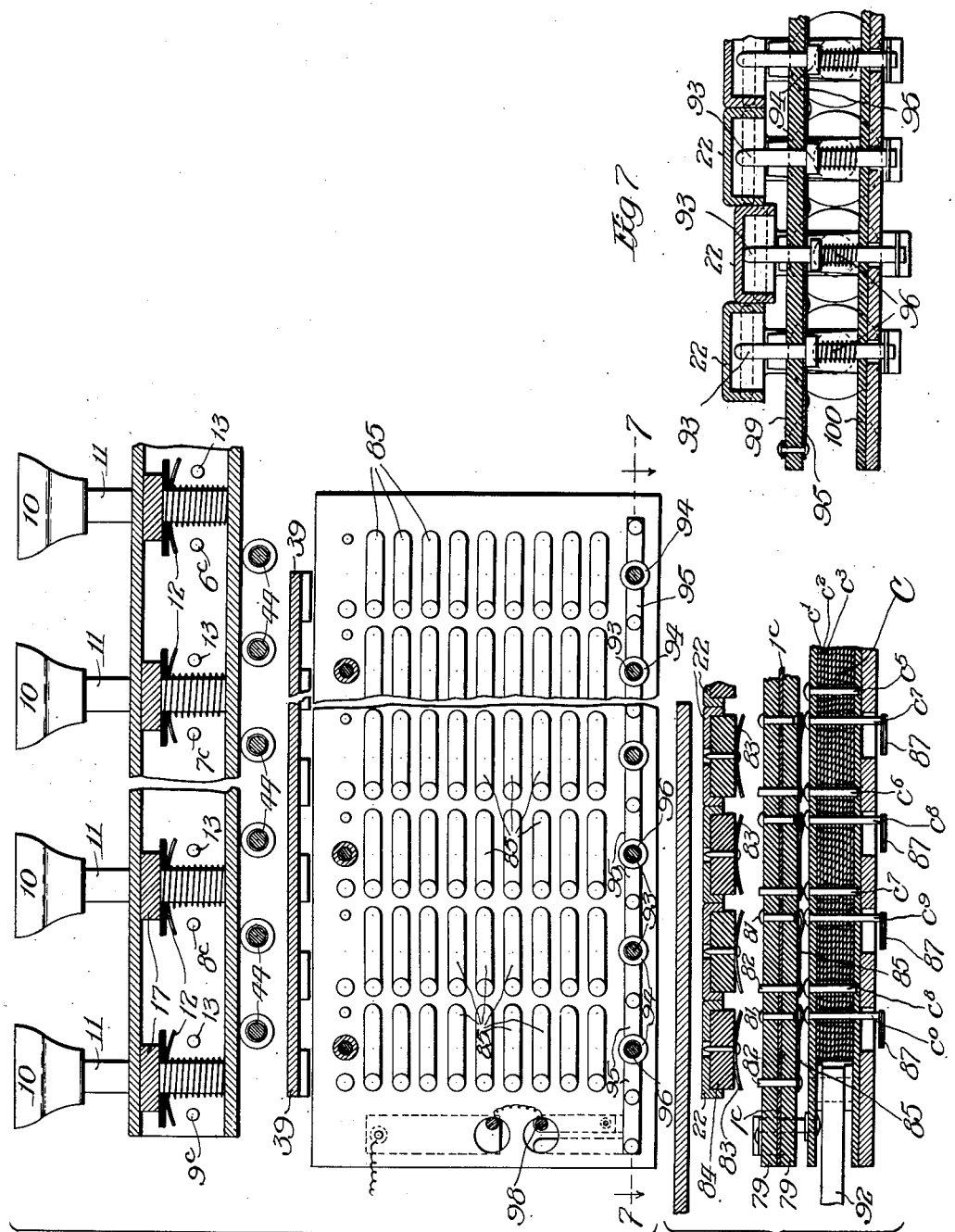

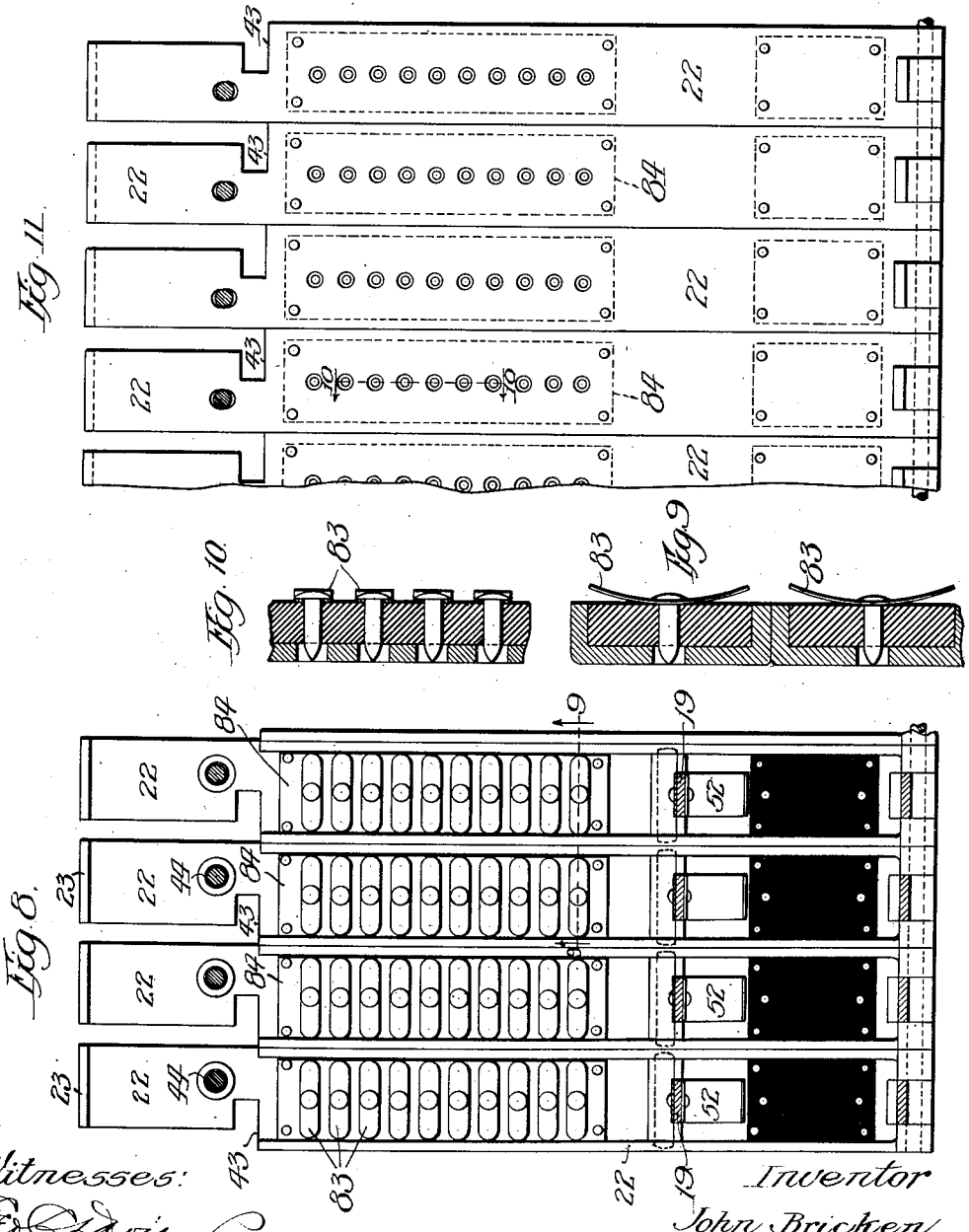

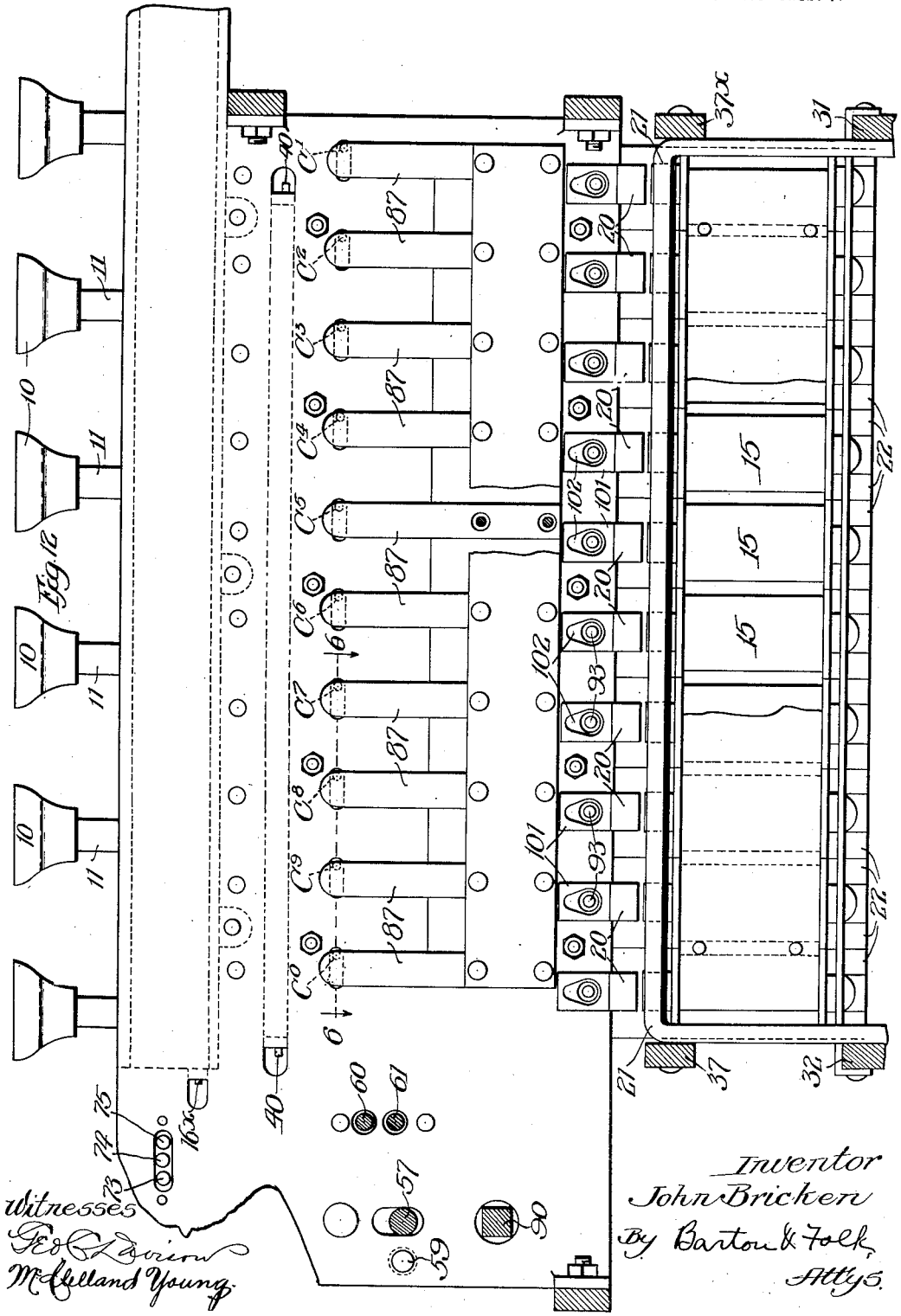

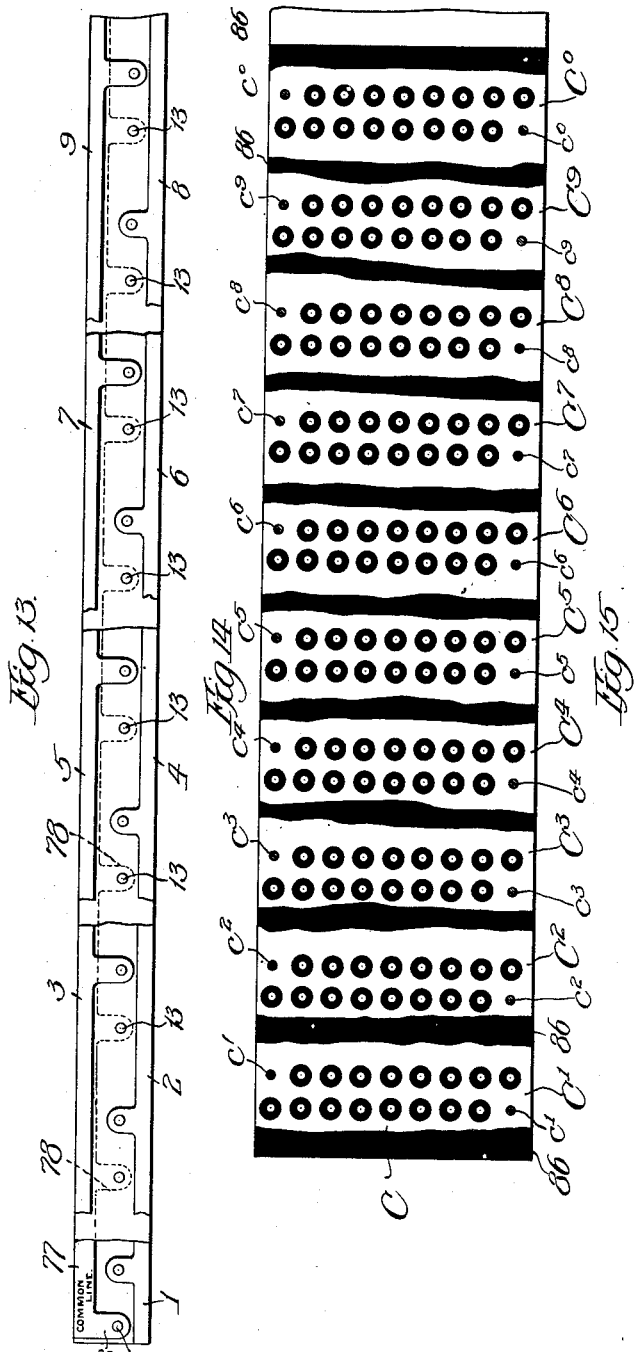

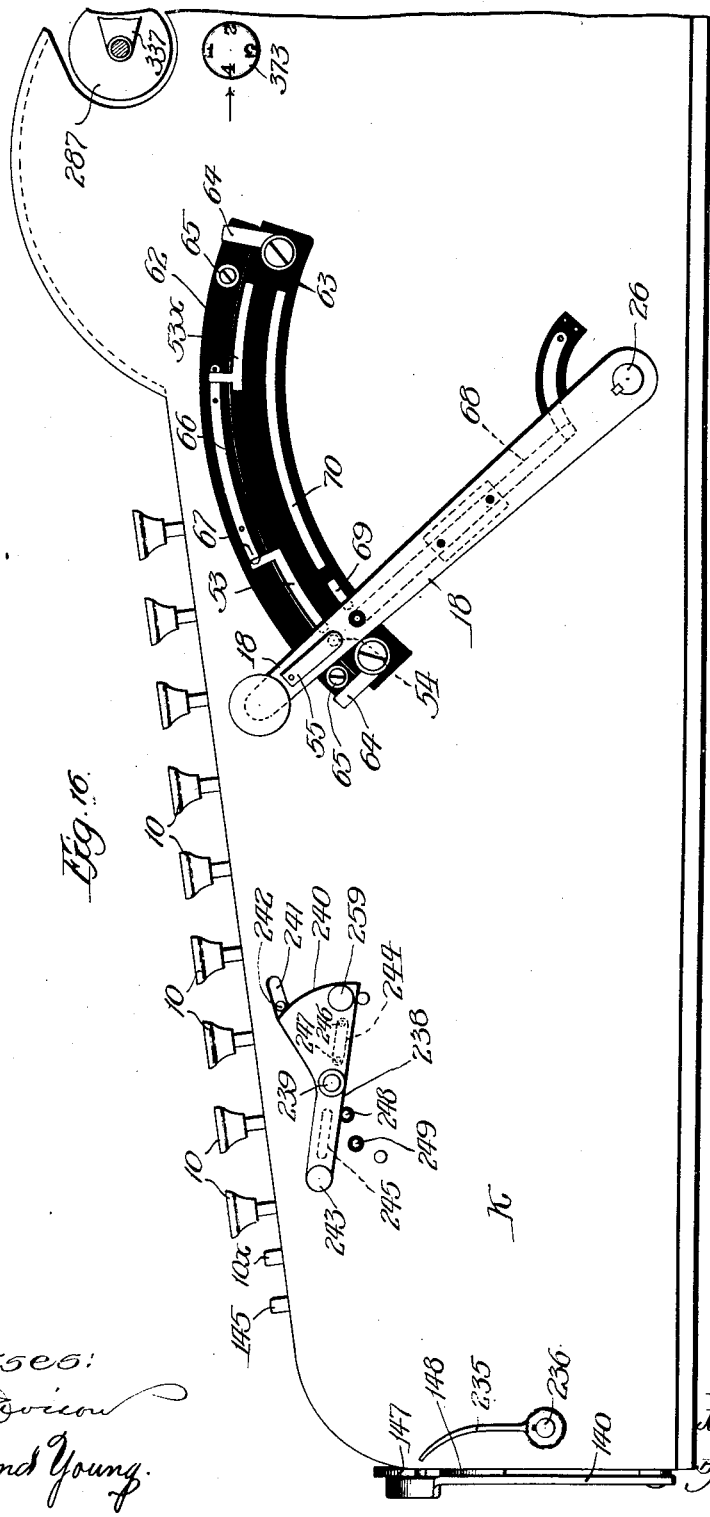

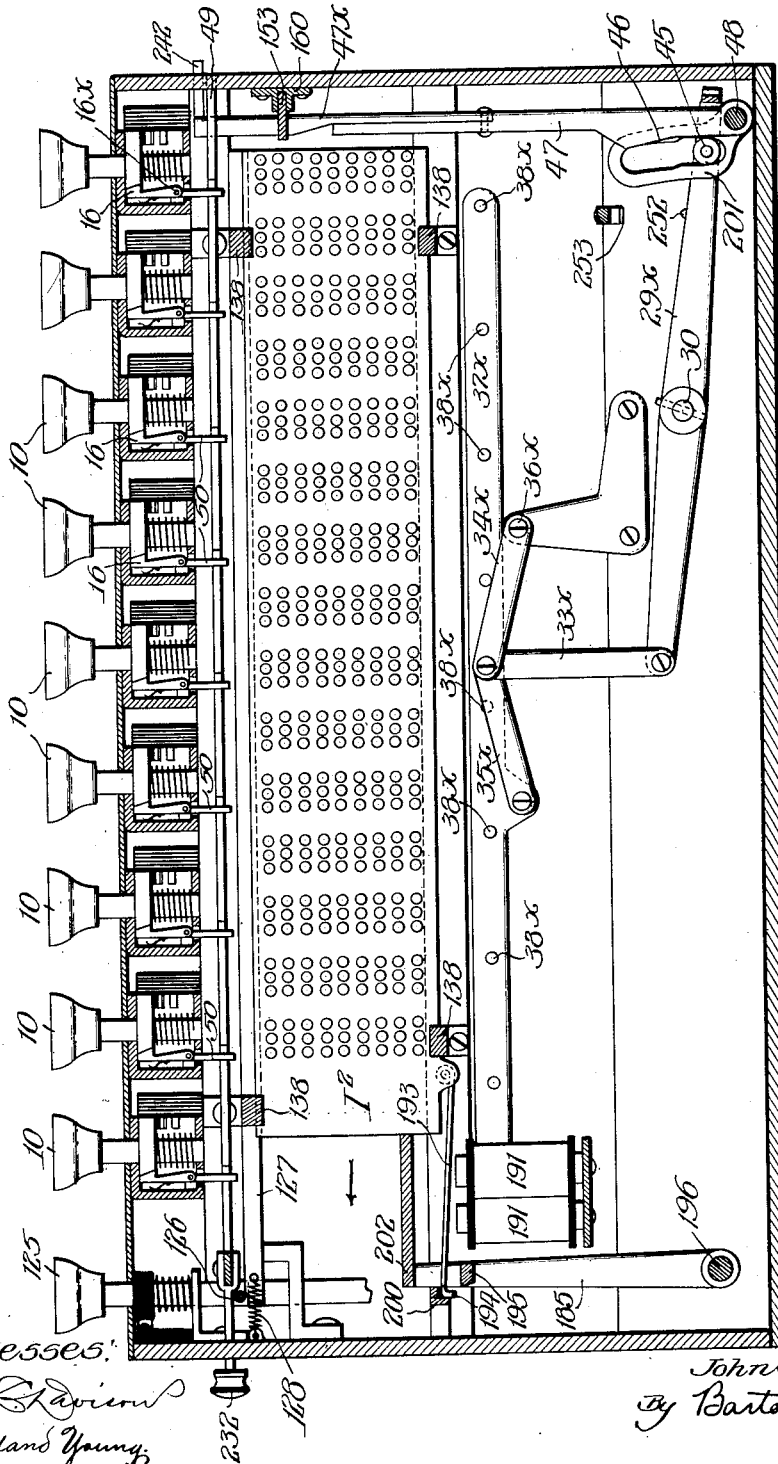

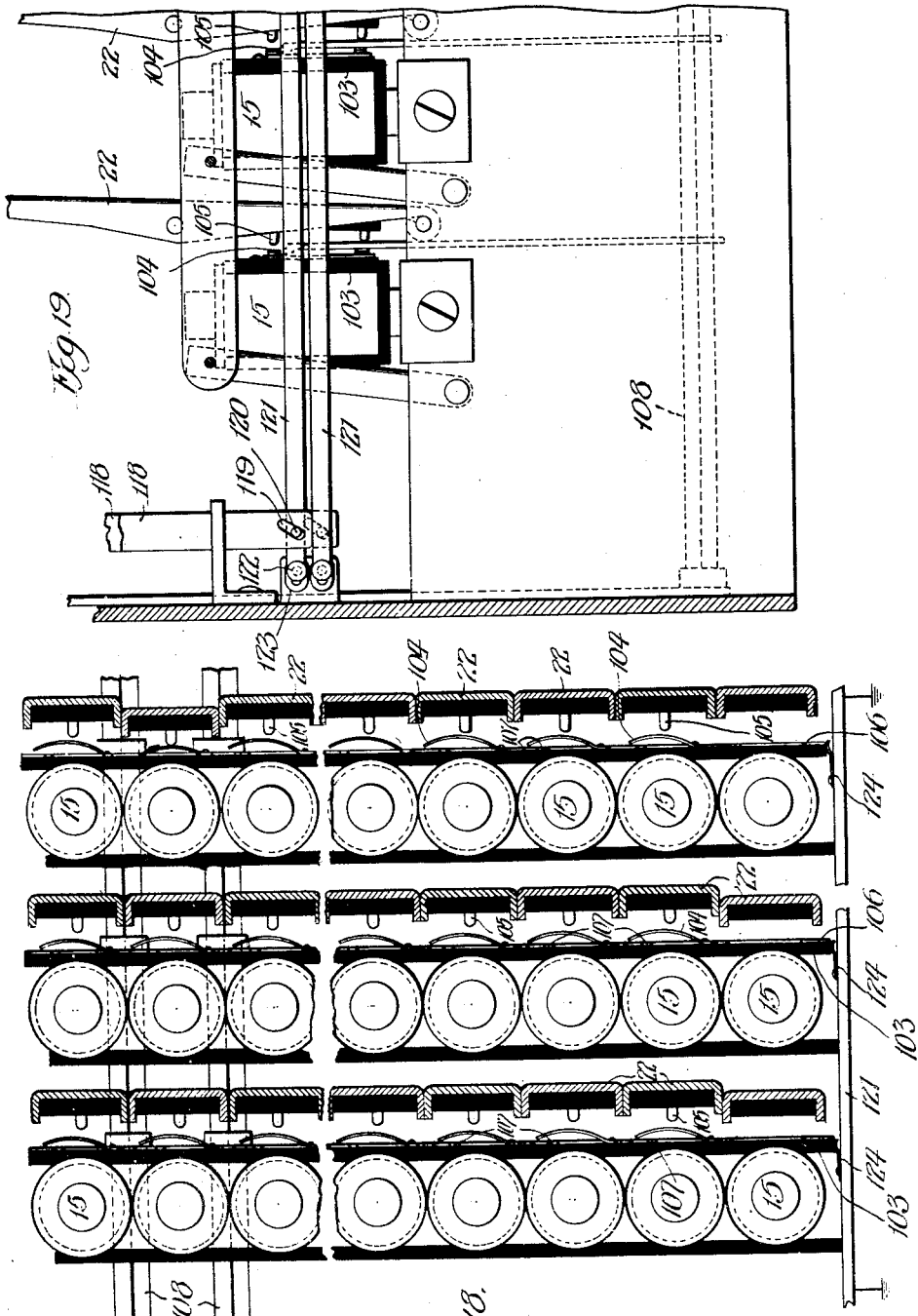

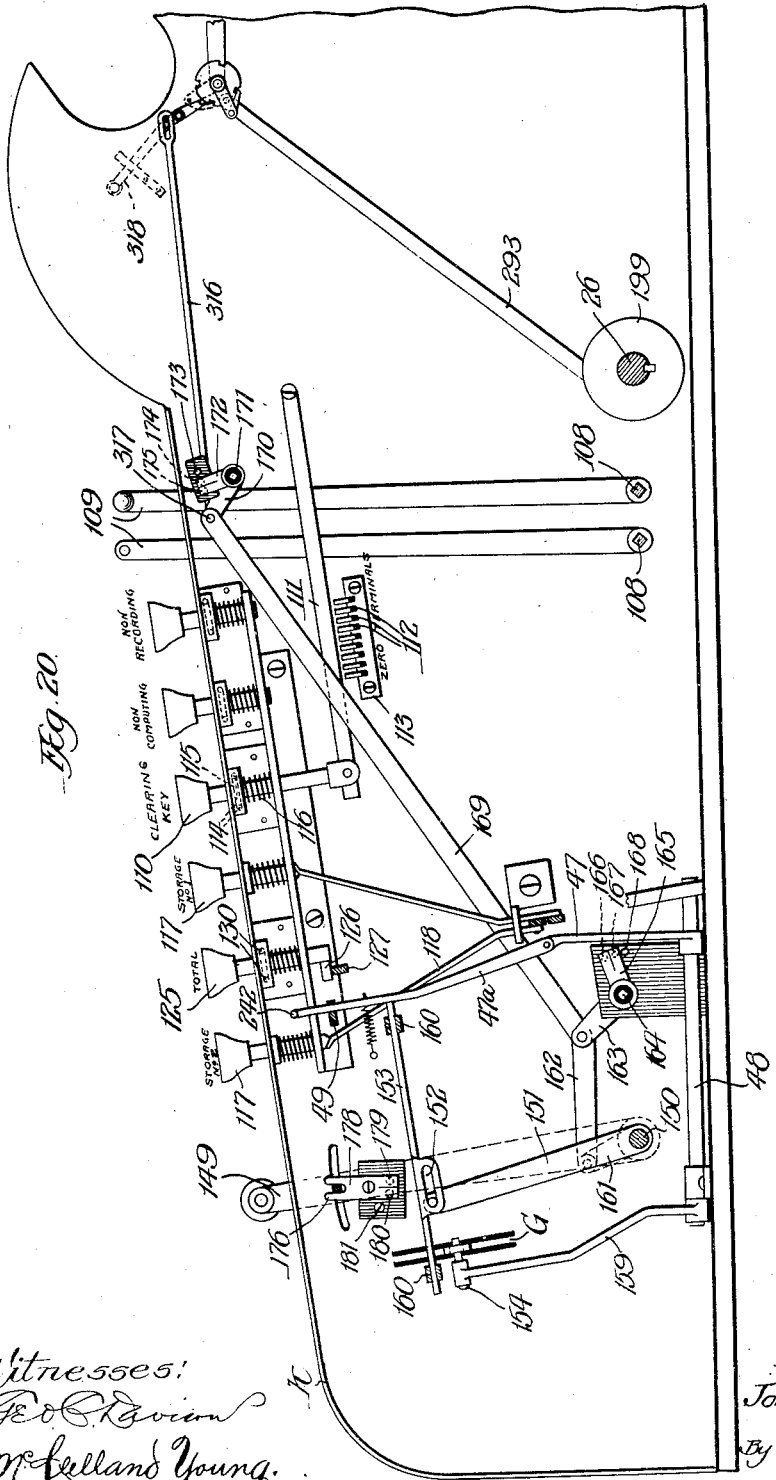

J. BRICKEN.
ELECTROCALCULOGRAPH.
APPLICATION FILED AUG. 29, 1911.
1,157,079.
Patented Oct. 19, 1915.
28 SHEETS—SHEET 14.
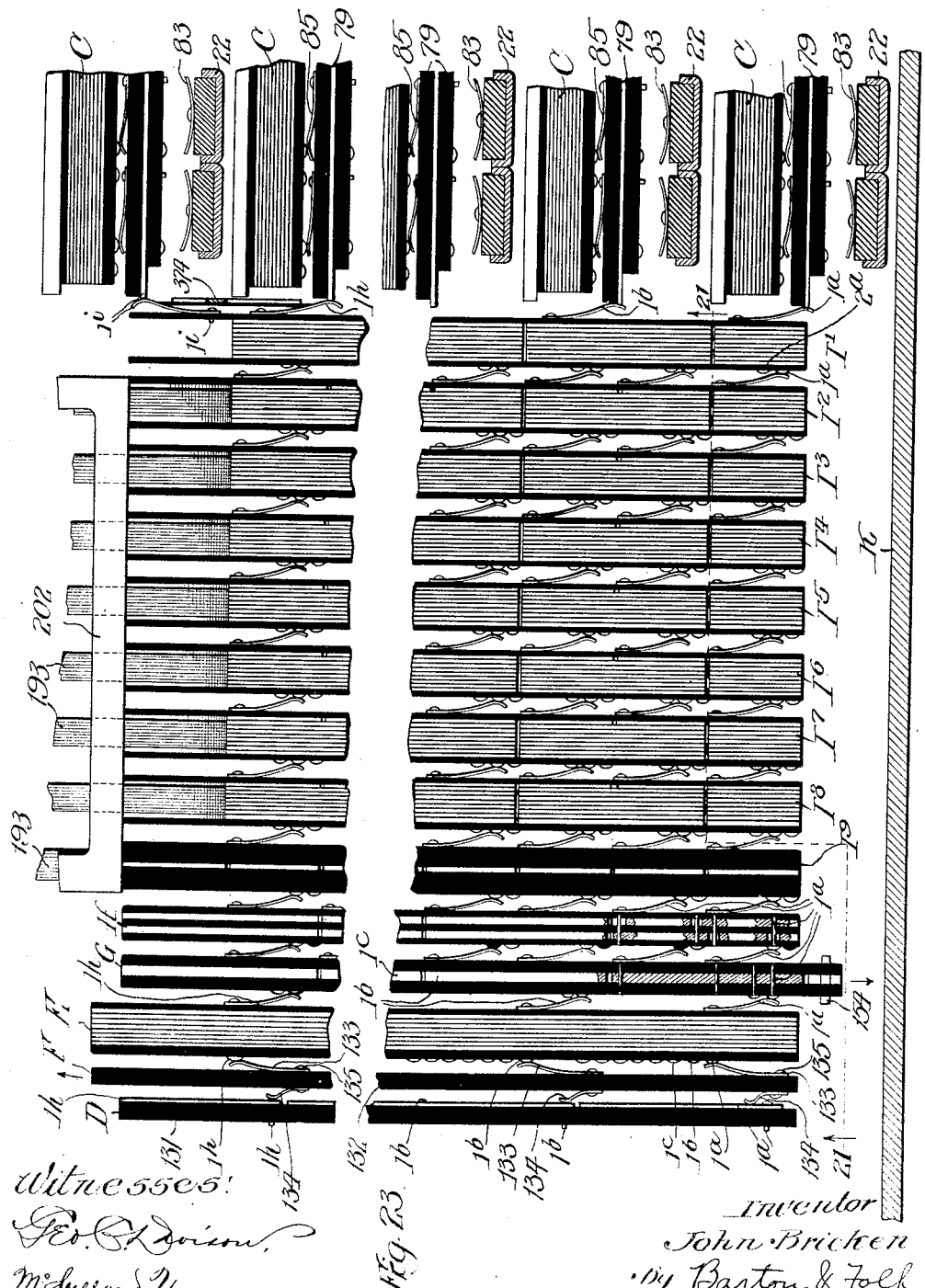

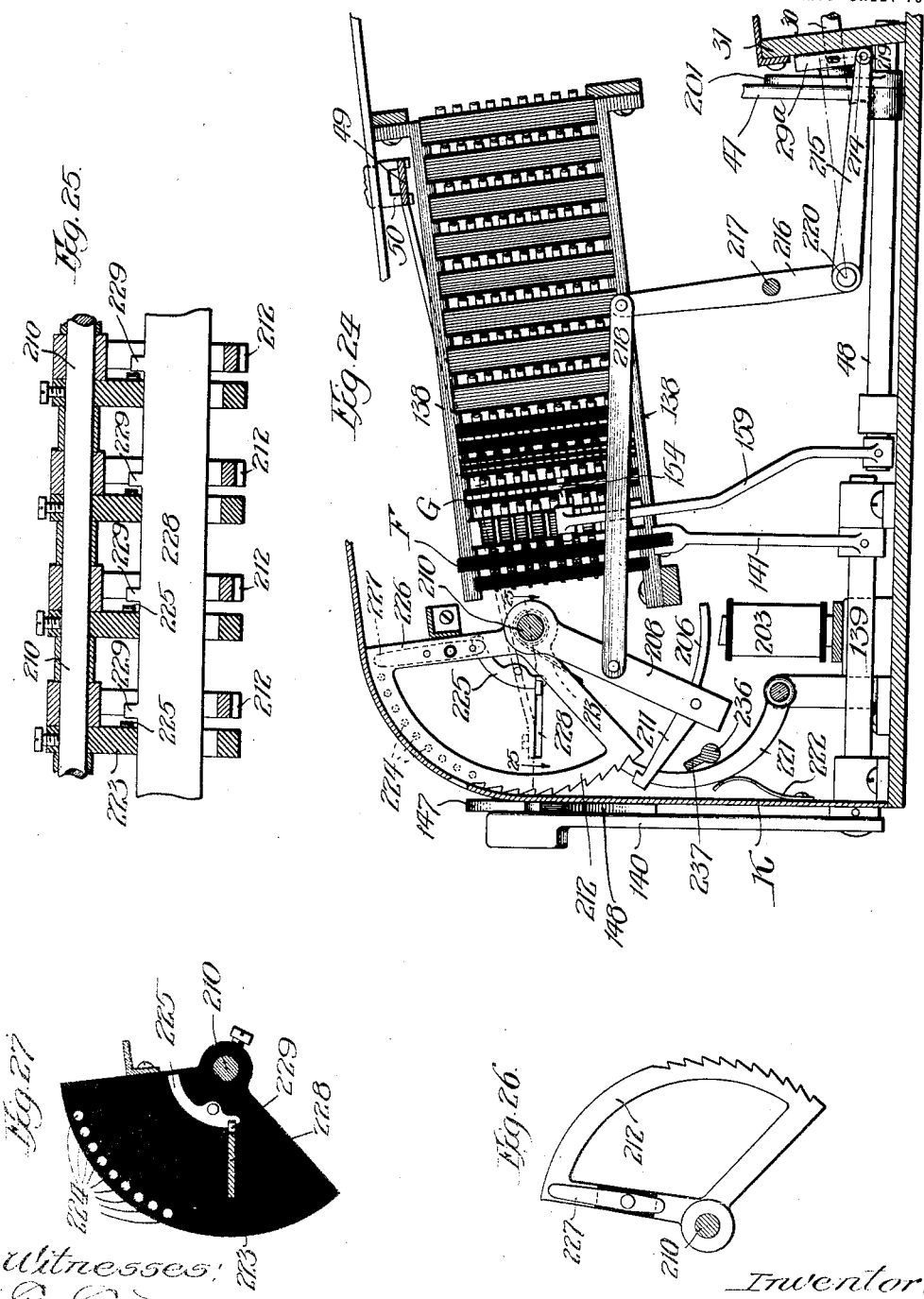

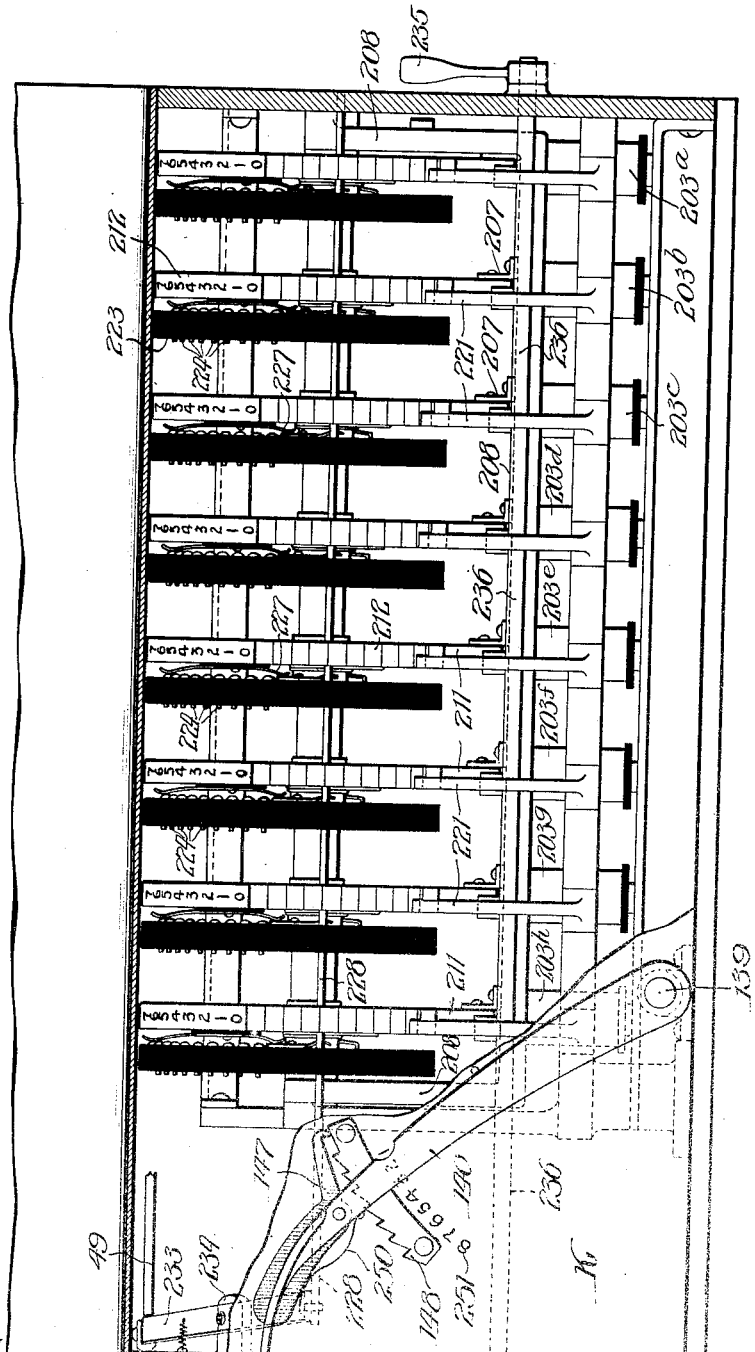

J. BRICKEN.
ELECTROCALCULOGRAPH.
APPLICATION FILED AUG. 29, 1911.
1,157,079.
Patented Oct. 19, 1915.
28 SHEETS—SHEET 17.
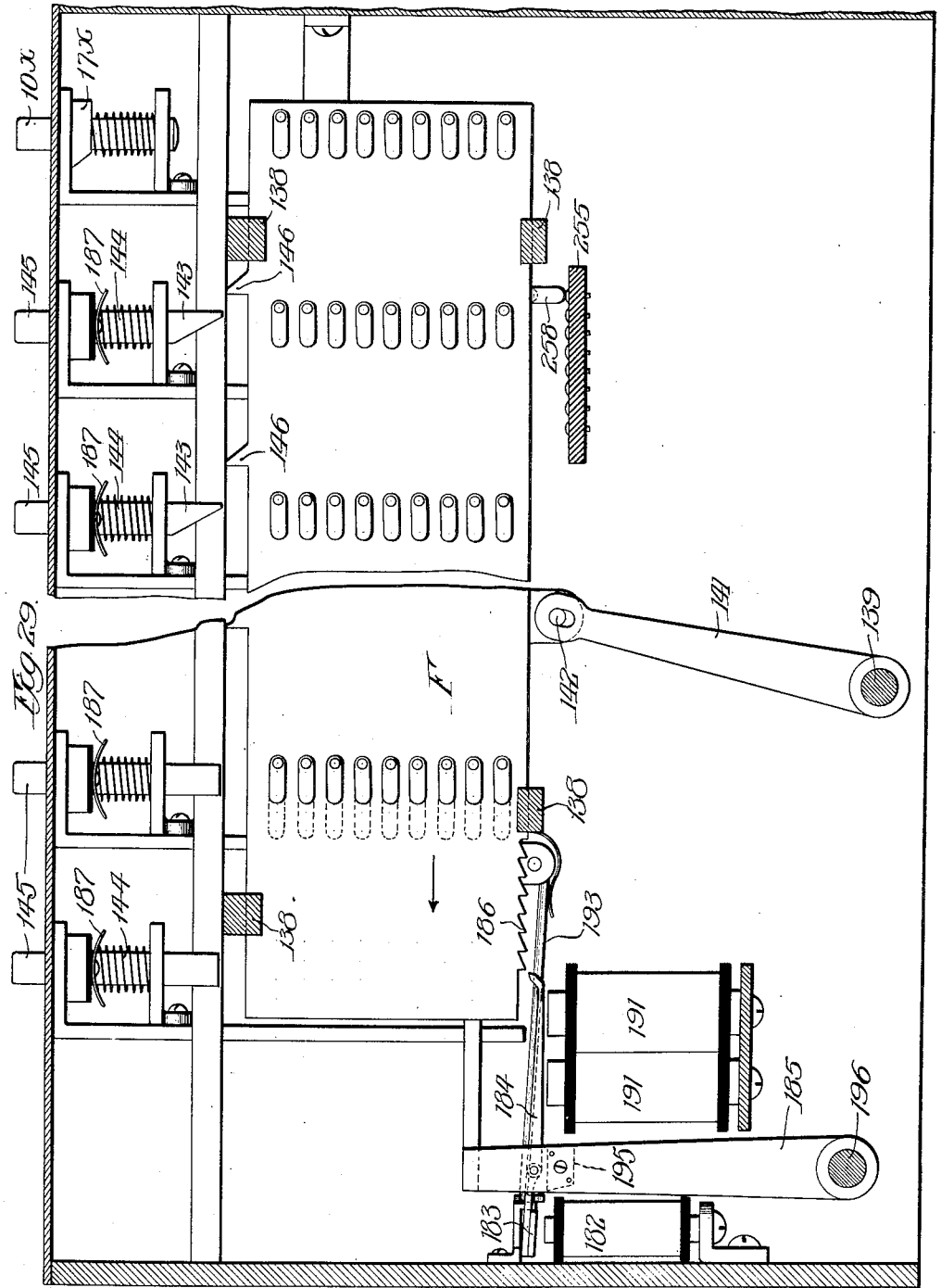
Witnesses:
Geo. E. Davison
McClelland Young
Inventor:
John Bricken,
By Barton & Folk,
Att'ys.

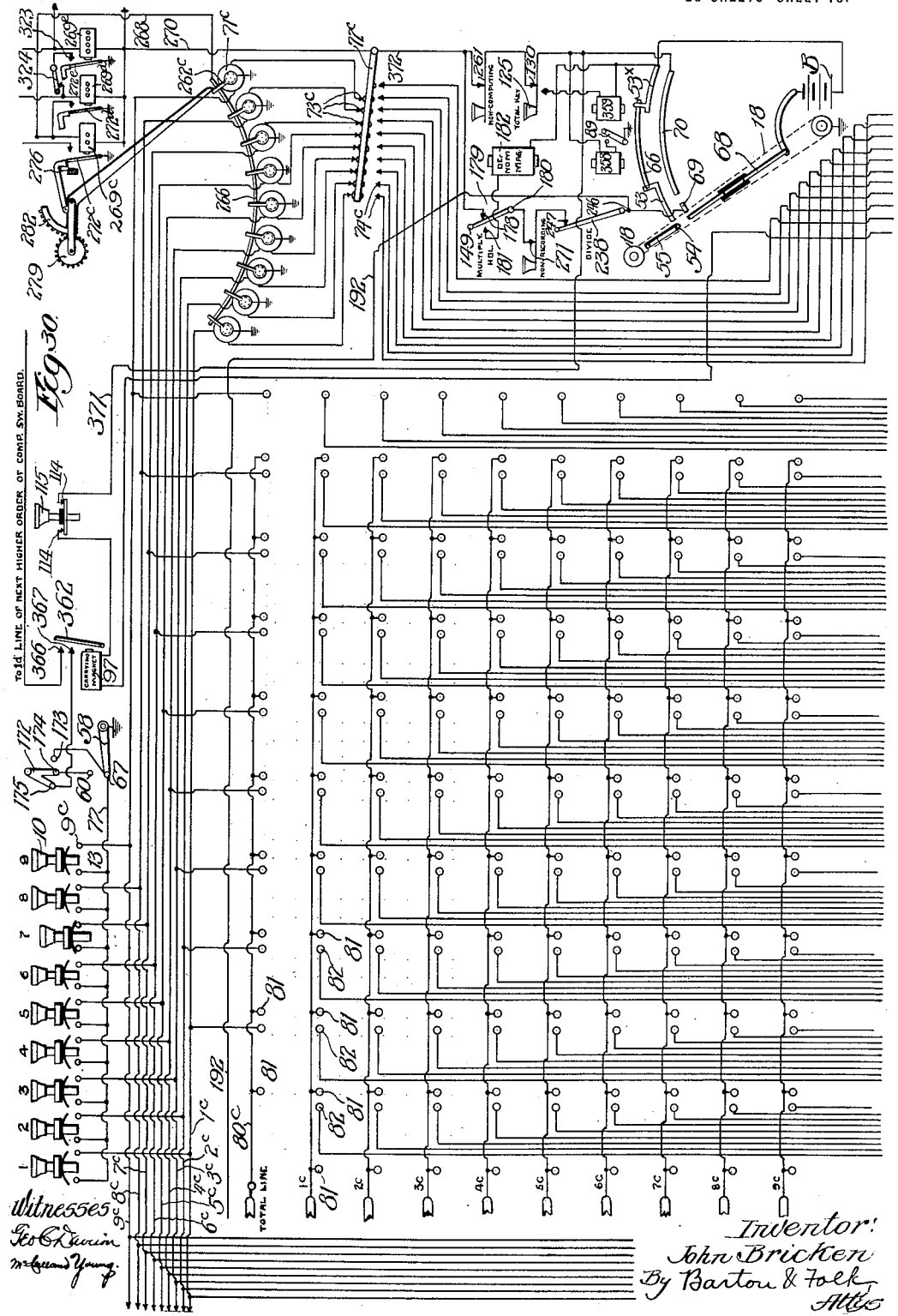

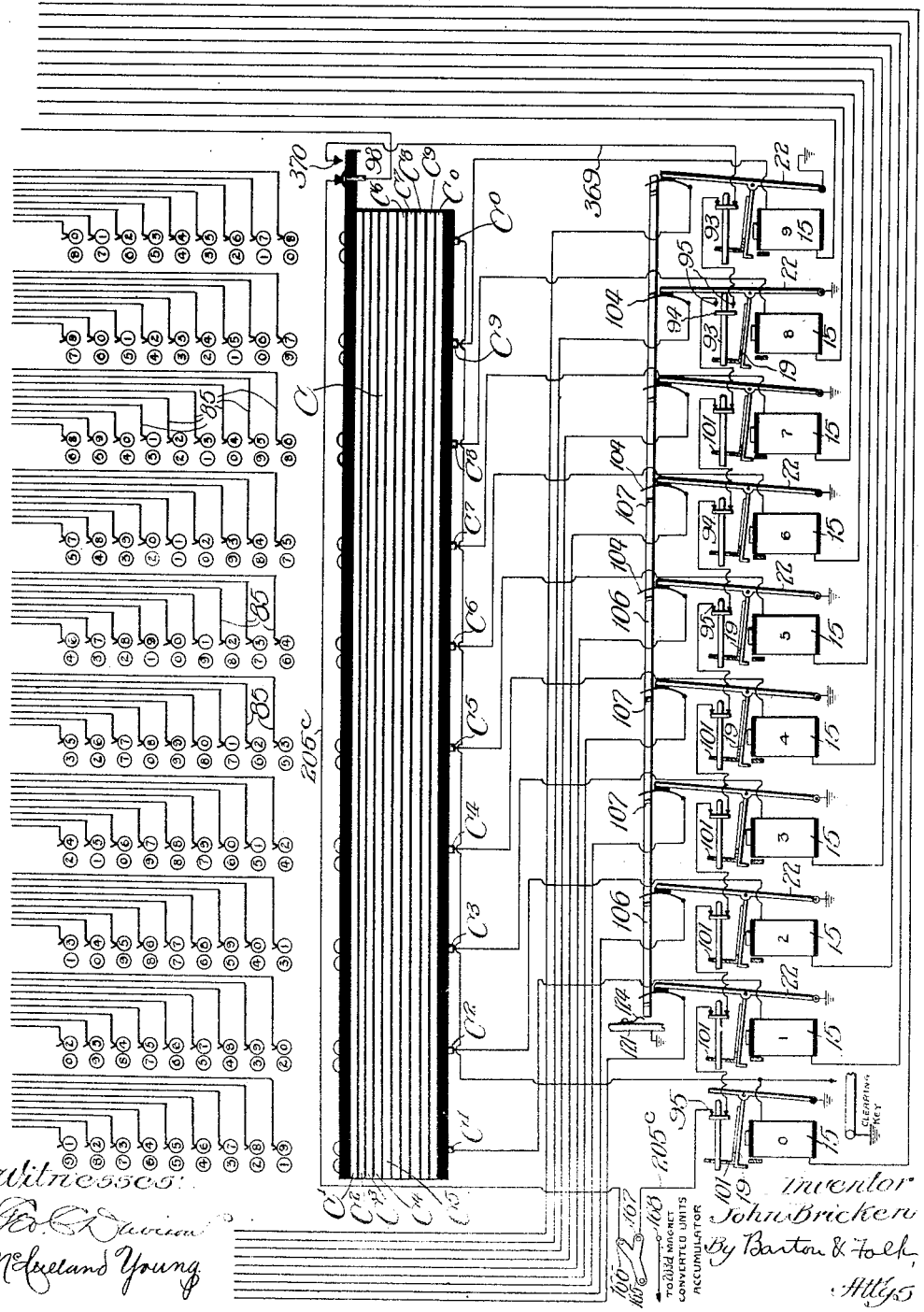

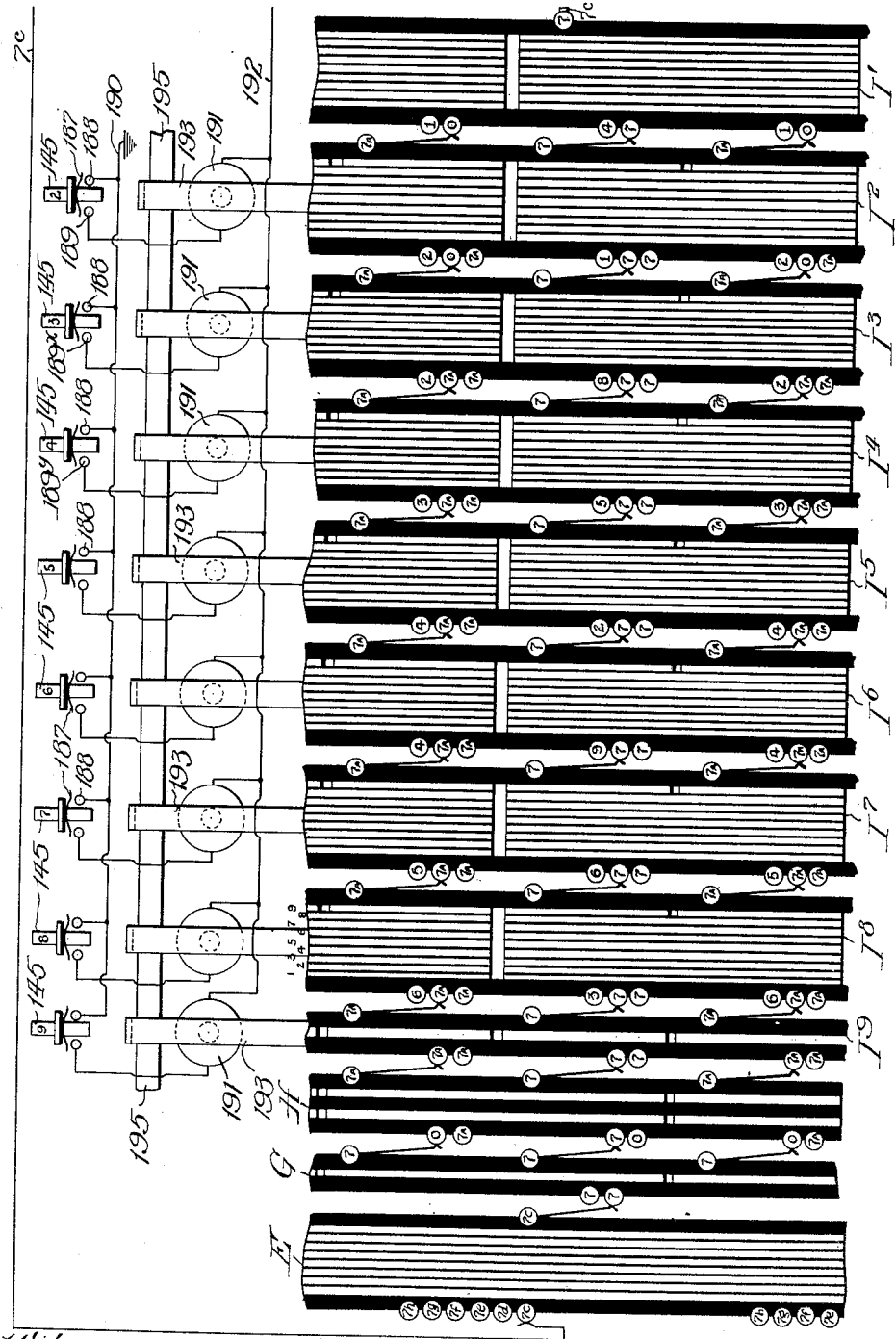

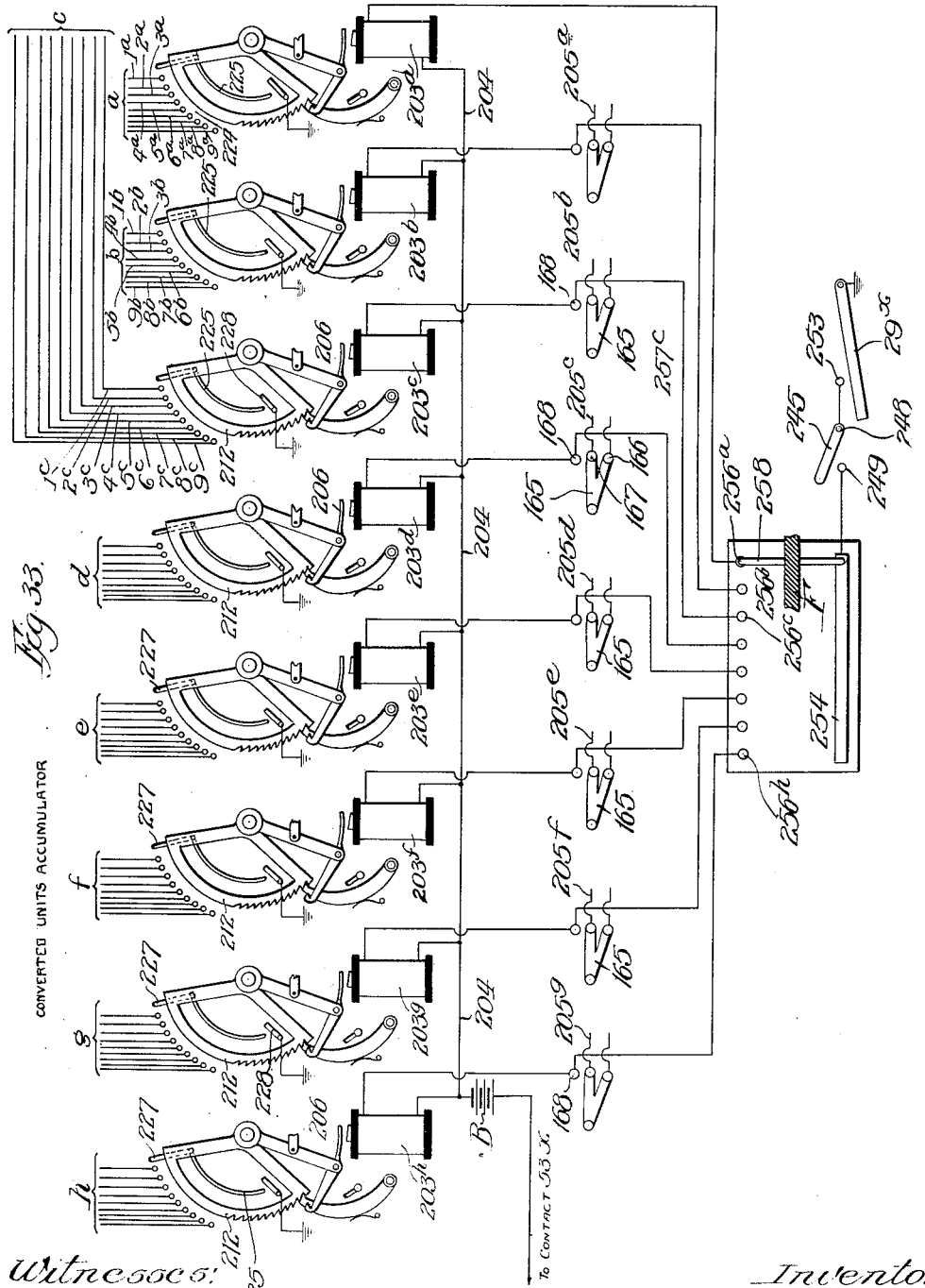

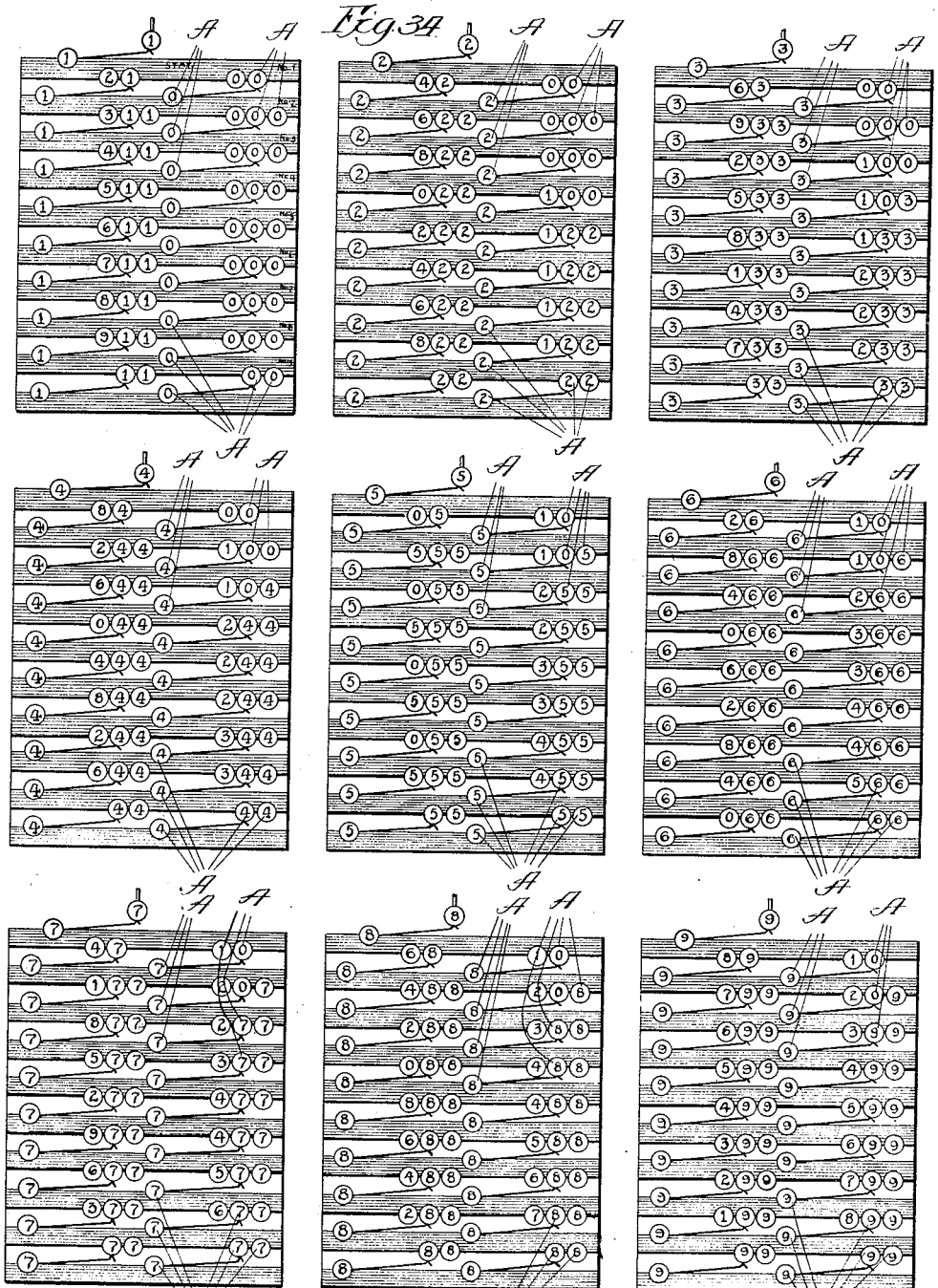

J. BRICKEN.
ELECTROCALCULOGRAPH.
APPLICATION FILED AUG. 29, 1911.
1,157,079.
Patented Oct. 19, 1915.
28 SHEETS—SHEET 23.
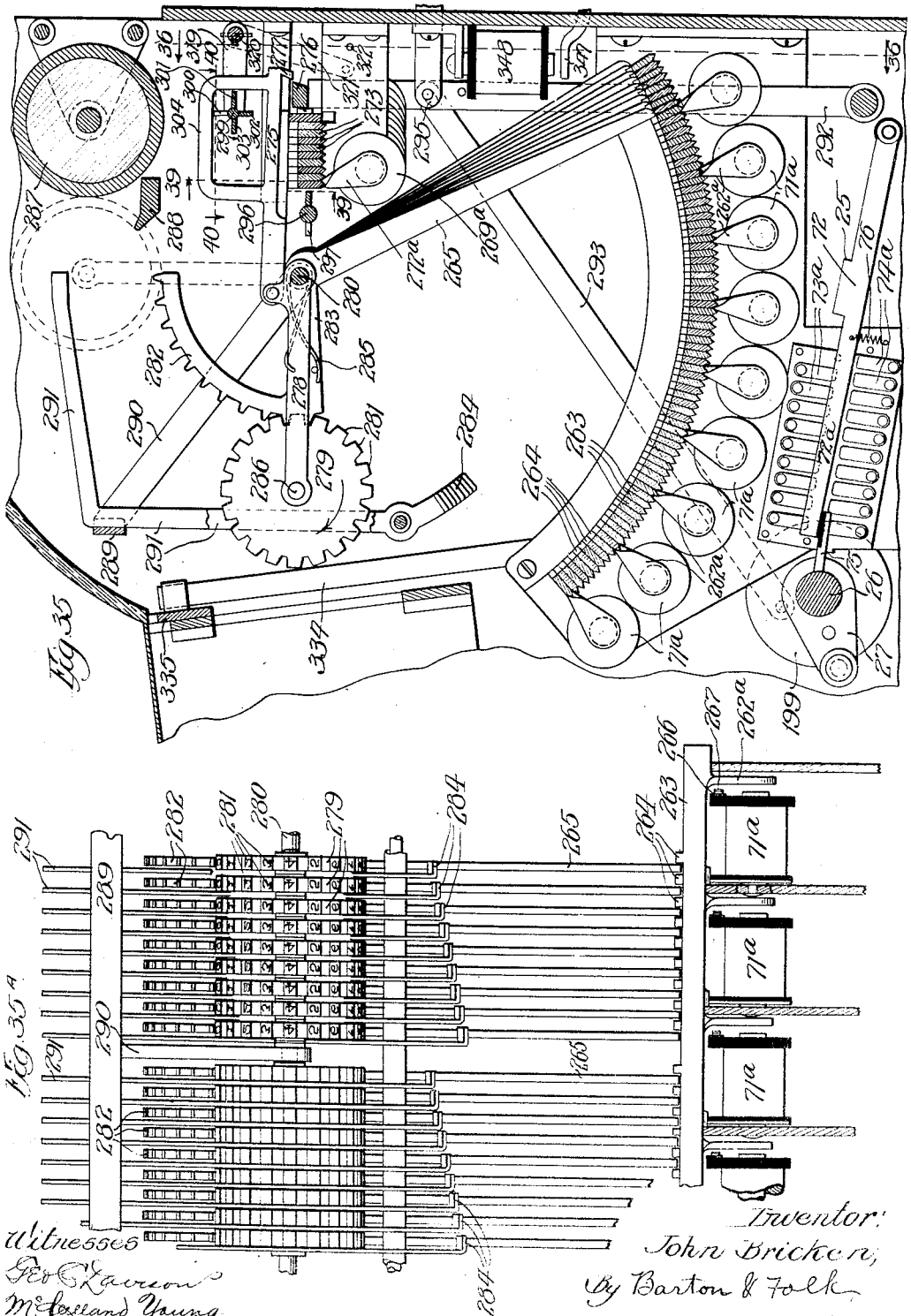

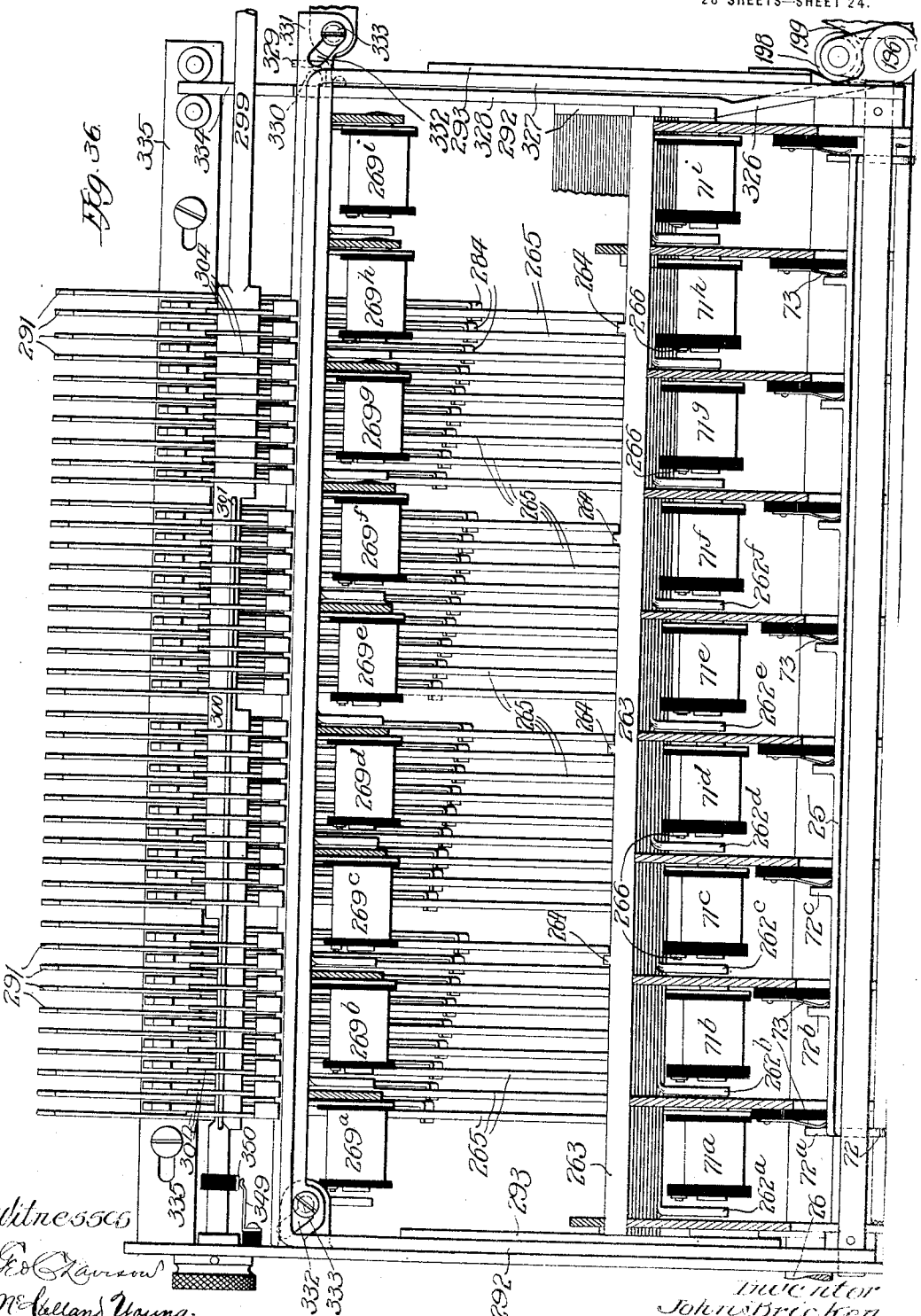

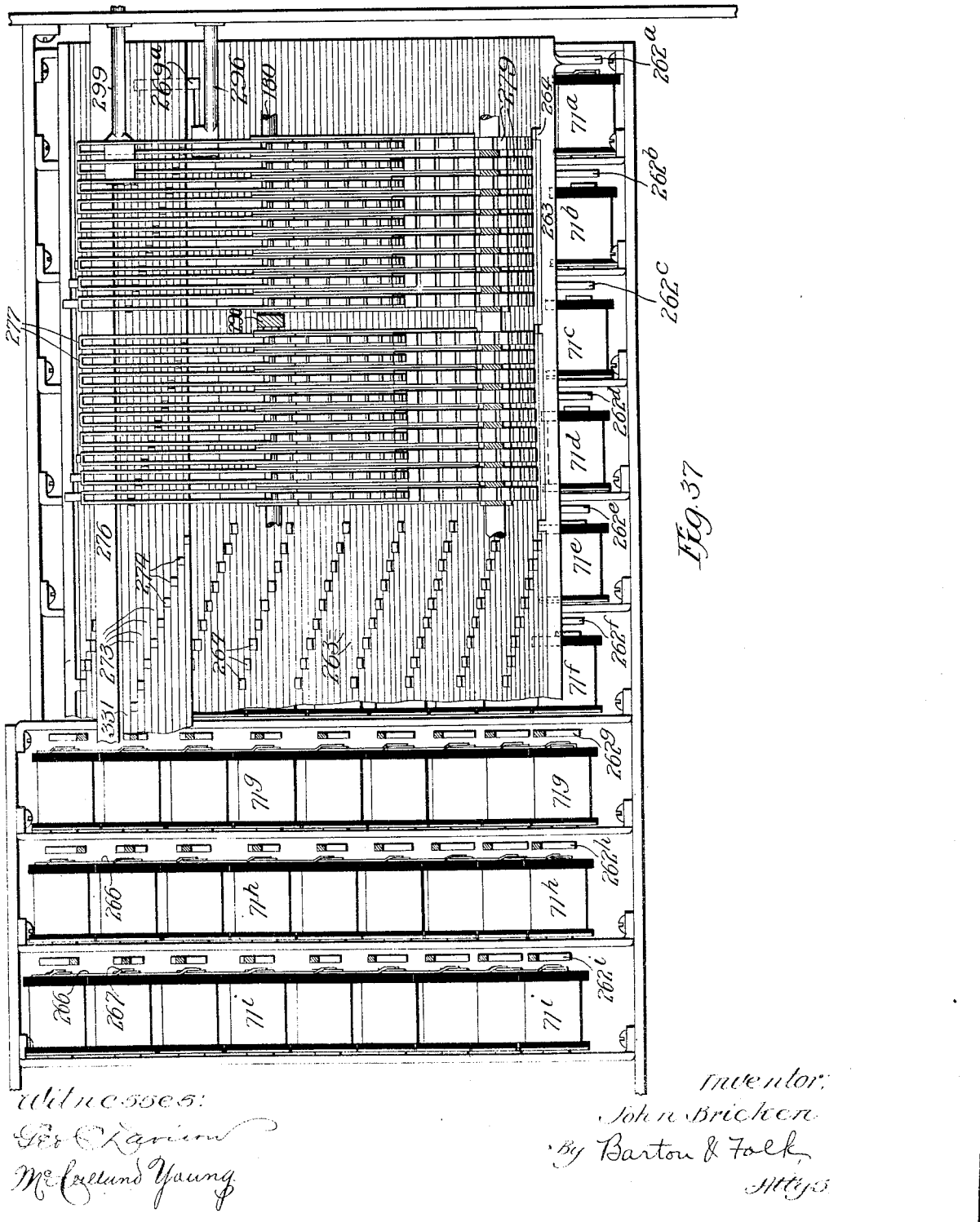

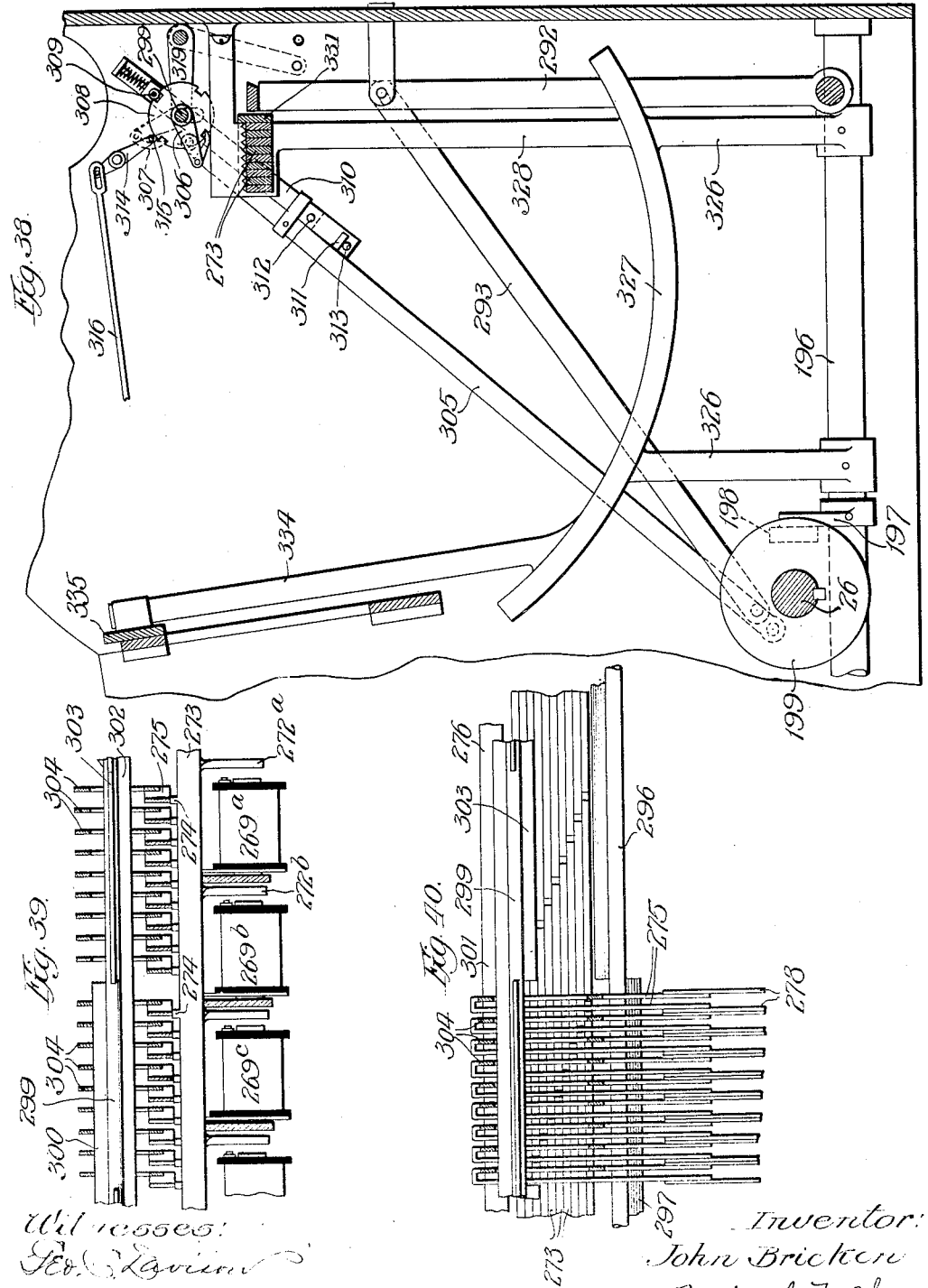

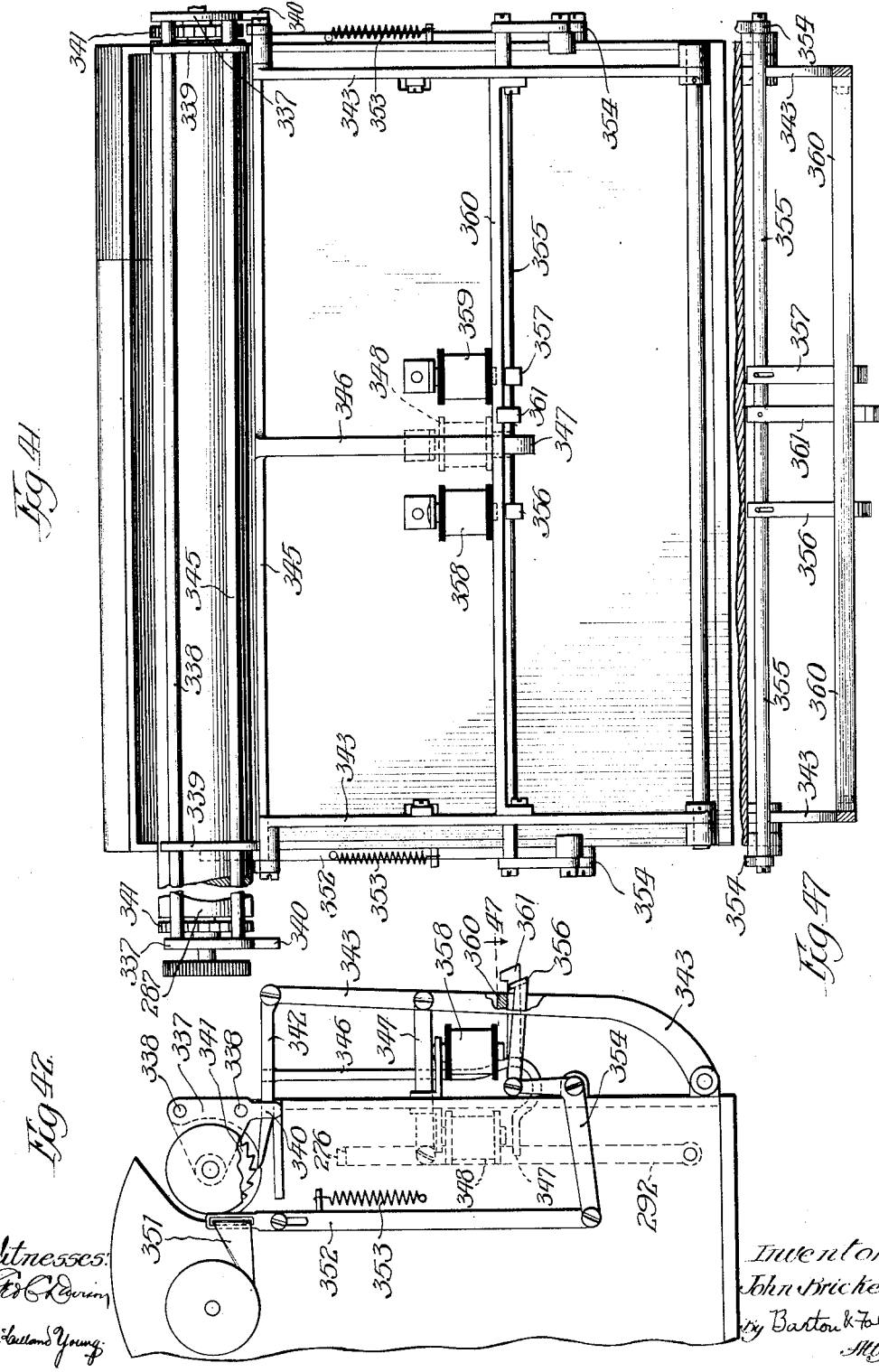

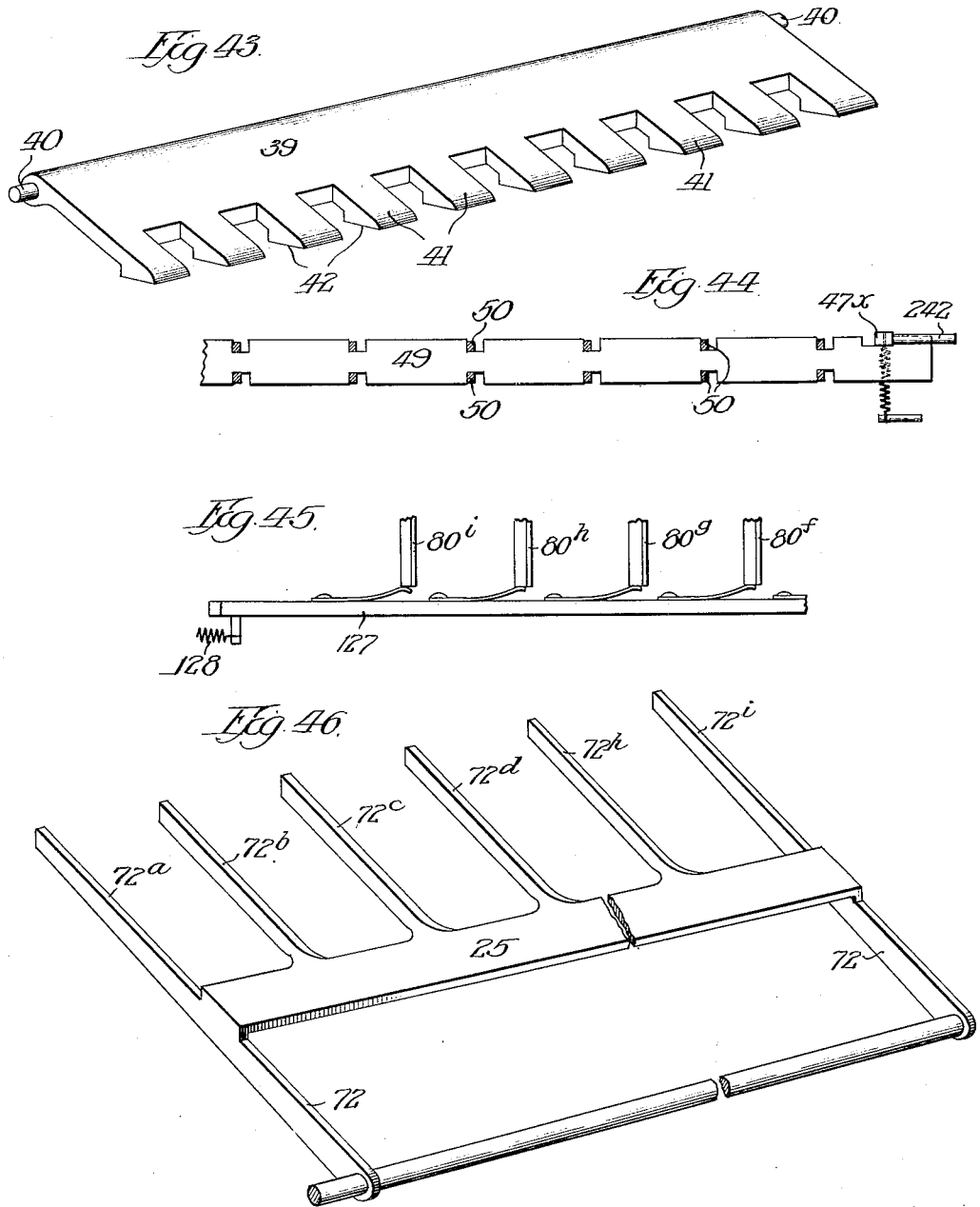

UNITED STATES PATENT OFFICE.

JOHN BRICKEN, OF MAYWOOD, ILLINOIS, ASSIGNOR OF TWO-THIRDS TO REUBEN MARKS, OF DES MOINES, IOWA.

ELECTROCALCULOGRAPH.

1,157,079. Specification of Letters Patent. Patented Oct. 19, 1915.

Application filed August 29, 1911. Serial No. 646,664.

*To all whom it may concern:*

Be it known that I, JOHN BRICKEN, a subject of the Emperor of Russia, residing at Maywood, in the county of Cook and State of Illinois, have invented a certain new and useful Improvement in Electrocalculographs, of which the following is a full, clear, concise, and exact description.

My invention relates to an electrocalculograph machine, that is to an electrically controlled recording calculating machine.

The object of my invention is to provide a machine of the character described in which differential mechanical motions are eliminated and in which electrical connections are substituted therefor which will, in a comparatively simple manner, give direct computations.

So far as I am aware my invention is broadly new and is the first of its kind in which digit lines, that is lines representing digit keys of a keyboard, are switched directly into product and sum lines. My invention is thus distinguished from other electrically actuated machines which operate the computing mechanism by a series of stepping impulses.

My invention consists primarily, in a novel combination of groups of elements practically all of which groups constitute novel sub-combinations of the broad combination comprising my invention.

My invention, in its simplest form, may be embodied in a machine for performing computations involving merely addition and subtraction. In such embodiment of my invention are found the following sub-combinations:

(1) The keyboard, having a plurality of rows of keys numbered 1 to 9 inclusive, each row representing a different denomination of digits. Each digit key is adapted when depressed to close the circuit of a digit line which extends from said key to the computing switchboard, there being a digit line for each digit key.

(2) The computing switchboards, one for each denomination of digits, adapted, by a simple switching operation, to extend the circuit of the digit lines of the depressed keys to computing magnets representing the sum or the difference, as the case may be, resulting from the computation.

(3) Electrically controlled recording mechanism adapted to record any desired item set upon the keyboard or computed by the machine.

My invention, however, is preferably embodied in a machine which will perform computations involving not only addition and subtraction but also multiplication and division. In such machine the digit lines from the digit keys are not extended directly to the keyboard, but are first extended through a multiplying switchboard. Where computations are performed involving only addition or subtraction the digit lines from the keys extend unaltered through the multiplying switchboard, said switchboard in such case constituting merely a convenient means of extending the digit lines to their corresponding levels in their corresponding computing switchboards. Said multiplying switchboard is preferably composed of a denomination switchboard, a carrying switchboard, and a factor switchboard. By the denomination switchboard, a digit line from one order or denomination of digit keys can be switched into a corresponding digit line of a different denomination. The factor switchboard is adapted to switch a digit line of a given value to a digit line corresponding to the units of the product resulting from the multiplication of the digit number represented by said first mentioned digit line by the multiplying factor. The digit line from a depressed key may thus be changed by the factor switchboard into a digit line representing product and as such extended to the computing switchboard.

In the preferred embodiment of my invention the computing magnets are utilized to actuate corresponding character bars or dial bars which, when actuated, are visible through apertures in the keyboard of the machine, thus providing a visible register to indicate the result of computations performed by the machine.

The preferred embodiment of my invention is illustrated in the accompanying drawings, and the above referred to features and other important features of my invention may be more readily understood and will now be described by reference thereto.

Figure 1 is a plan view of the machine with parts broken away. Fig. 2 is a side elevation of the machine with the casing thereof in section. Fig. 3 is a section on the line 3—3 of Fig. 2. Figs. 4 and 4<sup>A</sup> are sections on the lines 4—4 of Fig. 2. Fig. 5 is a section on the line 5—5 of Fig. 4. Fig. 6 is a section on the line 6—6 of Figs. 4 and 12. Fig. 7 is a section on the line 7—7 of Figs. 4 and 5. Fig. 8 is a vertical section showing the character bars in front elevation. Fig. 9 is a section on the line 9—9 of Fig. 8. Fig. 10 is a section on the line 10—10 of Fig. 11. Fig. 11 is a view similar to Fig. 8 of the opposite side of the character bars. Fig. 12 is a view from the right of Fig. 4, showing in elevation the back of the computing switchboard. Fig. 13 is a longitudinal elevation partly broken away to show different levels of the bank of conductors for the digit keys. Fig. 14 is an elevation in successive vertical planes of one of the computing switchboards. Fig. 15 is a diagrammatic representation of the connection of the pins with the plates of the computing switchboard. Fig. 16 is a side elevation of the machine. Fig. 17 is a section on the line 17—17 of Fig. 2; Fig. 18 is a fragmentary horizontal section showing the computing magnets and the storage mechanism in plan. Fig. 19 is a fragmentary view in elevation of the storage mechanism. Fig. 20 is a diagrammatic representation of certain of the levers which control the operation of the machine. Fig. 21 is a section of the multiplying switchboard on the line 21—21 of Fig. 23. Fig. 22 is a diagram representing the connection of the pins to the plates of the shiftable panel section of the denomination switchboard. Fig. 23 is a plan view, partly broken away, of the multiplying switchboard. Fig. 24 is an enlarged view in side elevation of the front end of the machine showing the converted units accumulator. Fig. 25 is an enlarged detail on the line 25—25 of Fig. 24. Fig. 26 is a detail view of the segmental rack of the converted units accomulator. Fig. 27 is a detail view of the insulating sector block of the converted units accumulator. Fig. 28 is a front end elevation of the machine, with the casing partly broken away to show the converted units accumulator in end elevation. Fig. 29 is a vertical transverse section of the machine showing the shiftable panel of the denomination switchboard in elevation. Figs. 30 and 31 placed edge to edge constitute a diagram illustrating certain circuit connections of the machine. Fig. 32 is a diagram showing the connection of the pins of the multiplying switchboard in the seventh level, and also showing in diagram the circuit connections for shifting the shiftable panels of the factor switchboard. Fig. 33 is a diagram illustrating the circuit connections of the converted units accumulator. Fig. 34 is a diagram showing the connection of the pins of the factor switchboard for all the digits of a given denomination. Fig. 35 is an enlarged view partly in section and partly in side elevation of the recording mechanism. Fig. 35^A is a fragmentary view in front elevation of the recording mechanism. Fig. 36 is a rear elevation of the recording mechanism with parts broken away. Fig. 37 is a plan view of the recording mechanism at successive levels thereof. Fig. 38 is a detail view of the mechanism for resetting the recording mechanism. Fig. 39 is a fragmentary, sectional detail on the line 39—39 of Fig. 35; Fig. 40 is a fragmentary, sectional detail on the line 40—40 of Fig. 35. Fig. 41 is a rear elevation of the machine. Fig. 42 is a fragmentary side elevation of the extreme rear end of the machine. And Figs. 43 to 47 inclusive are detail views of different portions of the mechanism.

Like letters of reference refer to like parts throughout the several figures of the drawings.

It will be noted in particular, however, that for sake of clearness in tracing the electric circuits, and especially their extensions through the various switchboards, the conductors, including the pins, wipers, strips and plates of the switchboard, are given reference letters indicating digits and denomination of digits. In accordance with this plan the numerals 1 to 9 inclusive indicate the corresponding digit, and the index letters $a$ to $i$ inclusive indicate denomination, the first letter, that is $a$, representing the first or units denomination, the second letter, that is $b$, representing the second or tens denomination and so forth. For example, $7^c$ indicates the digit line 7 of the hundreds denomination.

*The key-board and associated mechanisms.*—The key-board of the machine is adapted to direct mathematical operations involving nine different denominations or orders of digits. Each order of digits is provided with a row of digit keys 10 numbered on their faces from 1 to 9 inclusive. Each of these digit keys is provided with a plunger 11, which carries an insulated switch spring 12 adapted in its depressed position to close contact with a pair of conductors or contact posts 13, $9^a$, 13, $8^a$, etc., for the units order, posts 13, $9^b$, 13, $8^b$, etc., for the tens order, and corresponding posts for the remaining orders. The switch springs 12, when depressed, thus close circuits for the computing magnets 15, as will hereinafter be more fully described.

A digit key when depressed is held in its depressed position by a spring-pressed latch bar 16 adapted to engage with collar 17 carried by the plungers 11. Each latch bar 16 extends longitudinally of the row of keys of the corresponding denominations of digit keys 10. The collars 17 of the key plungers are provided with beveled edges adapted, when a key is depressed, to rock the corresponding latch bar 16 until the collar rides underneath the latch thereof, thus, while being depressed, releasing any other key in the same row which may be held locked down by said latch bar. In short only one digit key of a given denomination can be held in its depressed position, the depression of one key of the row operating to release any key then locked. Therefore in case the wrong digit key is depressed, the error can readily be remedied by depressing the right digit key. Each latch bar 16 is also adapted to be thrown into releasing position by a digit releasing key $10^x$, which is provided with a collar $17^x$. The depression of the key $10^x$ operates the latch bar 16 in the manner already described with respect to the digit key 10.

The circuits for the computing magnets 15 are controlled by the operation of a main lever 18, as will hereinafter be more fully described. Which particular computing magnet 15 of each denomination is energized will depend upon the digit of the order representing the result of the computation.

Referring to Fig. 4, one of the electromagnets 15 is shown to have been energized and to have attracted its armature 19. The end of the armature 19 is provided with a hook 20 adapted, in the attracted position of the armature, to fall in the path of movement of the operating bar 21. It will be understood that each operating bar 21 lies immediately beneath the ends of a row of armatures 19, there being ten computing magnets 15 in each row, with a corresponding number of armatures. Thus when an operating bar 21 is actuated, it will engage with the hook 20 upon the end of that armature which is in its attracted position.

Each armature 19 is pivotally carried by a character bar 22. Said character bars are pivoted at their lower ends to the frame of the machine. The upper end of each of the character bars is bent at a right angle, as shown at 23, and provides a numbered target or registering dial. When a character bar 22 is drawn forward the number carried thereby is brought forward into view through an aperture 24 in the key-board, as shown most clearly in Fig. 1, in which a character bar of the units, tens, and hundreds order, respectively, is shown as actuated, thereby rendering visible the corresponding targets carrying the numbers 6, 9, 8. In Fig. 1 the targets of the zero character bars for the remaining orders are visible through the windows 24, the zero character bar being held in actuated position when no other character bar of the order has been actuated.

By reference to Fig. 3, it will be seen that when the main lever 18 is operated, it rocks the main shaft 26 of the machine. Secured upon said main shaft is a crank 27, to the end of which is pivoted, in such manner as to provide a slight lost motion, the end of a connecting rod 28. The rod 28 connects said crank to a rocking lever 29 which is secured intermediate its ends to a rod 30. The rod 30 has pivotal bearing in the walls 31, 32, as shown most clearly in Fig. 2. The opposite end of the shaft 30 likewise carries a rocking lever 29 (see Fig. 17). The upper end of the lever 29 is pivotally connected to a lever 33, the upper end of the latter being in turn secured to the pivoted ends of a pair of toggle levers 34, 35. The lever 34 is pivoted at a fixed point 36, while the end of the lever 35 is pivoted to a reciprocating bar 37, which bar is thus adapted to be reciprocated by said pair of toggle levers 34, 35. By reference to Fig. 17, it will be seen that the structure of the series of levers 29, 33, 34 and 35 is duplicated at the other end of the machine in the levers $29^x$, $33^x$, $34^x$ and $25^x$. Therefore, at the same time that the bar 37 is reciprocated by the actuation of the main lever 181 a corresponding bar $37^x$ at the opposite end of the machine is likewise reciprocated.

Extending between the reciprocating bars 37, $37^x$ and pivoted at their ends thereto, as shown at 38, $38^x$ (see Figs. 3 and 17), are the series of operating bars 21, there being nine of said bars. It thus appears that by the operation of the main lever 18, the entire series of operating bars are simultaneously moved a slight distance from the position shown in Fig. 4 to the position shown in Fig. 4$^A$. In case an armature 19 is not in its attracted position the hook 20 thereof lies above the path of movement of the corresponding bar 21, as shown at the left in Fig. 4. When said armature 19 is in its attracted position, as shown at the right in Fig. 4, the actuating bar 21 engages the hooked end 20 thereof, and thereby draws the character bar 22 into its actuated position as shown in Fig. 4$^A$.

Lying immediately beneath each row of the digit keys 10 of a given order of digits is a locking plate 39 suitably pivoted, at one of its longitudinal edges, upon a pivot 40. The free longitudinal edge of the plate 39 is provided with ten hooks or latches 41, one for each of the character bars of that order. (See Figs. 4 and 43). When a character bar is being actuated in the manner described, the cam face 42 of the hook 41 rides over the edge 43 of the character bar, and thus elevating the edge of the plate 39 and the latch carried thereby releases any character bar at that time interlocked by some previous operation of the machine. Such released character bar is then returned to its reserved or initial position by means of a spring 44, (see Fig. 4). Upon the further movement of the actuated character bar 22, the latch 41 moves by gravity into locking engagement with said character bar and holds the same locked against the tension of the spring 44. (See Fig. 4ᴬ.)

Referring to Fig. 17, it will be noted that at the end of the forward stroke of the main lever 18, a roller 45 carried on the end of the rocking lever 29ˣ comes into engagement with the cam surface 46 of a rocking arm 47. Said arm 47 is pivoted at its lower end upon a shaft 48. The upper portion 47ˣ of said arm engages with a reciprocating bar 49, and thus the rocking of the arm 47 is adapted to shift the bar 49 longitudinally for a short distance. (See Figs. 2, 17, 24 and 44). The bar 49 is cut away upon its opposite side edges to provide recesses for receiving the bifurcated ends 50 constituting downward extensions of the latches 16. Thus the reciprocation of the bar 49 to the right, as shown in Fig. 17, rocks each of the latches 16 upon its pivot 16ˣ, causing the hook of any latch which is in engagement with the collar 17 of a depressed digit key 10 to be released from said collar, whereupon said digit key is restored by the spring 51.

During the first half of the forward stroke of the main lever 18, the bars 37, 37ˣ are carried forward the full extent of their forward reciprocation, carrying with them the several operating bars 21. During the second half of the forward stroke the said bars 37 and 37ˣ are reciprocated in the opposite direction and return to their normal positions.

As will appear by reference to Figs. 16 and 30, during the first quarter of the forward stroke of the lever 18 a circuit for each of the computing magnets 15 is closed through the contact strip 53 and the contact pin 54, which pin is held in engagement with the strip 53 by the flat spring 55. The contact strip 53 is thus grounded through the pin 54, spring 55 and the lever 18. At the beginning of the second quarter of the forward stroke of the lever 18, the contact pin 54 rides off of the contact strip 53, thereby breaking the circuit of the computing magnets. However, the operating bars 21 are in locked engagement with the hooks 20 of the armatures of the energized magnets, and therefore said armatures are not released at this point. At the beginning of the second half of the forward stroke of the main lever 18, operating bars 21 are reciprocated in the opposite direction, thereupon releasing the armatures 19, which are thereupon restored by the springs 52 to their normal positions.

Pivoted to the crank 27 carried by the shaft 26 is a connecting rod 56. In order to provide lost motion during the first half of the forward stroke of the main lever 18, the connecting rod 56 is pivoted to the crank 27 by a slotted connection, (see Fig. 2).

Likewise, upon the opposite side of the machine, is provided a similar rod 56ˣ operated in a similar manner from the main shaft 26. The rods 56, 56ˣ carry at their upper ends a cross bar 57, upon which are pivotally mounted a series of switch arms 58, each pivoted at one end upon a pivot pin 59 and having its opposite end adapted to contact with one or the other of the contact posts 60, 61. (See Figs. 2 and 3). Thus, during the second half of the forward stroke of the lever 18, the switch arms 58 are moved from the posts 61 to the posts 60, and thus connect ground to the No. 1 digit line of the next higher order of the computing switchboard for the purpose of carrying converted units into their proper denomination, as will be hereinafter more fully described.

The circuit connections controlled by the main lever 18 may be best understood by reference to Figs. 16 and 30. As shown in Fig. 16, there is mounted upon the side of the machine two segmental-shaped blocks of insulated material 62, 63. The block 62 is mounted to reciprocate above the block 63, being held at its ends between the guides 64, 64 and the casing of the machine. Near the opposite ends of the insulating block 62 are pins 65 arranged in the path of movement of the lever 18, whereby at the opposite extremes of the movement of the lever 18 the block 62 is shifted slightly with respect to the block 63. Mounted on the block 63 are the contact strips 53, and 53ˣ, which contact strips are normally electrically connected by a conductor strip 66 secured to the block 62. However, when the block 62 is shifted to the right of the position shown in Fig. 16, the end 67 of said strip 66 is moved away from the projecting end of the strip 53, thereby breaking the circuit at this point. It will be understood, by reference to said Figs. 16 and 30, that the contact strips 53, 66 and 53ˣ control the grounding through the lever 18, of the battery B. For example, during the first quarter of the forward stroke of the lever 18, one pole of the battery B (see Fig. 30) is grounded through strips 53ˣ, 66 and 53, pin 54 and the lever 18. At the end of the first quarter of the forward stroke and up until the beginning of the last quarter of such forward stroke, the ground connection just described is open by reason of the fact that the pin 54 rides off of the contact strip 53 and has not yet reached the contact strip 53ˣ. During the last quarter of the forward stroke the said pole of the battery B is grounded through the contact strip 53ˣ, pin 54 and lever 18. Near the end of the forward stroke of the lever 18, said lever engages the pin 65 and moves the insulating block 62 to the right thereby breaking the connection at 67 between the conductor strip 66 and the contact strip 53. It thus appears that during the return stroke of the lever 18, the battery B can be grounded only during the first quarter of such return stroke, that is during the time said lever is over the contact strip 53ˣ.

Again referring to Figs. 16 and 30, it will be noted that the other pole of the battery B is connected to a conductor spring 68 insulatedly carried by the lever 18. The upper end of said spring 68 is adapted to make sliding contact with the contact strips 69, 70. During the forward stroke of the lever 18 the battery is first included in the circuit through the contact strip 69, at which time the circuit is completed through recording magnets $71^a$, $71^b$, etc., the circuit for said magnets being controlled by the switch arms $72^a$, $72^b$, etc. of the lever 72, which arms are in engagement with the series of contact points $73^a$, $73^b$, etc. After a slight forward movement of the lever 18, the switch levers $72^a$, $72^b$, etc. are moved from the contact points $73^a$, $73^b$, etc., to the series of contact points $74^a$, $74^b$, etc., respectively, and it is in order to prevent sparking at the contacts $73^a$, etc. upon the breaking of such contacts that the spring 68 is caused, just before such breaking of said contacts, to ride off of the strip 69 onto the insulating block 63, thereby first breaking the connection at this latter point before the connection is broken at said contacts.

After the main lever 18 has been moved forward over the contact strip 70, the pole of the battery B is connected in circuit during the remaining portion of the forward stroke of said lever, and continues in circuit until near the end of the return stroke of the lever 18.

Referring to Figs. 2, 30 and 35, it will be noted that when the main lever 18 has been moved off of the contact strip 69, the crank 27 will have been moved thereby to such position that the finger 75 carried by said crank will have been moved away from the switch lever 72, and the switch arms $72^a$, $72^b$, etc. of said lever will be pulled by the spring 76 away from the series of contact springs $73^a$, $73^b$, etc., into engagement with the contact springs $74^a$, $74^b$, etc. respectively. Such switching of the lever arms from the series of upper sets of contact springs to the series of lower sets occurs, as before mentioned, while the circuit to the battery is broken during the passage of the lever 18 from the contact strip 69 to the contact strip 70. It will be understood that there are as many lever arms $72^a$, $72^b$, etc. as there are orders of digits provided in the machine.

Other operations incident to the operation of the lever 18 will hereinafter be set forth in connection with the mechanisms affected.

As has been hereinbefore stated the depression of a digit key 10 causes a switch 12 to electrically connect one of a series of posts 13 with one of the digit posts $9^a$, $8^a$, $9^b$, $8^b$, etc., dependent upon which key is depressed. The posts 13 are electrically connected to a common strip 77 (see Fig. 13), said strip being provided with a plurality of depending lugs 78 through which the posts 13 extend. The strip 77 thus forms a common conductor which, as has been heretofore stated, is normally grounded by the switch arm 58, said arm being normally in contact with the post 61.

The digit contact posts $9^a$, $8^a$, etc. are each connected to a conductor strip $9^a$, $8^a$, etc., respectively, which strips thus are electrically continuous with their respective posts and constitute digit lines, one for each key of a given order. The circuits from each of said conductor strips or digit lines extend to the denomination switchboard and from thence to the multiplying switchboard as will hereinafter be more fully described. From the multiplying switchboard the circuit extends to the computing switchboard, which will now be described.

*The computing switchboard.*—For each order of digits there is a primary switchboard and a secondary or computing switchboard C,—see particularly Figs. 4, $4^A$, 5, 6, 12, 14 and diagrams Figs. 15 and 31.

Each primary switchboard comprises two blocks of insulating material 79 between which are clamped ten horizontally disposed metallic strips or conductors. In the drawings these conductors are given reference letters to indicate the digit numbers and the denomination thereof, those of the hundreds denomination being denoted by the reference characters, $80^c$, $1^c$, $2^c$, $3^c$, $4^c$, $5^c$, $6^c$, $7^c$, $8^c$, and $9^c$. (See Fig. 30.) These strips extend longitudinally of the machine in superposed relation. It is intended thus to designate that the digit lines will terminate in corresponding conductor strips, provided that they are not switched from their normal connection by some computing operation involved during their extension through the multiplying switchboards. Each of said conductor strips is provided along its length with a series of pins 81 extending therethrough and electrically connected to the strip. There are ten of said pins 81 for each strip, corresponding to the ten digit numbers 0 to 9 inclusive. Extending through each of said strips, but out of electrical contact therewith, are a series of pins 82 corresponding in number to the pins 81. Each pin 81 is adapted to be electrically connected to the adjacent pin 82 by the bridging switch member 83 carried by the character bar 22. The character bar carries ten of said bridging members 83,—nine for the digit lines and one for the total line. The bridging members or switches 83 are mounted upon blocks 84 of insulating material and are thus insulatedly carried by the character bars. Upon the face of the primary switchboard opposite the bridging members 83 the pins 82 are each connected to a wiper 85. The circuit is thus extended from each of said conductor strips of the primary switchboard A through a pair of pins, 81, 82 by a switch 83 of an actuated character bar 22 to a wiper 85. The wiper 85 is adapted to extend the connection to the secondary or computing switchboard C.

The secondary or computing switchboard comprises ten plates $C^1$, $C^2$, $C^3$, $C^4$, $C^5$, $C^6$, $C^7$, $C^8$, $C^9$, and $C^0$, arranged in vertical position and extending longitudinally of the key-board of the machine, said plates being separated from each other by plates 86 of insulating material.

In horizontal alinement, that is in the same level, with each of the strips of the primary switchboard A are a series of pins $c^0$, $c^1$, $c^2$ to $c^9$ inclusive. For convenience the index number affixed to the reference letter designating a pin is used to denote to which plate the pin is connected electrically,—thus $c^9$ indicates that this particular pin is connected electrically to the ninth plate or to plate $C^9$. By reference to Fig. 14 and the diagrams Figs. 15 and 31 it will be noted that each plate has electrically connected thereto eighteen of such pins differently located in the secondary computing switchboard. These pins are connected and located in accordance with a table for addition and subtraction as will hereinafter be more fully set forth.

Each of the wipers 85 is adapted to extend the connection from the primary switchboard to the secondary switchboard C. Corresponding to each wiper 85 are two adjacent pins of the secondary switchboard, with the one or the other of which said wiper is in contact, depending upon the position of the computing switchboard C. One of said pair of pins is used for purposes of addition and the other for subtraction. In short the switchboard C is adapted to be shifted longitudinally so that each wiper 85 makes contact with a corresponding pin for purposes of addition and with an adjacent pin for the purpose of subtraction.

Ten of the pins of the computing switchboard, one for each plate, extend completely through the switchboard. For convenience the top level of pins are the ones thus extending through the switchboard (see Fig. 4A). The wiper 85 in this top level of pins is adapted, in the case of addition, to complete the circuit connection through the switchboard C directly through a pin $c^0$, $c^9$, $c^8$, etc., as the case may be. In the remaining levels the circuit is extended through the switchboard C through two pins, upon the head of one of which the wiper 85 rests and from said latter pin to the plate with which it is electrically connected and from said plate to the pin thereof in the top level which extends to the opposite side of the switchboard C. For example, if the wiper 85 rests on one of the pins $c^8$ the circuit will be completed from said pin to plate $C^8$ and from said plate to the opposite face of the switchboard through pin $c^8$ in the top level of pins.

The pins $c^0$, $c^9$, $c^8$, etc., of the top level are engaged by corresponding springs 87, which springs are electrically connected to the windings of the corresponding computing magnets 15, there being, as before stated, ten of said computing magnets for each denomination of digits, each magnet representing a given denomination of digits. Thus a spring 87 continues the connection from the pin $c^0$ to the winding of the 0 computing magnet 15.

The secondary or computing switchboard C is arranged to be shifted by the subtracting lever 89. (See Fig. 3.) Said lever 89 is connected to the shaft 90 which extends transversely of the machine and has bearings in the casing or side walls thereof. For each computing switchboard the shaft 90 is provided with an eccentric 91 (see Fig. 2) adapted to operate the link 92 (see also Fig. 6) and thus to shift the switchboard C, so that the wipers 85 of the primary switchboard B may be shifted from one vertical row of pins of the switchboard C to the adjacent vertical row of pins of said switchboard. In one position of the switchboard the machine is adapted to perform operations involving addition and in the other operations involving subtraction, as has already been stated.

*Carrying means.*—Corresponding to each character bar 22 is a spring-pressed plunger 93 which carries a bridging member 94 adapted in its normal position to bridge the adjacent sections of a contact strip 95. Each plunger 93 is normally held by a spring 96 in position to electrically connect the adjacent sections of said strip 95. However, when a character bar 22 is in its operated position it moves the plunger 93, against the tension of the spring 96, and opens the connection between the adjacent sections of the strips 95. Said series of strip sections are adapted to form part of a circuit which includes the coil of a carrying magnet 97, there being one carrying magnet for each order of digits except the highest order provided for in the machine. By reference to Figs. 30 and 31 it will be noted that the circuit from one terminal of the windings of the carrying magnet 97 may be controlled through the conductor strips 95 and through the pin 98 carried by the movable computing switchboard C. The connection of the other terminal of the winding of the carrying magnet to battery over the battery lead 371 is controlled by the hand lever 18.

The conductor strips 95 are mounted upon blocks of insulating material 99. The plungers 93 are mounted in insulating plates 99 and 100 and are adapted to be connected to ground when a corresponding armature 19 is in its attracted position. Mounted on top of each armature is an angular leaf spring 101 provided with a slot 102. In the normal position of the armature the corresponding plunger 93 projects through said slot without engagement with the spring 101. However when the armature is attracted the spring 101 is drawn down into engagement with plunger 93 and said plunger is thus grounded through the spring 101, armature 19, character bar 22 and the frame of the machine.

There is a carrying magnet 97 for each denomination of digit keys except the highest provided for on the machine. In case the digit numbers of a given denomination when added give a sum greater than can be expressed by one digit number, the digit number of the higher denomination, that is the converted unit, is carried by the carrying magnet 97 to the next higher order. The reverse operation is performed in the case of subtraction in accordance with a well understood principle.

The armatures 362 of the carrying magnets are slidably mounted upon guide rods 363, 363. The upper end of each armature carries a block of insulating material 364 provided on its upper surface with a contact strip 365 adapted in the attracted position of said armature to bridge the pair of contact springs 366, 367 mounted upon each of said magnets. The energization of a magnet 97 thus draws its armature 362 beneath the ends of the springs 366, 367 and electrically connects said springs. The attracted armature is held in this position by said contact springs until subsequently restored by the pins 336 of a restoring bar, as will be hereinafter described.

The conditions under which the carrying magnets are brought into use to perform their function may be best described by a concrete example. Thus referring to Figs. 1, 30 and 31 it will be noted that the character bar 22, representing digit number 8 in the hundreds denomination, is in its actuated position, and it therefore maintains the plunger 93 in position to hold open the pair of contacts 95 controlled by said plunger. Assuming that the digit key 7 of the same order is then depressed, circuit connections will be established which will energize the No. 5 computing magnet 15, this being the units of the sum of eight and seven. The armature 19 of said energized magnet being attracted, a circuit is completed from ground through the character bars 22, armature 19, plunger 93, and through the series of contacts 95 successively of the No. 4, No. 3, No. 2, No. 1 and No. 0 computing magnets, conductor $205^c$, which includes switch 165, and pin 98, to one terminal of the carrying magnet 97 of the corresponding denomination. The other terminal of said magnet being connected by the main battery line 371 to the grounded battery B in the operated position of the main lever 18, said carrying magnet is energized and its armature 362 bridges the contact 366, 367, and said contacts are held in closed position until restored at the end of the computing operation. Thus the No. 1 digit line to the next higher order of the computing switchboard, in the given example the line $1^d$, has its circuit closed at contact 366, 367 so that it will subsequently be grounded through the switch arm 58, and will thus carry one unit to be added to the units of the next higher denomination. In the case of subtraction, the keyboard being shifted in position for subtraction, a circuit from a grounded plunger 93 is extended to the right of Fig. 31, that is in the opposite direction to that described in the case of addition, over the conductor 369 and contact 370 to the pin 98, and from thence to the windings of the carrying magnet as heretofore described. In this case the closure of the contact 366, 367 by the carrying magnet will result in the subtraction of one from the next higher order, since the computing switchboard is in the position for subtraction.

*Storage and clearing devices.*—Under certain conditions it is desirable that numbers accumulated in the machine may be stored therein and the machine cleared so as to present to view only the 0 character bars.

Mounted upon a plate of insulating material 103 are a series of curved contact springs 104, in position to be acted upon and depressed by pins 105 insulatedly carried near the lower ends of the character bars 22 (see Figs. 4, 18 and 2). For purposes of illustration I have shown two horizontal rows of contact springs 104, it being understood that as many rows may be provided as may be deemed desirable. Ordinarily a single row will be all that is required. Mounted parallel to each horizontal row of springs 104 is a reciprocatory bar 106 provided with a series of lateral fingers 107 adapted when the bar is moved to the left of the position shown in Fig. 2 to extend either underneath or above the springs 104, dependent upon whether or not said springs are depressed by the pins 105. When a spring 104 is depressed and the bar 106 reciprocated a finger 107 lies over and makes electrical connection with each of said depressed springs 104. Each reciprocatory bar 106 is adapted to be operated from a rocking shaft 108. Said shaft 108 is in turn adapted to be operated by a storage lever 109 (see Figs. 1 and 20). In the drawings two of these storage levers 109 are shown, each adapted to operate its rocking bar 108 to shift a corresponding reciprocatory bar 106. It will be understood from the previous description of the operation of the character bars that only one spring 104 of a given order for a given storage can be depressed so as to make electrical contact with the finger 107. The remaining fingers 107 lie underneath the remaining springs 104 out of electrical contact therewith. When the numbers represented by the character bars are thus, as it were, locked in storage the character bars may be released so as to clear the machine and the numbers already accumulated in the machine are nevertheless preserved for future operation.

The character bars are released by depressing the clearing key 110, (see Fig. 20). The depression of the clearing key 110 thrusts down the switch lever 111 into engagement with a series of zero terminals 112, there being one zero terminal for each order of digits. Said zero terminals are mounted upon an insulating block 113 and are grounded only when the lever 111 is depressed into contact therewith. It will be understood that from said zero terminal conducting wires extend through the windings of the zero computing magnet 15. While the clearing key is held depressed the main lever 18 is operated. The terminals of the windings of the zero computing magnets 15 being grounded, the operation of the hand lever 18 results in the energization of each of said zero computing magnets, with the resultant operation of the zero character bars. The actuation of the zero character bars releases the remaining character bars, thus presenting to view on the keyboard only the zero targets or dials, and the switchboard is restored to its normal or cleared out condition.

In order that the carrying magnet may not be affected during the operation just described, the main battery line 371, common to the windings of each of said carrying magnets, is adapted to be opened by the depression of the clearing key 110 (see Figs. 20 and 30). It will be noted that said main line extends through two posts 114, 114 which posts are normally bridged by the bridging member 115, insulatedly carried by the plunger of the clearing key 110. Such bridging member is normally held in closed position by the spring 116. It thus appears that the depression of the clearing key 110, in addition to grounding the zero terminals 112, opens the battery line 371 of the carrying magnet and thus prevents any accidental operation of the carrying magnet during the clearing out of the computing switchboards.

The numbers stored in the machine in the manner just described may be brought into computing relation with other numbers subsequently accumulated in the machine by the depression of a storage key 117, (see Figs. 19 and 20). Two such keys 117 are shown, one for each of the reciprocatory bars 106. The depression of a storage key 117 thrusts downward the stem 118 of said key. The lower end of the stem 118 is provided with a diagonally extending slot 119, through which extends a pin 120 carried upon the end of a transversely extending bar 121. At its opposite ends the bar 121 is provided with rollers 122 having bearings in slots provided in bearing plates 123. The actuation of the stem 118 thus results in a slight longitudinal movement of the bar 121. The bar 121 carries a series of wipers 124 corresponding in number to the order of digits adapted to be stored in the machine, (see Figs. 18 and 30). In the operative position of the bar 121 each wiper is adapted to make electrical contact with the end of the reciprocatory bar 106. The bar 121 being grounded on the frame of the machine, each of the strips 106 is thus grounded by the depression of the storage key 117.

The operation of the storage key 117 thus connects to ground the digit lines of the numbers stored in the machine in much the same manner as heretofore described in connection with the grounding of the digit lines by the depression of the digit key. The result attained is the same in either case, that is in the one case a computation is performed with respect to numbers accumulated in the machine, and in the other case with respect to the numbers stored in the storage mechanism. Thus if the number 896 were stored in the machine and subsequently the number 325 were accumulated, these two numbers could be added by the depression of the storage key and other attendant manipulations of the machine, as will hereinafter be more fully described.

*The total key.*—The keyboard of the machine is provided with a total key 125, adapted, when depressed, to ground the line of any number accumulated in the machine and to close the circuit of such digit line through its corresponding recording magnet 71ª, 71ᵇ, etc., and thus to cause, as will hereinafter be explained, the total result of previous operation to be suitably transcribed or recorded. The lower end of the plunger of the total key 125 is provided with a pin 126 adapted, when depressed, to ride over the beveled end of a transverse bar 127 and to move said bar for a slight distance against the tension of the restoring spring 128. (See Figs. 17 and 20). The bar 127 is grounded on the frame of the machine and is provided with a series of wipers 129 adapted in the operative position of said bar 127 to ground the total strips 80ª, 80ᵇ, etc. (See Fig. 45). As hereinbefore stated there is a total strip for each order of digits and hence the bar 127 will be provided with wipers 129 corresponding in number to the total strips to be grounded through said wipers.

The total key, in its depressed position, is adapted to open the circuit of the main line of the computing magnets at contacts 130 controlled by said total key, (see Figs. 20 and 30). However, as may be seen by reference to Fig. 30, and as will be hereinafter more fully set forth, the main line circuit of the recording magnets is closed during the depressed position of the total key through the contact 69, and switch contacts 247, 271 and 179, thus permitting of the energization of the recording magnets 71ª, 71ᵇ, etc.

*Electrical circuits of the computing switchboard arranged according to tables of addition and subtraction.*—As has been hereinbefore stated, the pins in the computing switchboard are located and connected according to tables of addition and subtraction, the one position of the switchboard being for addition and the other for subtraction. The theory underlying such arrangement of the pins may be best explained by reference to diagrams Figs. 14, 15, 30 and 31. In Figs. 15 and 31 the small circles with numerals inclosed therein designate pins, the numeral indicating to which plate of the switchboard the pin is electrically connected. The first level or upper horizontal line of pins represents an incoming No. 1 digit line, the second level of pins an incoming No. 2 digit line, etc., the lowermost level representing an incoming No. 9 digit line. It will be noted that the pins are also grouped into ten vertical groups having two columns in each group, the first or left hand column of each group being for subtraction and the other or right hand column for addition. The first vertical group at the left (Figs. 14, 15 and 31) is the zero group, the second the No. 1 digit group, the third the No. 2 digit group, etc., the last vertical group being the No. 9 digit group. It is obvious that in the case of the first or uppermost level representing the digit line 1 that the adidtion of 1 to the zero represented by the first vertical group will give 1 as the sum; and hence that in this case the digit line should be extended to a pin which is electrically connected to a plate No. 1. This connection is indicated by the numeral 1 inclosed in the circle in the first level of the right hand column of the zero vertical group. In like manner 1 added to 1 gives 2 as a sum, and hence in the corresponding position the second vertical group we find the numeral 2, indicating that the pin is electrically connected to the plate No. 2; etc. throughout the first or uppermost level. In the lowermost level, corresponding to an incoming digit line 9, in the table of addition for the first vertical group we find the numeral 9 in the addition column of that group, thus indicating that the pin is electrically connected to the ninth plate. That this is the case is obvious from the fact that 9 added to the zero represented by the first vertical column gives 9 as the sum. In the addition column of the second vertical group of the lowermost level we find the numeral zero indicating that the pin is electrically connected to the zero plate. That such must be the case is clear from the fact that the digit 9 added to the digit 1, represented by the second vertical group, gives 10 as the sum, that is zero of that particular order and 1 of the next highest order. Thus, in the computing switchboard the pin, in the case last assumed, should be connected to the zero plate. Provisions are made, as has been heretofore described, for carrying the higher order of digit of the sum to the switchboard provided for the next higher denomination of digits. In like manner the remaining connections of the pins for the table of addition is determined.

In a similar manner the pins of the left hand column of each vertical group of pins of the computing switchboard are connected according to a table of subtraction. Thus the uppermost level represents an incoming digit line 1, and the first vertical group, zero. Since the incoming digit 1 is to be subtracted from 0 or, according to the principles of subtraction, from ten, the resulting difference is 9, and hence the pin in the subtraction column of the zero group and No. 1 level is electrically connected to the ninth plate of the computing switchboard, as indicated by the numeral 9 inclosed in the circle. In the same manner the connection of the remaining pins of the switchboard may be determined.

It will be understood that the diagrams Figs. 14, 15, 30 and 31 illustrate a computing switchboard for one denomination of digits only, for example the hundreds order, and that there will be provided in the machine a similar computing switchboard for each order of digits provided for on the keyboard of the machine.

*The denomination switchboard.*—As has been hereinbefore stated, the digit line of grounded through the switch spring 12 of a depressed digit key extends first to the denomination switchboard, from thence to the multiplying switchboard and from thence to the computing switchboard. In the case of addition or subtraction the denomination and multiplying switchboards serve no function other than to extend the line to the computing switchboard of the same denomination.

The object of the denomination switchboard is to switch the connection of a digit line from the digit keys of a given order into higher orders of the computing switchboard. For example, if the digit key 7 in the hundreds row is depressed, thereby extending the hundreds digit line 7 to the denomination switchboard, it can, at this point, be extended through the switchboard without changing its order or it can be switched to any higher order provided for in the machine. If a digit of a given order is to be multiplied by a factor digit of a denomination other than units, the multiplicand is raised by the denomination switchboard as many orders as there are places at the right of the multiplying digit of the multiplier. Thus in multiplying by a digit of the denomination of hundreds, the multiplicand is raised two orders corresponding to multiplying the order of the digit of the multiplicand by hundreds. For example, in multiplying 963 by 251, in multiplying by the digit 5 of the multiplier the multiplicand is raised one order, since the multiplier is five tens; and in multiplying by the digit 2 of the multiplier, the multiplicand is raised two orders, since the multiplying digit 2 is of the hundreds denomination.

The denomination switchboard preferably comprises two stationary vertical panels D and E and an intermediate shiftable vertical panel F. These panels extend transversely of the machine. The panel D comprises a block of insulating material 131 provided on its inner face with nine levels of conductor strips, each level representing a given digit number, the uppermost level representing the digit line 1 and the lowermost the digit line 9. Each level is composed of a plurality of sections, each section representing a given order or denomination of the particular digit represented by that level. For example, referring to Fig. 23, the strip at the right represents units, the next strip to the left thereof tens, etc. The electrical connection from the front of the panel D to the strips on the rear thereof is made through pins 1ª, etc.

The stationary switchboard section E comprises nine transversely extending levels of insulated strips. Each level has a group of eight of such strips, each strip of a given level representing a particular order of a given digit. Each level of strips is provided along its length with pins which extend through the strips of that level, each pin being electrically connected to one particular strip only. By reference to Figs. 22 and 23 it will be noted that the pins of a given level of strips are divided into groups distributed longitudinally of the level, the first group having eight pins, the second seven, the third six, etc. Each pin of a group of pins represents a different denomination. The first or right hand group of eight pins is located in the units order of the machine. The first pin thereof is connected to the units strip, the second pin to the tens strip, the third to the hundreds strip, etc. Each group has a pin connected to the denomination strip of that group and also a pin connected to the denomination strip of each of the higher orders.

The last order, that represented at the left of Fig. 23, has only a single pin connected to the strip representing the highest order. The diagram of connections is shown in Fig. 22, in which the vertical group at the right represents the first order, the next vertical group the second order, etc., the last vertical group representing the eighth order.

The keyboard of the machine shows nine denominations of keys, whereas the denomination switchboard shows only eight vertical groups of pins representing denominations. This, it will be understood, is for convenience of illustration only. The electrical connections from the ninth or highest order of digit keys in such case would extend directly to the computing switchboard, in which case the machine does not provide for multiplying in the highest order.

The shiftable switch panel F consists of a plate of insulating material 132 provided upon its opposite faces with a series of wipers 133, 134 arranged in levels, such wipers being eletrically connected and secured to the plate 132 by pins 135. Each wiper is in sliding contact with the corresponding strip of the fixed panel D, the same wiper making contact with the same strip whatever may be the position of the shiftable panel F. The wipers 133 are each adapted to make contact with one of the pins of the group of pins of the stationary panel E. For example, the uppermost wiper 133, representing the digit line 1 of the units order, (shown at the right of Fig. 23) is adapted to contact with any one of the pins 1ª, 1ᵇ, 1ᶜ, etc., the wiper of the same order representing the digit 2 and located next below is adapted to contact with pins 2ª, 2ᵇ, 2ᶜ, etc. Likewise the wipers 133 for the next higher order are adapted to engage with any one of the pins 1ᵇ, etc., 2ᵇ, etc. The wipers 133 of the last vertical row are adapted to contact only with a single pin 1ʰ, 2ʰ, 3ʰ, etc., as the case may be, this last order not being adapted to be raised to any higher order.

The switch panel E, upon its opposite face, is provided with wipers, there being one wiper for each digit of each denomination. The wipers of the units order or digits are electrically connected to the strips representing the units order of digits, that is to the strips 1ª, 2ª, 3ª, etc; the wipers of the tens order are connected to the strips 1ᵇ, 2ᵇ, etc; and the wipers of the hundreds order are connected to the strips 1ᶜ, 2ᶜ, etc. The wipers are given reference letters indicating their electrical connections.

In the position of the shiftable panel section F, shown in Fig. 23, the digit lines are extended through the denomiation switchboard without any change of denomination. By shifting the section F in the direction indicated by the arrow so as to bring each wiper thereof upon the next succeeding pin, each digit line is adapted thereby to be shifted to the next higher order. This system of connection is shown diagrammatically in Fig. 22.

*The carrying switchboard.*—Next in order after the denomination switchboard is the carrying switchboard, which is located between the denomination and the factor switchboard. This carrying switchboard, as its name indicates, is designed to carry the digit representing that portion of the product which is of a higher order of digits to the digit line of such higher order, for purposes of addition in the computing switchboard. Thus the product of, for example, seven units by four units gives 28 units, that is eight units and two tens. The carrying switchboard takes care of and transfers to the next higher denomination of the computing switchboard the two tens of this product of the factors 7 and 4.

The carrying switchboard comprises a shiftable panel G and a fixed panel H (see Figs. 21 and 23). The panel G comprises two vertical plates of insulating material 136, 136 extending transversely of the machine, between which are held nine levels of conductor strips. Each level of strips is divided into as many sections as there are orders provided for in the multiplying switchboard—in the present case into eight sections. Each strip section over-laps the space allotted in the multiplying switchboard to two denominations, the first strip extending from the units place and overlapping the tens, the second strip extending from the tens place and overlapping the hundreds, etc. On the face of the panel G adjacent the panel E of the denomination switchboard are two pins for each wiper of the panel E adapted, the one or the other, always to make contact with said wipers, irrespective of whether or not the panel G is in its normal or shifted position. Each set of two pins is connected to the same plate. On the opposite face of the panel G are a series of wipers electrically connected by pins to the strips of the panels G. These strips, pins and wipers are designated to indicate the electrical connection according to the plan already described. Two of said latter wipers are connected to each of said strip sections near the opposite ends thereof (see particularly Figs. 23).

The fixed switch panel H consists of nine superposed levels of conductor strips extending transversely of the machine. Each level of strips is divided into as many sections as there are orders provided for, and each section of the level is composed of two parallel portions insulated from each other. As in the case of the strip section of the switch panel G, so the strip sections of the panel H overlap the space of the switchboard allotted to two denominations of digit numbers. On the face adjacent the switch panels G each section of the level is provided with two pins, one of which makes electrical connection with one of said parallel portions of the section and the other of which makes electrical connection with the other parallel portion of the section. One of the two wipers of the adjacent section of the switch panel G is adapted in one position of said panel to contact with one of said pins and the other wiper in the other position of the panel G to contact with the other of said pins. Thus each electrical circuit extended through the panel G is brought out through a wiper which engages with a strip of the panel section H of a given denomination or through a wiper which engages with a strip of the next higher denomination, dependent upon whether or not the switch panel G is operated. The shifting of the connections to the strips of the next higher denomination is for the purpose of carrying, as hereinbefore stated, and the method of further extending the connections through said strips to the computing switchboards will be more fully set forth in connection with the description of the factor switchboard of which said strips form a part.

*The factor switchboard.*—The factor switchboard comprises nine factor switch panels I′, I², I³, etc. Of these all are shiftable except the panel I′. Each of these factor switch panels, except the panel I′, corresponds to a factor key on the keyboard. First in order after the carrying switchboard is the factor switch panel I⁹ which comprises two vertical plates of insulating material 137, 137 extending transversely of the machine and having mounted therebetween nine superposed levels of conductor strips. Each level of strips is divided into a plurality of sections, each of said sections being provided with two adjacent pins which are adapted to make contact with an adjacent wiper of the switch panel H. Two pins are provided in order that this connection may not be broken when the panel I⁹ is shifted. Thus, for each strip section in each level, there is a corresponding wiper upon the adjacent switch panel H. Upon the opposite face of the switch panel I⁹ in each level there are as many wipers as there are strip sections, each wiper being connected to the corresponding strip section. These latter wipers are adapted to continue the connection to the next factor switch panel I⁸.

The factor switch panels I⁸, I⁷, I⁶, I⁵, I⁴, I³ and I² are of similar construction and differ only in the connection of the pins with the plates, the connection of the pins with the plates being according to a table of multiplication, which of course differs for each factor digit. Each of these switch panels comprises insulated plates, there being in each switch-panel nine of such plates for each order provided for in the machine, one plate for each digit number of each denomination. Each of these plates extends vertically from the top to the bottom of the switch panel. On the face of each switch panel are nine levels of pins. In the space allotted to the units denomination there are three pins in each level, two of said pins being connected to the plate corresponding to that level, for example, two of the pins in the first level being connected to the first plate, two of the pins in the second level to the second plate, etc. The third pin is connected according to the table of multiplication, that is to a plate which represents the right hand digit number of the product resulting from multiplying the level or digit line by the factor number represented by the preceding factor switch panel. For example in the first level in the units section of the factor switch panel I⁸, the pin last referred to is connected to the ninth plate as is indicated by the reference character 9ª.

In the space on the switch panel allotted to the tens denomination there are nine plates, eight of which extend the full width of such space and the ninth of which extends over only one-half of such space. The space not occupied by the last mentioned plate is occupied by horizontally extending strips eight in number, there being one strip for each level of digits except the first level. (See Fig. 21). The three pins of the group at the left hand end of the tens section are connected to the same plate as the three pins in the units section, and there will be a similar connection in the space allotted for each denomination.

The three pins at the right hand end of each section allotted to a given denomination are designed for purposes of carrying that portion of the product which in ordinary multiplying operation is carried to the next higher order. Since in the first level, representing the digit number 1, there is nothing to be carried as a result of multiplying 1 by any digit number, the strip and pins are unnecessary and may be omitted. The first two pins at the right hand end are connected to the same strip, the particular strip being dependent upon the particular level or digit line, for example, if it is the digit line 2 or second level, said pair of pins are connected to the corresponding strip number 2. The third pin of the group is connected according to the table of multiplication to represent that portion of the product which is carried to the next higher denomination. For example in the seventh level representing the digits number 7 the first pair of pins in the factor switch panel I⁸ will be connected to strip 7. The remaining pin will be connected to the plate numbered 6, representing that portion of the product resulting from multiplying seven by nine, namely the portion six, which is carried to the next higher denomination. The portion 3 of the product 63 (7 multiplied by 9) is represented by the pin numbered 3, which latter pin is electrically connected to plate number 3. In Fig. 32 there is a diagrammatic representation of the seventh level or digit line 7, showing the connections for that level in the denomination of hundreds. In this diagram the connection of a pin to a strip is indicated by the letter A; thus 7ᴬ indicates that the pin is electrically connected to a strip of that section located in level No. 7. The remaining pins are connected to plates, the numeral indicating the number of the plate to which the pin is connected.

Fig. 34 is a diagrammatic representation for all the digit numbers of any given denomination, except the units. Each of said latter tables indicates a different level of the factor switchboard.

The switch panel I' is in the main similar to the switch panel I², to I⁸ inclusive and differs therefrom mainly in the omission of the carrying strips. These strips are omitted since the factor switch panel I' represents the factor number 1, and the multiplication of that number by any other digit number does not give a product having more than one order of digits, and hence there is no carrying. There being no carrying there are, of course, no carrying strips such as are provided in the remaining panels. The factor switchboard I' is fixed and not shiftable, this being due to the fact that the multiplication of the factor number represented by said switch panel, that is the factor number 1, by any other digit number gives the same product as said latter digit number, and hence this digit number is extended unchanged to the computing switchboard. Since the panel I' is not shiftable, only one pin is required in each level for each denomination to maintain the connection of the plate corresponding to that level to the wiper of the preceding switch panel. There being no carrying strips the pins which, in the preceding factor switch panels, were connected to strips, are omitted from this switch panel.

It will be understood that each plate in each order of each factor switch panel has electrically connected thereto in the corresponding level a pin adapted to be engaged by a wiper of the preceding switch panel. Each of said plates also has electrically connected thereto pins at various levels connected according to the table of multiplication. In the normal or unoperated position of the multiplying switchboard the electrical circuit is extended through the switchboard on the same level to a corresponding digit line of the computing switchboard. That is, for example, if a circuit is extended to the seventh level of the multiplying switchboard, and none of the switch panels thereof are moved from their normal position, such circuit is extended through the factor switchboard through the pins in the seventh level, by means of the seventh plate and is thus brought out to digit line seven. However, when two factor numbers are to be multiplied together, as for example the factor 4 by the factor seven, the digit line 7 will be extended along the seventh level as hereinbefore described to the switch panel I⁴. This panel being shifted, we have the connection thenceforth representing the product of seven times four, that is 28. Hence the connection is shifted from the seventh to the eighth digit line, there being a pin in the seventh level adapted when the panel is shifted to connect the wiper of the seventh level to the eighth plate, which plate, as has been stated, has a pin provided in the eighth level. The connection is thus extended in the eighth level to the computing switchboard. The method of carrying the two, the other portion of the product of seven by four, to the next higher order has already been described.

By reference to Figs. 17, 24 and 29 it will be seen that the several switch panels of the multiplying switchboard are supported in proper relation to each other by a plurality of bars 138 mounted upon the casing of the machine.

*The means for switching the multiplying switchboard.*—The means for shifting the various panel sections of the multiplying switchboard will now be described.

In the denomination switchboard the two panels D and E are fixed and the intermediate panel F is shiftable as hereinbefore stated. The means for shifting the panel F is most clearly shown in Figs. 24, 28 and 29. Extending through the front portion of the casing K of the machine is a shaft 139 to which is connected the denomination lever 140. The shaft 139 carries a crank lever 141, the other end of which is pivoted at 142 to the panel section F. The depression of the denomination lever 140 will therefore shift the panel section F in the direction indicated in the arrow in Fig. 29. The extent of the movement of the switch panel F may be controlled by the stops 143 carried upon the lower ends of the plungers 144 of the factor keys 145. The switch panel F is provided at its top edge with stop lugs 146, and the depression of a key 145 brings a stop 143 in the path of movement of a stop lug 146 and thus determines the extent of movement of the switch panel F.

In Fig. 28 the lever 140 is shown in position for multiplying by factor numbers of the units or first order. By merely depressing the lever 140 it will be brought into position for multiplying by a factor of the second or tens order, it being automatically stopped in said position by the engagement of a pawl 147, pivotally carried by the hand lever 140, with the first tooth of a segmental rack 148 mounted upon the exterior of the casing K. To multiply by a factor number of an order higher than the second order, the appropriate key 145 is depressed to move a stop 143 into the path of movement of a lug 146 of the factor switchboard. For example, if the factor multiplier is a digit of the hundreds order, the depression of number 3 factor key 145 will set the stop for the third or hundreds order. The depression of the No. 4 factor key 145 will set the stop for positioning the factor switch panel properly for multiplying by factor multipliers of the fourth or thousands order, etc. After the proper key 145 is depressed, the lever 140 is operated and the pawl 147 is at the same time moved into position to ride over the teeth of the rack 148. This operation of the lever 140 rocks the shaft 139 transmitting the motion through the lever 141 to the switch panel F, moving the same in the direction shown by the arrow until one of the stops 146 thereof comes into engagement with the stop 143 upon the plunger of the depressed key 145.

The restoration of the switch panel F may be effected either manually, by lifting the lever 140, or automatically as an incident to the operation of multiplication. In other words, if the operation is that of multiplication the switch panel F for each complete cycle of operation of the lever 18 is stepped back to the position of the next lower order of digits of the computing switchboard. The manual restoration of the switch panel F is provided for operations involving division. This restoration of the switch panel will be hereinafter more fully described in connection with the operations to which they are incident or of which they form a part.

In the case of multiplication, next in sequence after the setting of the denomination switchboard, is the operation of the multiplying lever 149. (See Fig. 20.) The manipulation of this lever rocks the shaft 150.

The shaft 150 carries a crank 151, the upper end of which is pivoted by a slotted connection 152 to a shiftable bar 153, supported in guide brackets 160 mounted on the interior casing of the machine. The opposite end of the bar 153 is in the path of the upper arm 47$^a$ of the lever 47 and hence the longitudinal movement of the bar 153 rocks said lever 47$^a$ and carries the same out of engagement with the bar 49, thus permitting of the rocking of the shaft 48 without effecting the shifting of the bar 49.

Secured to the shaft 150 is a crank lever 161 to which is pivoted a link 162, the other end of which is pivoted to crank lever 163 carried by the rock shaft 164. Distributed on the shaft 164 and insulatedly mounted thereon are a series of switches 165, each having two arms adapted to contact with posts 166, 167 and 168. By reference to diagram Fig. 31 it will be noted that the post 167 is adapted to be electrically connected to one terminal of the carrying magnet 97 of the computing switchboard and that the post is electrically connected to one terminal of the winding of the magnet of the converted unit accumulator. (See also Fig. 33). It will thus be seen that the switch 165 may be thrown to extend the circuit for carrying purposes either to the carrying magnets of the computing switchboard or to the magnets of the converted units accumulator. There is a switch 165 for each order of digits provided for in the machine except the first order, there being, therefore, in the machine illustrated seven of the switches 165. Also pivoted to the end of the link 162 is a link 169, the upper end of which is pivoted to a crank lever 170 carried by the rock shaft 171. Insulatedly mounted on the shaft 171 are a series of levers 172 adapted to make contact with the posts 173, 174, 175. The switches 172 are provided in order that in the case of multiplication, the conductor 77 may be grounded both on the forward and on the reverse stroke of the lever 18. As heretofore described at the end of the forward stroke of the lever 18 the switch 58 is removed from the contact post 61 to the post 60, thus removing the ground from the conductors 77. The switches 172 provide means in the case of multiplication for maintaining ground upon the conductor after the switch lever 58 has been moved to the post 60. By reference to Fig. 30 it will be seen that when both of switches 58 and 174 are shifted from the position shown the conductor 77 will be grounded through the contact post 173, switch 172, contact posts 174 and 161 and switch arm 58.

In the case of addition and subtraction the switch 172 also serves to ground, on the reverse stroke of the lever 18, the digit line 1 or the next higher order of the computing switchboard. Such ground connections, as indicated in Fig. 30, is made through the switch arm 58, post 60, the arms of the switch lever 172, in its unoperated position which are then in engagement with the contact post 174 and 175. The line 1 of the next higher order of the computing switchboard is electrically connected to the post 175 and is thus grounded. The machine is provided in the present case with seven switches 172, the capacity of the machine requiring this number of switches in order to take care of the operations possible on the machine.

An insulated pin (see Fig. 20) carried by the lever 149 extends through a slot 177 in the casing of the machine and projects between the forks of a switch 178. The switch 178 is adapted to control the circuit connections through the contact posts 179, 180, and 181. Normally a circuit is completed by said switch 178 through the posts 179 and 180. Therefore, in the operation of the lever 149 a circuit is bridged by the switch 178 between the contact posts 180 and 181. By reference to Fig. 30 it will be seen that one terminal of the denomination magnet 182 is connected to contact post 181, and that normally the post 180 is connected through contact strip 69 to one pole of the battery B. It will also be noted that normally the other terminal of the winding of the denomination magnet is connected to the opposite pole of the battery B. Therefore, when the switch lever 178 is operated by the multiplying lever 149, thereby bridging the posts 180, 181, the circuit for the denomination magnet is completed through battery, and hence said magnet is energized.

Upon the energization of the denomination magnet 182 its armature 183 is attracted. (See Fig. 29). The armature 183 is carried upon one end of a pawl 184 which is pivoted to a rocking arm 185. The energization of the magnet 182 thus raises the end of the pawl and brings said pawl into engagement with one of the teeth 186 of the switch panel F, and said panel is thus adapted to be shifted back one step, that is to the next lower order, by the next operation of the main lever 18.

In the operation of multiplication next in order is the operation of the factor key 145 representing the highest order of digits in the multiplier factor. Each factor key has insulatedly mounted upon its plunger a switch member 187 adapted in the depressed position of the key to bridge one of the contact posts 188 with a corresponding post 189, 189$^x$, 189$^y$, etc. (See Fig. 32). The posts 188 are electrically connected to the common strip 190 which is grounded on the frame of the machine. The posts 189, 189$^x$, etc., are insulated from each other and from said strip 190. By reference to Fig. 32 it will be seen that the depression of a factor key 145 thus grounds one terminal of the corresponding factor magnet 191. The other terminal of the winding of each of said factor magnets is connected to a common conductor 192 which is permanently connected to the contact segment 69. It will thus be seen that in the first part of the forward stroke of the main lever 18, the circuit from the factor magnet 191, one terminal of which has been grounded by the factor key, will be extended through the contact segment 69, spring 68 to one pole of the battery B, the other pole of which is grounded at this stage of the operation of the lever 18 through the contact segments 53$^x$, 66 and 53 and the lever 18. The closure of this circuit results in the energization of the factor magnet 191 which thereupon attracts its armature 193 and brings the hooked end 194 thereof down into the path of movement of the bar 195 secured at its opposite ends to the rocking arms 185. (See Fig. 17). The arms 185 are secured to the rock shaft 196 which has bearings in the opposite ends of the casing of the machine.

The shaft 196 is adapted to be actuated from the main shaft 26 (see Fig. 3). Said shaft 196 carries a short crank lever 197 provided at its end with a roller 198 fitting between guide cams 199 carried by the shaft 26. The guide cams 199 are so arranged that during the movement of the lever 18 over the contact segment 69, the shaft 196 is rocked for a slight distance. The bar 195 thereupon carries with it that armature 193 which has been energized and thus shifts the selected factor switch panel a sufficient distance to move the wipers carried thereby from the pins of the switch panel with which they are normally engaged to adjacent pins on the same panels, thus shifting digit lines into lines representing product, as has been heretofore described. The ends 194 of the armatures not attracted project against a stop bar 200 and thus prevent any accidental shifting of the factor switch panels.

During the forward stroke of the main lever 18 the computing switchboard adds the units of the product which have thus been extended from the digit keys through the multiplying switchboard to the computing switchboard. On the reverse stroke of the main lever 18 the tens of the product, carried by the carrying switchboard into the next higher order of units, are added.

The carrying switchboard G has secured thereto a block 156 to which is pivotally connected by a pin 154 a rock arm 159. Said rock arm is secured to a rock shaft 48 the operation of which is thus adapted to shift the switchboard G. Said shaft 48 is adapted to be rocked from the main lever 18 through the main shaft 26, crank 27, rod 28, lever 29, rock shaft 30, rock lever 29$^x$ carried by said shaft 30 (see Fig. 17), roller 45 carried by the rock shaft 29$^x$ and cam 201 carried by the shaft 48. As hereinbefore described the operation of the lever 18 results in the rocking of the rock shaft 29$^x$. The rock shaft 29$^x$ carries at one end the roller 45, which roller engages the cam surface of a cam 201 carried by the shaft 48. At about the middle of the stroke of the lever 18 the roller 45 so engages the cam 201 as to rock the shaft 48 and thus to shift the carrying switch panel G, (see Figs. 17, 20 and 24). On the reverse stroke of the main lever 18 the operation is reversed, the switch panel G being reset to its normal position. The return stroke of the main lever 18 also resets the factor switch panel, which has been shifted, and also the denomination switch panel F. The resetting of said panels is due to the rocking lever 185 which is restored to its normal position at the end of the return stroke of the main lever, the cam guides 199 in such reverse stroke rocking the shaft 196 in the opposite direction. Secured to the upper ends of the rocking levers 185 is a U-shaped bar 202, the base of said bar being in engagement with the ends of the factor switch panels. Therefore in the return of the rocking levers 185 the bar 202 pushes before it the factor switch panel which has been shifted and thus restores it to its normal position.

Near the end of the return stroke of the lever 18, during the time the contact spring 68 is in contact with the contact segment 69, the denomination magnet 182 is energized in the manner heretofore described and the pawl 184 is in engagement with a tooth 186 of the factor switch-board. It is during this portion of the stroke of the main lever 18 that the rocking arms 185 are given a return movement. Thus the pawl 184 carried by the arm 185 pushes the denomination switch panel F back a distance corresponding to one tooth, that is it automatically resets said panel to the next lower denomination.

*The converted units accumulator.*—The operation of the main lever 18 during a multiplying operation also accomplishes another function in connection with the converted units accumulator, which function will now be described.

As has been heretofore described, the operation of the multiplying lever results in the actuation of the switches 165 and said switches are moved into position to open the circuit to the carrying magnets 97 and to close the circuit between contact posts 167 and 168. These switches remain in this latter position until the multiplying lever is restored to normal at the end of the multiplying operation. By reference to diagram Fig. 33, it will be noted that one terminal of each of the converted units accumulator magnets 203ª 203ᵇ etc. are connected through a common conductor 204 to one pole of the battery B. The remaining terminals of the windings of said magnets are each connected to a terminal post 168. Extending from the terminal posts 167 are the conductors 205ª, 205ᵇ, 205ᶜ, etc., the index letter indicating the denomination of the computing switchboard from which said line is extended to the terminal post 167. For example, the line number 205ᶜ is one from the computing switchboard of the hundreds denomination of digits.

As has heretofore been described, when the addition of digit numbers in the computing switchboard results in a sum greater than 9, the tens portion of that sum is, where addition only is involved, carried to the next higher order by the carrying magnet 97. In the case of addition, on the forward stroke of the main lever 18, the numbers are added to obtain the sub-sum resulting merely from the addition of the digits of the several orders, and the carried digits are added to this sub-sum during the return stroke of the lever 18. In the case of multiplication, on the forward stroke of the lever 18, the units of the product are computed on the computing switchboard of the corresponding order, and on the return stroke the tens of the product are computed, thus giving a sub-sum resulting from the addition of the tens and the units. To this sub-sum must be added the units, if any, which are to be carried as the result of the addition. The converted units accumulator is provided to accumulate or take care of the latter or converted units. For example assume that the number 789 is accumulated in the machine and that to this is to be added the product of four times 63. On the forward stroke of the main lever 18, the units of the product, (that is the 2 of the 12 resulting from multiplying 3 by 4 and the 4 of the 24 resulting from the multiplying 6 by 4) are added to 789, thus 789+42, giving a sub-sum of 721 with 1 unit accumulated in the tens converted units accumulator and one unit accumulated in the hundreds converted units accumulator. On the return stroke of the main lever the tens of the above mentioned products are added to this sub-sum, thus

```
    721
     21
    ---
    931
```

To this last sub-sum must be added, in the manner to be presently described, the converted units, that is the 1 tens and the 1 hundreds, thus

```
    931
     11
    ----
   1041
```

The energization of the converted accumulator magnet 203 is brought about by the grounding of the corresponding conductor 205ª, 205ᵇ, etc., in the same way that the circuits of the carrying magnet 97 were closed. In short, in the case of multiplication the carrying of the converted units is through the magnets 203 which are thus substituted for the carrying magnets 97.

As has heretofore been stated, in the forward stroke of the lever 18 the circuits for the computing magnets 15 are closed when the hand lever is in position so that the two contact springs carried thereby are in engagement with the strips 70 and 53 respectively. It is during this portion of the stroke, therefore, that the line 205ª, 205ᵇ, 205ᶜ, etc., as the case may be, is grounded for carrying purposes, as already described in the case of addition, this ground connection being extended by the switches 165 to one terminal of the winding of a converted units magnet 203, the other terminal of which, as before stated, is connected to one pole of the battery B. The opposite pole of said battery is grounded, as shown in Fig. 30, while the hand lever 18 is over contact segment 53 in the forward stroke of the lever. A circuit being thus completed for the magnet 203, said magnet attracts its armature 206.

The armatures 206 of the magnets 203 are pivoted on brackets 207 mounted on a U-shaped bar 208 which extends transversely of the machine, and the arms of which are pivoted to the shaft 210. Each of the armatures 206 is extended to provide a stepping pawl 211 adapted, in the actuated position of said armature, to engage a tooth upon the corresponding segmental rack 212. Each of the racks 212 is loosely mounted upon the shaft 210, and is normally held in its elevated position by a spring 213.

The bar 208 is adapted to be oscillated from the lever 29ˣ (see Figs. 2, 17 and 24). Pivoted upon the end of the lever 29ˣ by the pivot pin 214 is the link 215 pivoted at its opposite end to a lever 216. The lever 216 rocks about the pivot 217, and is pivoted at its upper end to a link 218, the opposite end of which is pivoted to the bar 208. The link 215 is also provided with a roller 219 journaled upon the pivot 214. The roller 219 bears against the face of the inclined wall 31 and thus guides the longitudinal movement of the link 215 to rock the lever 216. As has been stated the lever 29ˣ is operated from the main lever 18. The end of the lever carrying the roller 219 is raised from its lowest to its highest position during the forward stroke of the main lever 18. The links are so assembled that a line drawn from the pivot 220 perpendicular to the wall 31 would mark the middle point of the travel of the roller 219 over the surface of said wall. It will thus be seen that during the first half of the upward movement of said roller 219 the link 215 is pushed in a longitudinal direction and through the lever 216 and link 218 pulls upon the bar 208. The parts are so constructed that this movement of the bar 208 is sufficient to carry the segment 212 a distance equivalent to the space of one of its teeth.

During the remaining half of the upward travel of the roller 219, the lever 215 is carried longitudinally in the opposite direction and the bar 208 is carried back to its initial position. It will be understood that this movement of the bar 208 begins while the magnet 203 is energized, and the armature 206 attracted. After the stepping pawl 211 is thus brought into hooked engagement with the teeth of the segment 212, it is retained in such relation by the pulling action exerted on the bar 208 during the remaining portion of the forward stroke of the lever 18. The magnet 203, however, becomes deënergized when the lever 18 moves off of contact strip 53. It thus appears that the segment 212 by this forward movement of the main lever 18 is, in the case of an energized magnet 203, stepped forward one tooth.

The segment 212 is provided with a retaining pawl 221 which is normally held by the spring 222 in engagement with the teeth of the segment 212, thus holding said segment against the tension of the spring 213, in the position to which it is stepped by the stepping pawl 221.

During the return stroke of the main lever 18 the roller 219 is caused to travel downward over the surface of the wall 31 to its initial position. During such travel downward of said roller, the bar 208 is again operated in the manner just described, and steps forward one step any segment 212 corresponding to a magnet 203 which may have become energized by the operations taking place in the computing switchboard during such return stroke of the lever. As hereinbefore stated, in the case of multiplication, during such return stroke of the main lever the tens of the product are computed.

Mounted adjacent to and in parallel relation with each of the segmental racks 212 is a sector block 223 of insulating material. For convenience said blocks may be mounted on the fixed shaft 210 as shown most clearly in Fig. 27. Each of said blocks 223 is provided with an arc-shaped row 224 of contact posts. In order to indicate digits and order of digits these several pins in the diagram Fig. 33 are numbered according to the plan already described, that is for units of the first order said pins are given the reference characters $1^a$, $2^a$, $3^a$, etc., those of the second or tens order the reference characters $1^b$, $2^b$, etc., and those of the third or hundreds order the reference letters $1^c$, $2^c$, $3^c$, etc.

Mounted upon each of the blocks 223 is an arc-shaped contact strip 225. Each of the pivoted segmental racks 212 carries on its radial arm 226 an insulated switch lever 227, the inner end of which is in permanent sliding engagement with the contact strip 225. The radially outer end of the switch lever 227 is thus adapted to move over and make contact successively with one of the pins of the row of pins 224, dependent upon the position to which the segmental rack 212 has been set.

The several segmental contact strips 225 are adapted to be grounded through a bar 228 which extends transversely of the machine through the insulating blocks 223. Adjacent each of the strips 225 the bar 228 is provided with a finger 229 adapted when the bar is shifted to the left of the position shown in Fig. 25 to make contact with the strips 225. The bar 228 is grounded on the frame of the machine and when thus reciprocated connects each of the strips 225 to ground. Extending from the posts 224 to the denomination switchboard are lines corresponding to the several digits of each denomination. These lines are numbered in Fig. 33 to indicate the digits and the order thereof. The grounding of any one of said lines through the bar 228 places ground upon the corresponding pin in the denomination switchboard, and the circuit is then extended without further change to the computing switchboard where the units accumulated in the converted units accumulator are added to the last sub-sum by the operation of the main lever 18 as in ordinary addition.

The shifting of the bar 228 to ground the lines leading from the converted units accumulator is done only after the multiplying lever 149 is restored to normal position, such restoration being performed manually. The shifting of the bar 228 is accomplished through the medium of push knob 232. Pivoted to the plunger of said knob is one end of a lever 233, the opposite end of which is pivoted to the bar 228, said lever being pivoted intermediate its ends upon a bracket 234. Incidental to the manipulation of the push knob 232 is the restoration of the finger keys 10 restored by the movement of the bar 49 in the manner already described. To restore the segmental racks 212 to normal a restoring lever 235 is provided. The operation of said lever rocks a bar 236 extending transversely of the machine and journaled in the casing thereof (see Fig. 28). Said bar is provided with a series of fingers 237 adapted, when the bar is locked from its normal position, to engage the retaining pawls 221 and release the same from engagement with the teeth of the segmental racks 212. Thereupon said racks are restored to their normal position by the springs 213.

*Division.*—In the operation of division, the dividend is first accumulated in the machine and is represented on the keyboard by the character bars. The computing switchboard is set for subtraction by operating the subtracting lever 89 as has already been described. The divisor is then represented on the keyboard by depressed digit keys. Next in order is the operation of the dividing lever 238 to prepare the machine for division. The denomination switchboard is then set to bring the divisor to a denomination corresponding to the dividend. The main lever 18 is then operated, and since the computing switchboard is set for subtraction, each operation of the lever 18 results in the subtraction of the divisor from the dividend, and this is continued until the remainder for the particular denomination being divided, shown on the character bars, is less than the divisor. The denomination switchboard is then reset to the next lower denomination in which the operation of division is to be performed. This operation is continued until the division is completed. The quotient will be accumulated on the converted units accumulator and the remainder, if any, will be shown on the character bars. The mechanism for accomplishing these functions will now be described.

The dividing lever 238 (see Figs. 1 and 16) is pivoted at 239 on the exterior of the casing K of the machine. One end of said lever 238 is provided with an arc shaped cam 240 having a curvature eccentric of the pivot 239. The casing of the machine is provided with a slot 241 through which projects a pin 242 which rides over the cam surface 240. The pin 242 is carried upon the upper end of the bar $47^x$ and hence when the handle 243 of the lever 238 is depressed the bar $47^x$ is moved out of engagement with the bar 49. The bar 49 is released from the bar $47^x$ in order that the operation of the main lever 18 may not result in the release of the digit key 10, since it is necessary that said keys remain depressed during the entire operation of division.

The dividing lever 238 carries upon its inner face upon the opposite sides of its pivotal point two switches 244, 245, the former of which controls the circuit to the recording magnets and the latter of which controls the circuit to the magnets of the converted units accumulator. In the normal position of the lever 238 the switch 244 bridges the contacts 246, 247 and closes a circuit at this point from one pole of the battery through the switch lever 72 to the recording magnets 71 during the movement of the main lever 18 over the contact strip 69 (see Fig. 30). In the case of division it is not desired to record for each stroke of the main lever 18, and hence the switch 244 is designed to open the circuit to the recording magnet upon the operation of the dividing lever.

The switch 245 is adapted, in the depressed position of the dividing lever 238 to bridge the contact posts 248, 249 (see Figs. 16 and 22), and thus to prepare the circuits of the converted units accumulator magnets 203 for closure upon the subsequent operation of the main lever 18. The denomination switchboard may be set in the case of division in much the same manner as has been heretofore described in the case of multiplication. In the case of multiplication, however, the denomination magnet 182 is energized to reset the denomination switchboard at the end of each operation of the main lever. It is obvious, however, that in the case of division, in which the main lever may have to be operated a number of times to obtain the quotient, it is necessary that the denomination switchboard may remain set until the particular digit of the quotient is obtaitned. Therefore, the circuit of the denomtination magnet is closed only in the case of multiplication, and other means are provided for resetting the denomination switchboard in the case of division. For example, assume that the number 896, appearing on the character bars of the keyboard, is to be divided by nine represented by the depressed No. 9 units key. Since 9 is not divisible into 8 the denomination switchboard is set to the denomination of tens in order that the 9 may be divided into 89 tens. The denomination lever 140 is set just as in the case of multiplication, in this instance, being moved down until the pawl 147 engages with the tooth of the rack 148 which thus sets the denomination switchboard for the tens denomination. The main lever 18 is then operated and for the first operation subtracts 9 tens from the 89 tens shown on the keyboard, the corresponding character bars then showing 80 tens. The second operation subtracts 9 tens from 80 tens leaving 71 tens on the keyboard, and this operation is repeated, the main lever 18 being successively operated until there appears, in the corresponding denomination of the keyboard character bars, a digit number of less value than the divisor 9. The number of times that the main lever 18 has been operated, in the example assumed 9 times, is registered on the converted units accumulator as will be presently described. The remainder, in the case assumed 8, appears on the tens character bar.

The denomination switchboard at the end of this first dividing operation above described is set for the next denomination in which division is to be performed. In the case assumed, it is restored by hand to the first or units denomination. The 86 units now remaining on the character bars in the example assumed are then divided by the divisor 9 in the same manner as already described, the quotient 9 of this latter dividing operation being registered on the units denomination of the converted units accumulator and the final remainder 5 appearing on the units character bar of the keyboard.

The lever 140 is preferably provided with a pawl 147 engaging with the teeth of a rack 148. A spring 250 normally holds the pawl in position to engage the teeth of the rack 148.

When the denomination lever 140 has been set in the manner hereinbefore described, to the hundreds or any higher order, and it is desired to reset it to a lower order it may merely be raised manually, the pawl 147 riding over the teeth of the rack 148. The click resulting from the riding of the pawl 147 over a tooth indicates the setting of the lever to the next lower denomination. Moreover the casing of the machine is provided with a row of figures 251 so positioned as to indicate in connection with the lever 140, the denomination to which the denomination switchboard is set. In Fig. 28 the numeral 1 is visible above the lever 140 and indicates that the denomination switchboard is set at the first or units order, its normal position.

At the end of the forward stroke of the main lever 18 a contact 252 carried by the lever 29$^x$ engages with an insulated contact spring 253 and thus grounds said spring through said lever. The spring 253 is connected by a wire to the post 248 (see Fig. 33). As has been heretofore stated the operation of the dividing lever 238 moves the switch 245 so that it bridges the contacts 248, 249. The contact post 249 is electrically connected to a contact strip 254 mounted upon insulating blocks 255. Also mounted on said blocks 255 is a row of pins 256$^a$, 256$^b$, etc., electrically connected to the corresponding magnets 203$^a$, 203$^b$, etc. For example, by reference to Fig. 33 it will be noted that the pin 256$^c$ is connected to a wire 257$^b$ through the post 168 to one terminal of the winding of the hundreds accumulator magnet 203$^c$, the other terminal of which, as has been heretofore stated is permanently connected to one pole of the battery B.

The shiftable panel section F of the denomination switchboard is provided on its lower edge with a wiper 258, one end of which is in sliding engagement with the contact 254 and the other end of which is adapted to engage with one or the other of the pins 256$^a$, 256$^b$, etc., (see Figs. 29 and 33). Thus the setting of the denomination switchboard to the hundreds denomination closes a circuit from battery over conductor 204 through magnet 203$^c$ to conductor 257$^c$, pin 256$^c$, switch 258, contact 254, contacts 249, switch 245, closed in the operation of the dividing lever, contact 253 grounded while the main lever 18 is at the end of its forward stroke. One pole of the battery B is thus grounded through the magnet 203$^c$ at the end of the forward stroke of the main lever 18. By reference to the diagram Fig. 30 it will be noted that in this latter position of the main lever 18 the opposite pole of said battery is grounded through the contact strips 53$^x$, pin 55 and lever 18. The magnet 203$^c$ is thus energized and attracts its armature 206 for each operation of the main lever 18, thus stepping the segmental rack 212 forward one tooth for each operation of said main lever. The number of times, therefore, that the lever is operated for each denomination, during the operation of division, is accumulated on the converted units accumulator. As is shown in Fig. 28, the upper half of the segment 212 is provided with digit numbers, one of which is visible through an opening 260 in the keyboard, the number visible indicating the number accumulated on the accumulator. The quotient having been thus accumulated in the converted units accumulator, the dividing lever 238 is restored to its initial or normal position by pushing down on the handle 259, and in case the denomination lever is not already at normal it also is reset to normal. By simultaneously operating the non-computing key 261 and the push knob 232, the circuits shown in Fig. 33 extending from the converted units accumulator to the denomination switchboard are grounded in the manner hereinbefore described. The operation of the non-computing key is to prevent the operation of the computing magnets by opening the circuit to the computing switchboard, the circuits being merely extended in this case from the denomination switchboard to the recording magnets, as will be more fully described hereinafter.

*The recording mechanism.*—The recording mechanism of the machine is under the control of the main lever 18. The circuits to the recording magnets 71$^a$, 71$^b$, 71$^c$, etc. are also under the control of the multiplying lever and the dividing lever, as has already been described, in order that the operation of the main lever 18 in the several steps involved in the act of multiplying and dividing will not affect the recording mechanism. The circuits of the recording magnets are also controlled by a non-recording key, which, when thrown, will prevent the operation of the recording mechanism. Unless, however, either the multiplying lever, the dividing lever or non-recording key is operated, the actuation of the main lever 18 will, on the forward stroke of said lever, while the contact is made with the contact segment 69, close a lead from the battery B, at this time grounded, to a switch arm 72ᵃ, 72ᵇ, etc., as the case may be, which as before stated controls the contacts leading to the respective terminals of the recording magnets 71ᵃ, 71ᵇ, etc., respectively. The energization of the recording magnets will therefore depend upon the grounding of the other terminals of their windings. Said other terminals of the windings of the recording magnets may be grounded in either one of the following ways: (1) By simply operating the digit keys 10, the machine both computes and records each separate item as written on said keys; (2) by grounding the total line 80 by depressing the total key 125, in the manner hereinbefore described, thereby opening the circuits to the computing magnets and closing the circuits for the recording magnets for recording the final results accumulated on the character bars; (3) by throwing the non-computing key 261 and grounding, in the manner hereinbefore described, the lines leading from the converted units accumulator to the denomination switchboard, thereby recording the quotient resulting from a division performed upon the machine; and (4) by throwing the non-computing key and then grounding the bar 121 to record the numbers held in storage in the machine.

As has been described, the main shaft 26 is provided with a finger 75 (see Fig. 35) which normally holds the lever 72 in its elevated position so that the switch arms 72ᵃ, 72ᵇ, 72ᶜ, etc. thereof are closed in contact with the sets of spring contacts 73ᵃ, 73ᵇ, etc. At each of the opposite sides of the machine is a lever 72 pivotally mounted upon the frame of the machine and insulated therefrom. The levers are joined by a cross bar 25 from which extend the switch arms 72ᵃ, 72ᵇ, etc. (See Fig. 46.) It thus appears that the operation of the shaft 26 removes the finger 75 away from engagement with the switch arm 72ᵃ to permit of the spring 76 moving the lever 72 and thus operating each of the switch arms 72ᵃ, 72ᵇ, etc. As has been heretofore stated, the said switch arm 72ᵃ, 72ᵇ, etc. are held closed against the sets of contacts 73ᵃ, 73ᵇ, etc., respectively, during the time that the main lever 18 is over the contact segment 69. During this portion of the stroke of the lever 18, a circuit is closed (see Fig. 30) from the battery B through the spring 68, contact segment 69, the conductor which includes the contacts closed by the dividing lever, the non-recording lever and the multiplying lever to the several switch arms 72ᵃ, 72ᵇ, etc., from thence through the contacts 73ᵃ, 73ᵇ, etc., respectively, to one terminal of the windings of the respective recording magnets 71ᵃ, 71ᵇ, etc. In case the other terminal of the winding of any of these magnets is grounded in any one of the four ways above mentioned, the circuit of such magnet is complete, since the other pole of the battery B is grounded through the lever 18 in the manner heretofore described. Thereupon such recording magnet is energized and attracts its armature 262ᵃ, 262ᵇ, etc., as the case may be. There are nine recording magnets 71ᵃ, nine recording magnets 71ᵇ, etc., there being nine magnets for each denomination provided for in the machine, each magnet of a denomination corresponding to a given digit key. The armature of each recording magnet forms a downward extension of a sliding bar 263, (see Figs. 35, 35ᴬ and 36), there being as many bars 263 as there are recording magnets, that is, in the present case, eighty-one. Each of said bars 263 is provided on its upper edge with a plurality of stops 264 adapted, when the bar is moved longitudinally, to be brought into the path of movement of the lower end of a pivoted arm 265. In the present case there are four stops 264 on each of the bars 263.

Mounted upon the insulating spool heads of each row of magnets representing a given denomination is a metallic strip 266 (see Fig. 37) provided upon its outer face with upstanding lips 267 punched from the surface of the strip. In the attracted position of the armature of the recording magnet said armature makes contact with the corresponding lip 267. By reference to diagram Fig. 30 it will be noted that the strips 266 are each electrically connected by a conductor 268 with one terminal of the winding of the corresponding printing-controlling magnet 269ᵃ, 269ᵇ, etc., there being one of said magnets for each denomination of digits. It will be noted that the bars 263 are grounded on the frame of the machine, and hence, when a recording magnet of any given denomination is actuated, a circuit is closed (see Fig. 30) from ground through the armature of such magnet strip 266, conductor 268, winding of the corresponding printing-controlling magnet, to a common conductor 270. The conductor 270 extends to the main line 372. Therefore the printing-controlling magnet whose circuit is thus extended to the strip 69 has, while the main lever 18 is over the strip 69, its circuit completed through the battery B. The magnets 269ᵃ, 269ᵇ, etc., when energized, attract their armatures 272ᵃ, 272ᵇ, etc., respectively.

Each of the armatures 272<sup>b</sup>, 272<sup>c</sup>, etc., is adapted, when attracted, to ground the terminal of the winding of the magnet 269<sup>a</sup>, 269<sup>b</sup>, etc., respectively, of the next lower denomination to automatically record zeros for such lower denomination in case there are no recording magets energized for recording characteristic units in said lower denomination or denominations. By reference to Fig. 30 it will be seen that the energization of the magnet 269<sup>e</sup> brings its armature 279<sup>e</sup> against the contact 323 thereby grounding one terminal of the magnet 269<sup>d</sup>, whose circuit being thus completed in turn attracts its armature and completes the circuit of the next lower magnet 269<sup>e</sup>, etc. The energization of the magnets of the lower orders for thus automatically recording zeros may be interrupted, if desired, by a switch 324 provided with an operating handle 325 (see Figs. 1 and 30). In the drawings only one of said switches 324 is shown, but it will be understood that as many may be provided as may be deemed desirable for the particular use for which the machine is designed.

The armatures 272<sup>a</sup>, etc., each forms the downward extension of a longitudinally movable bar 273, similar in structure and mounting to the bars 263 (see Figs. 35 and 39). Each of the bars 273 is provided with upstanding lugs 274 which normally hold the pivoted links 275 in elevated position. The links 275 are each formed of a strip of metal bent upon itself. One end of each of said links is provided with a downwardly extending hook 277 adapted to engage with the operating bar 276. The ends of the strip from which each link 275 is formed are pivoted to a swinging arm 278, there being two of said arms for carrying each of the type wheels 279. Each of the arms 278 is loosely pivoted on a fixed shaft 280 which extends transversely of the machine. Thus the type wheels 279 are adapted to be swung about the shaft 280 as the pivotal center when the links 275 are engaged and operated by the operating bar 276, such bar being under the control of the main lever 18, as will be presently described.

It will be understood that there must be a type wheel 279 for each denomination of digits represented in the machine and since the machine in the drawing represents nine denominations, there must be nine of said type wheels 279 to constitute one complete set or group of printing mechanism. This group of type mechanism may be duplicated if desired and in the drawings four such groups of printing mechanisms are shown.

Each of the type wheels 279 is provided on its periphery with type. The periphery of the wheel 279 is provided with cogs 281 which mesh with the toothed segmental rack 282, and the entire periphery of said wheels is preferably provided with said cogs, those not meshing with the rack 282 forming a convenient mounting for said type.

The center of the curvature of the rack 282 is the shaft 208, upon which said rack is loosely pivoted by the radial arm 283. Extending downwardly from the arms 283 and integral therewith are the arms 265 which, as hereinbefore stated, terminate immediately above the upper edge of the bars 263. By reference to Fig. 35 it will be noted that said bars 263 are arranged in an arc which has the shaft 280 as its center of curvature. Thus normally the arms 265 may sweep over the upper edges of the bars 263 until said arms come in contact with the fixed stop 284. As has been heretofore stated each of the bars 263 carries upon its upper edge a stop 264 adapted, when the bar 263 is shifted, to come into the path of movement of the corresponding arm 265 and thus to limit the swing of said arm 265.

Normally the arm 283 and the corresponding arm 278 which carries the type wheel 279 are connected so as to swing together upon their pivotal axis 280. This connection is through a spring 285 which is coiled around the shaft 280 and has one of its ends in engagement with the arm 278 and the other end in engagement with the arm 283. Therefore, when the link 275 is drawn forward by the operating bar 276 both the arm 278 and the arm 283 may be swung together about the shaft 280, the corresponding downwardly extending arm 265, in such case, moving freely above the bars 263. In case, however, one of the bars 263 is actuated, thereby interposing a stop 264 in the path of movement of such arm 265, said arm is stopped and any further movement of the arm 278 is independent of the arm 283 and takes place against the tension of the spring 285. Since the cogs 281 are in mesh with the teeth of the segmental rack 282, the movement of the type wheel 279 over said rack will result in the turning of the type wheel about its pivot 286, and thus the position of said type wheel is adjusted to correspond to the energization of a recording magnet representing a particular digit of a particular denomination. Such upward swing of the type wheel 279 brings it into the position indicated in dotted lines in Fig. 35 so that one of the type carried thereby is brought into operative relation to the platen 287.

A centering bar 288 is provided to project between the notches of the cogs 281 at the end of the upward swing of the type wheel and thus to accurately center the type.

Extending transversely of the machine is a fixed bar 289 supported from the fixed shaft 280 by arms 290. The bar 289 forms a mounting support for a series of spacing members 291 which lie between the type wheels 279 and are bent at their lower ends to provide the fixed stops 284 hereinbefore mentioned.

In Fig. 35 nine recording magnets 71ª are shown, these being the recording magnets for the units denomination of digits. Each of these magnets represents a characteristic digit, one to nine inclusive, there being no recording magnet for zero. Hence when no recording magnet is energized, the arm 265 is permitted to swing until it comes in contact with its stop 284, in which case the corresponding type wheel 279, not having been moved with respect to the rack 282, brings the zero type in position for printing.

The inertia of the wheel 279 is sufficient at the end of the upward swing of said wheel to bring the particular type for which the wheel is set into printing engagement with the platen.

As has been described, the lower edge of each link 275 normally rests upon a lug 274 upon the upper edge of a bar 273. The movement of said bar, when a printing-controlling magnet is energized and attracts its armature, permits said link to drop and thus bring the hook 277 into the path of movement of the operating bar 276. (See Fig. 35). Said bar 276 is carried upon the upper end of two vertical side bars 292 pivoted at their lower ends to the frame of the machine. The bars 292 are connected by links 293 with disks secured to the shaft 26. For convenience the cam disk 199 is used for operatively connecting one of said links 293 to the shaft 296, and at the opposite side of the machine a disk 294 is provided (see Fig. 3) upon the shaft 26 to which the other link 293 is pivoted.

The connection between the upper end of the links 293 and the vertical bars 292 is a slotted one as indicated at 295 in order to provide for a certain amount of lost motion of the shaft 26 in the operation of the bar 276. This lost motion is during the portion of the stroke of the main lever 18 that said lever is over the contact segment 69, thus allowing sufficient time for energization of one of the magnets 269ª, etc., prior to the movement of the operating bar 276. During the remaining portion of the stroke of the main lever 18 the bar 276 draws forward any link 275 engaged thereby and moved the corresponding type wheel 279 from the position shown in full lines to the position indicated in dotted lines in Fig. 35.

In order to provide for duplicate recording of the same items in parallel groups, the bars 263 are, as has been heretofore stated, each provided with a plurality of stops 264, one for each of said duplicate groups. The drawings show printing mechanism for four of such groups, and hence each bar 263 is provided with four of the stops 264 at intervals along its length. Thus the same recording magnet by its energization is adapted to control the movement of an arm 265 of each group, and thus control the operation of a corresponding type wheel of each of said four groups. Likewise each of the bars 273 controlled by the printing-controlling magnets is provided with four lugs 274, each lug normally holding in its elevated position, a link 275 of each of said groups. Thus, when it is so desired, the recording mechanism may be operated to actuate four duplicate type wheels and print the result in four separate columns. Means are provided, however, whereby, if desired, the number of duplications may be controlled at will, as will now be described.

Located underneath the links 275 is a shaft 296 provided upon diametrically opposite sides, in staggered relation, with longitudinal ribs 297, each rib being of a length corresponding to two sets of links 275 of the four groups provided for in the machine. The shaft 296 is provided with a thumb knob 298 by which said shaft may be turned ninety degrees in either direction from the position indicated in the drawings to bring either of said ribs 297 into vertical position beneath the links 275 and thus to prevent the corresponding sets of links from falling into engagement with the bars 276. Thus the shaft 296, may control whether all four of said printing mechanisms are permitted to operate or whether only the two at the right hand or the two at the left hand side of the machine are permitted to operate. The printing mechanism is thus brought under the manual control of the operator of the machine.

Automatically operated means are also provided for automatically and systematically controlling the operation of the printing mechanism, such automatic means being adapted to be brought into operative relation with the printing mechanism or not, as may be desired. Extending transversely of the machine above the links 275 is a shaft 299 provided with four longitudinally extending ribs 300, 301, 302, 303 about its circumference, the ribs being arranged ninety degrees apart. Said ribs do not extend the entire length of the shaft, but are successively cut away for a distance corresponding to one group of printing mechanism.

By reference to Figs. 35 and 36, it will be noted that the rib 300 extends underneath and forms a support for the upper limb 304 of each of the links 275 except those links located over the cut away portion of the ribs 300, that is, except the group at the left of Fig. 26. The limb 304 of the link 275 thus forms a yoke which surrounds the shaft 299 and is adapted to support the links upon one of the ribs of the shaft 299 in all the positions of rotation of said shaft except one. The shaft 299 is rotatable step by step, at each step through an angle of ninety degrees, bringing successively uppermost the ribs 300, 301, 302, 303, and thus successively adapting a different one of the groups of printing mechanism to be operated by the operating bar 276. While thus the shifting of a bar 273 may remove the lugs 274 from supporting a link 275 in each group, only one of said links is free to fall by gravity, the others being normally held up by a rib upon the bar 299.

The step by step rotation of the shaft 299 is brought about by the operation of the main lever 18, each complete operation of said lever stepping the shaft 299 one step, that is one fourth of a revolution. For this purpose, the disk 199 has pivotally secured thereto a driving pitman 305, (see Fig. 38), the upper end of which is pivoted to a ratchet arm 306 loosely pivoted on the shaft 299. The end of the ratchet arm 306 carries a pivoted pawl or dog 307 adapted to engage one of the four wide teeth upon the periphery of a disk 308 secured to the shaft 299. Thus in the forward stroke of the lever 18 the shaft 26 through the disk 199 and the pitman 305 moves the ratchet arm 306 upward to the position shown in dotted lines in Fig. 38, the pawl 307 riding over one tooth of the disk 308 and at the end of the upward stroke falling into engagement with the next tooth of said disk. During the return stroke of the lever 18 the pitman 305 is drawn down carrying with it the ratchet arm 306 and pawl 307, thus stepping the disk 308 and shaft 299 one-fourth of a revolution. A spring pressed roller 309 rides over the periphery of the disk 308 and at the end of the stroke of the pitman 305 rides into one of the notches between the teeth of the disk 308, thus preventing the shaft 299 from being accidentally rotated beyond the position to which it is designed to be set. The roller 309 is shown as carried by a reciprocating bar 310 slidably connected to the pitman 305. The pitman 305 is provided with a pin 311 adapted in the upward stroke of the pitman to engage with a pin 312 on the bar 310 and thus to move said bar to release the roller 309 from engagement with the periphery of the disk 308. At the end of the downward stroke of the pitman 305 the pin 311 thereof engages with a pin 313 upon the bar 310 and moves said bar downward so that the roller 309 is brought into engagement with the periphery of the disk 308. Thus the operation of the main lever 18 may result in the automatic stepping of the shaft 299. However such operation of the shaft 299 may be prevented by throwing the dog 307 out of engagement with the teeth on the periphery of the disk 308. For this purpose there is provided a pivoted lever 314 carrying on its lower end a pin 315 adapted, when said lever is operated, to lift the dog 307 away from the disk 308. The lever 314 may be operated through a link 316 pivoted at one end to lever 314 and at its opposite end at 317 to the link 169 (see Fig. 20) which, as has been heretofore stated, is operated from the multiplying lever 149. Therefore, during the operation of multiplication, at which time the operation of the main lever does not involve the operation of the recording mechanism, such operation of the main lever 18 does not step the shaft 299. The lever 314 is also provided with a manually operated lever 318 (see Fig. 20) by which the lever 314 may be thrown so as to move the dog 307 from engagement with the disk 308 and thus to permit successive operations of the main lever 18 for recording the items by the same set of printing mechanism.

The shaft 299 has bearings at its opposite ends in the rocking arms 319 carried by the shaft 320. (See Figs. 35 and 38.) Said shaft projects through the casing of the machine and is provided with an operating handle 321 adapted to be moved from the position shown in dotted lines in Fig. 35 into engagement with a stop 322 and thus to rock the arm 319 and thereby lower the shaft 299. The shaft 299, when thus lowered, releases the members 304 of all the links 275, and thus permits each of said links, when also released by the corresponding bars 273, to fall by gravity into the path of movement of the operating bar 276. In short by moving the handle 321 all of the printing mechanisms of the various sets may be brought into condition for simultaneous operation. The shaft 299 may also be rotated manually through the knob 373 to render active any one of the four groups of printing mechanisms.

In Fig. 1, by way of example, the digit keys of the two highest orders are shown as provided with letters as well as numbers on their faces, said latter keys being therefore adapted to record either numbers or symbols. For this purpose one of the four sets of printing mechanisms, for example, is provided on two of the corresponding wheels 279 with type lettered in conformity with the three rows of letters of the keyboard, that is with letters instead of figures. When it is desired to operate the keys to record letters or symbols, the set of printing mechanism provided for such purpose is rendered active either automatically or manually in the manner described, the remaining sets of printing mechanisms being rendered inactive. Thereupon the manipulation of the keys of the last two rows at the left side of the keyboard will record letters or symbols, while the manipulation of the remaining keys will record figures in the usual manner. It will be understood that during such printing of letters or symbols the circuits of the computing magnets will be open by the operation of the non-computing key 261 or by the operation of the non-computing lever 374 (see Figs. 1 and 23).

It will be understood that as many of the keys, as may be considered desirable, may be arranged, in the manner just described, to cause the printing of either letters and symbols or figures. The machine is thereby adapted to be employed in making out statements, such as are commonly prepared by business houses for their customers. For example, with such arrangement, the machine can prepare statements somewhat as follows:

```
5 Hat@$3_____ $15.00
6 Cap@75¢_____   4.50
```

The operation of the non-computing key 261 opens the circuit of all the computing magnets and hence prepares the machine for recording without computing. The operation of the non-computing lever 374 on the contrary opens the circuit of the computing magnets of the two highest orders only, in the machine illustrated, but leaves the circuit closed for the computing magnets of the remaining orders. Thus the machine is prepared to record symbols only on the manipulation of the keys of the two left hand rows of keys, and to both compute and record, in the usual manner, upon the manipulation of the remaining keys. The operation of the non-computing lever 374 is adapted to operate the corresponding wipers of the switchboard panel I' to break their connection with the strips of the computing switchboard (see Fig. 23).

It will be understood that the letters or symbols of the two left hand rows of digit keys are recorded only when the corresponding set of printing mechanism is rendered active, and that when any of the remaining sets of printing mechanisms are brought into action the manipulation of said keys will result in the printing of numbers in the usual manner.

After the recording mechanism has accomplished its function, the various elements thereof are automatically reset to normal during the return stroke of the main lever 18. Such restoring mechanism is operated from the shaft 196, which, as has been heretofore described, is rocked by means of the cam guides 199 at the beginning and at the end of the stroke of the lever 18. Mounted upon the shaft 196 are two arms 326 (see Figs. 36 and 38) which support the arc-shaped resetting bar 327. The bar 327 has the same curvature as the row of bars 263 and extends across the ends of said bars. During the first portion of the stroke of the main lever 18 the bar 327 is drawn away from the end of the bars 263 and permits of the actuation of said latter bars by the recording magnet in the manner already described. Said bars, when actuated by said recording magnets, are moved longitudinally in the same direction as the bar 327 has previously been shifted. At the end of the return stroke of the lever 18 the shaft 196 is rocked and carries the resetting bar 327 to its initial position, said resetting bars engaging the ends of those of the operated bars 263 which have been shifted and resetting the same to normal. Said resetting bar 327 is preferably of non-magnetic material in order that it may not form any part of the magnetic circuit of the recording magnet.

Extending upwardly from the resetting bar 327 is a resetting arm 328, the upper end of which extends to the ends of the bars 273 and serves to reset the same in the same manner that the bar 327 resets the bar 263. At its upper end the resetting arm 328 is operatively connected by a hook 329 and pin 330 with a resetting bar 331. (See particularly Fig. 36.) The bar 331 is provided at its opposite ends with inclined guide slots 332 for receiving the stationary pins 333, whereby the rocking of the bar 328 raises or lowers the bar 331. The bar 331 is lifted at the end of the return stroke of the resetting lever 328, and raises any of the links 275 which may have been previously operated and thus permits the resetting arm 328 to shift the bar 273 to bring the supports 274 thereof underneath said links to hold them in their reset position. (See Fig. 35.) The resetting bar 327 has also extending therefrom an arm 334 (see Figs. 36 and 38) which, in the operation of the resetting mechanism, is adapted to shift longitudinally a re-setting bar 335 which extends transversely of the machine near the upper portion thereof. Said bar 335 has distributed throughout its length a series of pins 336 (see Fig. 1) adapted, when said bar is shifted, to engage and reset the armatures of the carrying magnets 97, as heretofore described.

It will be noted that during the first portion of the forward stroke of the main lever 18, the resetting members 327, 328, 331 and 335 are moved so as not to interfere with the subsequent operation of the several mechanisms which they are designed to reset, and that at the end of the return stroke of said main lever said resetting members act to reset the corresponding mechanisms to normal.

*Paper feed mechanism.* (See Figs. 41 and 42.)—The platen 287 is pivoted in bearings in the bracket arms 337 upon the opposite sides of the machine, said arms being carried upon the ends of the guide rod 338 which are shiftable longitudinally and extend through the supports 339. The platen may, if desired, be of a greater length than the width of the machine, as is indicated in Fig. 41. Said platen may, for example, be twice the width of the machine and when adjusted longitudinally so that the stop 340, carried by one of the brackets 337 is in engagement with one side of the machine, one half of the paper carried by said platen is exposed to the printing mechanism, and when shifted to the reverse position the other half of the paper is exposed to said printing mechanism.

Means are preferably provided for automatically rotating the platen step by step for each operation of the main lever 18, thereby automatically feeding the paper. For this purpose the shaft forming the axis of the platen is provided at its opposite ends with a ratchet wheel 341. The teeth of each of the wheels 341 are adapted to be engaged by a corresponding pawl 342. Each pawl 342 is pivoted to the upper end of a lever 343 which is pivotally mounted at its lower end to the frame of the machine. Each of the levers 343 is connected by a link 344 with the rock bar 292 which actuates the operating bar 236. The pawls 342 are normally held by gravity out of position for engagement with the teeth of the ratchet wheel 341. The pawls 342 are connected by a horizontal connecting bar 345 from the middle of which depends the arm 346 carrying at its lower end the armature 347 of the paper feed magnet 348. The circuit of the paper feed magnet 348 extends through a switch pin magnet 348 extends through a switch pin 349 which is adapted to be grounded by a pin 350 carried by the shaft 299 for each revolution of the shaft 299. (See Fig. 36.) The magnet 348 is thus energized once for each rotation of said shaft 299 and in attracting its armature 347 lifts the pawls 342 so that one of said pawls on the reverse stroke of the main lever 18 engages with one of said ratchet wheels 241 and steps said platen one tooth, thereby feeding the paper one space.

*Ribbon shifting mechanism*, (Figs. 41, 42 and 47).—The machine is provided with the usual ribbon 351 extending longitudinally of the platen in the usual manner. Said ribbon is normally held down so as to render visible the items printed on the paper, the means for accomplishing this consisting of arms 352 provided at their upper ends with slots for receiving the ribbon 351. Said arms 352 are normally held in their depressed positions by springs 353. The lower end of each of the arms 352 is pivoted to one end of a bell crank lever 354, the upper ends of which are connected by a cross rod 355. Pivotally mounted on the rod 355 are the armatures 356 and 357 of the magnets 358 and 359, respectively. Said armatures are provided at their ends with hooks, adapted, in the attracted positions of said armatures, to be engaged by a cross bar 360 connecting the levers 343. The cross rod 355 also carries a hook 361 which is maintained in an elevated position in the path of movement of the bar 360. The hooks 356, 357 and 361 are of different lengths (see Fig. 47) and therefore the extent of the rocking of the bell crank lever 354 and the consequent elevation of the arm 352 depends upon which of said hooks is engaged by the bar 360.

The circuit of the ribbon shifting magnet 358 is controlled by the substraction lever 89 (see Fig. 30). The armature 356 of said magnet 358 may, for example, be the one of intermediate length and thus, when in engagement with the bar 360, shift the arm 352 so that the middle portion of the ribbon 351 is in position for printing. The ribbon shifting magnet 359 has its circuit controlled by the total key (see Fig. 30) and its armature hook 357 is the shortest of said hooks. Therefore, when said magnets 359 are energized the greatest upward movement of the bat 352 is effected, and thus the lowermost portion of the ribbon 351 is brought into position for printing. In case neither of said magnets is energized the longest of said hooks, namely the hook 361, is engaged by the bar 360, and hence said bar 352 is raised only a short distance, that is, into position for bringing the upper portion of the ribbon into printing position. It will be understood that one of the hooks 356, 357, 361 is engaged and moved by the bar 360 in the forward stroke of the main lever 18, and hence the ribbon 351, during such forward stroke, is raised into its printing position, being at all other times lowered so as to provide for visible recording.

*In general.*—It will be noted that the digit keys are employed to represent one class of digits to be computed, said keys representing, for example, the multiplicand in the case of multiplication, the divisor in the case of division, and the substrahend in the case of substraction. In addition, subtraction and division, the other class of digits to be computed is represented by the character bars of the registering mechanism; in multiplication, by the factor keys and the corresponding switch panels of the factor switchboard.

The term "result" may conveniently be employed to designate lines leading from a switchboard panel or a switchboard and representing the result of a computation. For example the "result lines" of the computing switchboard are the outgoing lines leading to the windings of the computing magnets 15. In the multiplying switchboard the "result lines" are those, for example, which extend from the several factor switch panels, It is not my intention to limit my invention to the details of construction shown in the accompanying drawings, as it is apparent that such details may be varied without departing from the spirit and scope of the invention.

What I claim is:—

1. In an electrical computing machine, a series of digit lines corresponding to the different digits, digit keys for controlling the closure of said digit lines, a series of result lines representing the results of computations adapted to be performed on said machine, and switching mechanism for extending said digit lines to said result lines.

2. In an electrical computing machine, a series of digit lines corresponding to the different digits, digit keys for controlling the closure of said digit lines, a series of result lines likewise corresponding to the different digits, and means for extending said digit lines to said result lines in accordance with predetermined computations.

3. In an electrical computing machine, a series of digit lines corresponding to the different digits, digit keys for controlling the closure of said digit lines, a series of result lines likewise corresponding to the different digits, a switchboard provided with connecting circuits for extending any one of said digit lines to any one of said result lines, and means for selecting a particular connecting circuit of said switchboard in accordance with a predetermined computation.

4. In an electrical computing machine, a series of digit lines corresponding to the different digits, digit keys for controlling the closure of said digit lines, a series of result lines likewise corresponding to the different digits, a switchboard provided with connecting circuits for extending any one of said digit lines to any one of said result lines, said connecting circuits being arranged to connect said lines in accordance with mathematical tables, and means for automatically controlling the selection of a connecting circuit of said switchboard.

5. In an electrical computing machine, the combination with a series of digit lines corresponding to the different digits, of a series of result lines each representing a different digit of a mathematical computation, means for setting the machine for mathematical computations, and switching means responsive thereto for extending said digit lines to said result lines in accordance with a mathematical computation for which the machine is set.

6. In an electrical computing machine, a series of digit keys corresponding to the different digits; digit lines corresponding to said keys and arranged to have their circuits controlled thereby; a switchboard to which said digit lines extend, said switchboard having connecting circuits arranged in accordance with mathematical tables; a series of outgoing result lines extending from said switchboard; means coöperating with said digit keys to close a circuit over an incoming digit line, a connecting circuit and an outgoing result line; and an electrically actuated registering mechanism responsive to the closure of said circuit.

7. In an electrical computing machine, the combination with a switchboard provided with connecting circuits arranged in accordance with mathematical tables, of a series of incoming lines representing digits to be computed and a series of outgoing lines representing results of computations, said connecting circuits each terminating in an outgoing line, a keyboard for controlling the extension of said incoming lines to said connecting circuits, and electrically actuated registering mechanisms each responsive to the closure of a circuit through a corresponding outgoing line.

8. In an electrical computing machine, the combination with a switchboard provided with connecting circuits arranged in accordance with mathematical tables; of a series of incoming lines representing one class of digits to be computed and a series of outgoing lines representing results of computations. said connecting circuits each terminating in an outgoing line; digit keys corresponding to said incoming lines for controlling the closure thereof to extend to said switchboard a circuit representing a digit which is to be computed; switching mechanism corresponding to the different digits of another class of digits to be computed and arranged to control the extension of a connection from a closed incoming line to an appropriate connecting circuit representing the result of the computation; and electrically actuated registering mechanisms each responsive to the closure of a circuit through a corresponding outgoing line.

9. In an electrical computing machine, a series of digit lines corresponding to the different digits of one class of digits to be computed; digit keys for controlling the closure of said digit lines; switching means corresponding to the different digits of another class of digits to be computed; a series of result lines representing digits resulting from computations; connecting circuits arranged according to mathematical tables for extending the circuits from said digit lines to said result lines, said connecting circuits being under the joint control of said digit keys and said switching means; and electrically actuated registering mechanisms each responsive to the closure of a circuit through a corresponding result line.

10. In an electrical computing machine, a series of digit lines corresponding to the different digits of one class of digits to be computed; digit keys for controlling the closure of said digit lines; a switchboard provided with connecting circuits arranged in accordance with mathematical tables; a series of result lines corresponding to the different digits and representing the results of computations, said connecting circuits each terminating in a result line; means, corresponding to the different digit of another class of digits to be computed with said first mentioned class of digits, for controlling the extension of a closed digit line to one of said connecting circuits; and electrically actuated registering mechanisms each responsive to the closure of a circuit through a corresponding result line.

11. In an electrical computing machine, a series of digit lines corresponding to the different digits; digit keys for controlling the closure of said digit lines; a switchboard to which said digit lines extend, said switchboard being provided with connecting circuits arranged according to mathematical tables; a series of result lines extending from said switchboard, said result lines corresponding to the different digits; a computing electromagnet in the circuit of each result line; registering mechanism controlled by said computing magnets; and switching means controlled by said registering mechanism for extending the connection from a closed digit line through a connecting circuit to a result line.

12. In an electrical computing machine, a switchboard provided with a series of terminals representing digits to be computed, a series of terminals corresponding to the different digits and representing results of computations, and connecting circuits arranged in accordance with mathematical tables to interconnect said first mentioned and said last mentioned series of terminals.

13. In an electrical computing machine, a switchboard having a series of incoming terminals arranged in levels corresponding to the different digits, a series of connecting circuits, each having one end likewise arranged in levels and its other end arranged to represent the result of a computation, and switching means for connecting said series of terminals with said connecting circuits.

14. In an electrical computing machine, a computing switchboard having a plurality of incoming terminals arranged in a series of levels, said levels corresponding to the different digits, and also arranged in a series of transverse rows, said rows likewise corresponding to the different digits, each incoming terminal thus representing two digits; a series of outgoing terminals corresponding to the different digits; and connecting circuits connecting each of said incoming terminals with that one of the outgoing terminals that represents the result of a computation of the two digits represented by the said incoming terminal.

15. In an electrical computing machine, a switch panel comprising insulated metallic plates corresponding to the different digits; incoming terminal-pins corresponding to the different digits, said pins being electrically connected, respectively, to said plates according to mathematical tables; and outgoing terminals connected, respectively, to said plates.

16. In an electrical computing machine, a computing switchboard comprising insulated metallic plates corresponding to the different digits; a series of terminal-pins extending from one face of said switchboard, each pin being electrically connected to one only of said plates; said pins being arranged in levels and in transverse rows corresponding, respectively, to the different digits, each pin thus representing two digits, and said pins being electrically connected, respectively, to the plates corresponding to the result of a computation of the digits represented by said pins; and an outgoing terminal from each of said plates.

17. In an electrical computing machine, a series of digit keys corresponding to the different digits; digit lines corresponding to said keys and arranged to have their circuits controlled thereby; a switchboard to which said digit lines extend, said switchboard comprising a series of incoming terminals arranged in levels corresponding to the different digit lines, each digit line being arranged to be connected to any one of the terminals of the corresponding level of terminals, a series of connecting circuits, each having one end electrically connected to one of said terminals and its other end extending to an outgoing terminal representing the result of a computation, and switches for connecting said series of incoming terminals with said digit lines; result lines extending from said outgoing terminals; and electrically actuated registering mechanisms responsive to the closure of the circuits of said result lines.

18. In an electrical computing machine, a series of digit keys corresponding to the different digits; digit lines corresponding to said keys and arranged to have their circuits controlled thereby; a switchboard to which said digit lines extend, said switchboard having a plurality of incoming terminals arranged in a series of levels corresponding to said digit lines and also arranged in a series of transverse rows, said rows representing the different digits, each incoming terminal thus representing two digits, a series of outgoing terminals representing the different digits, connecting circuits connecting each of said incoming terminals with that one of the outgoing terminals that represents the result of a computation of the two digits represented by the said incoming terminal, and switching mechanism for extending the connection of digit lines to any one of said incoming terminals of a corresponding level; result lines extending from said outgoing terminals; and electrically actuated registering mechanisms responsive to the closure of the circuits of said result lines.

19. In an electrical computing machine, a series of digit lines corresponding to the different digits; digit keys for controlling the closure of said digit lines; a series of result lines representing the results of computations adapted to be performed on said machine; a switchboard for extending said digit lines to said result lines, said switchboard comprising a switch panel composed of insulated metallic plates corresponding to the different digits, incoming terminal pins corresponding to the different digits, said pins being electrically connected, respectively, to said plates according to mathematical tables, and outgoing terminals connected to said plates and to said result lines; and electrically actuated registering mechanism responsive to the closure of the circuits of said result lines.

20. In an electrical computing machine, a series of digit lines corresponding to the different digits; digit keys for controlling the closure of said digit lines; a series of result lines representing the results of computations adapted to be performed on said machine; a switchboard for extending said digit lines to said result lines, said switchboard comprising insulated metallic plates corresponding to the different digits, a series of terminal pins extending from one face of said switchboard, each pin being electrically connected to one only of said plates; said pins being arranged in levels and in transverse rows corresponding, respectively, to the different digits, each pin thus representing two digits and said pins being electrically connected, respectively, to the plates corresponding to the results of computations of the digits represented by said pin, and an outgoing terminal from each of said plates to which said result lines are connected; and electrically actuated registering mechanism responsive to the closure of the circuits of said result lines.

21. In an electrical computing machine, the combination with a switchboard having a series of terminals arranged in levels corresponding to the different digits and a series of connecting circuits arranged in accordance with mathematical tables, said connecting circuits each having one end likewise arranged in levels corresponding to said levels of terminals and its other end arranged to represent the result of a computation; of a series of incoming lines representing one class of digits to be computed, said incoming lines being arranged to be connected to any one of the terminals of the corresponding level of terminals; a series of outgoing lines representing results of computations, said connecting circuits each terminating in an outgoing line; digit keys corresponding to said incoming lines for controlling the closure thereof to extend to said switchboard a circuit representing a digit which is to be computed; switching mechanism corresponding to the different digits of another class of digits to be computed and arranged to control the extension of a connection from a closed incoming line to one of said incoming terminals; and electrically actuated registering mechanisms each responsive to the closure of a circuit through a corresponding outgoing line.

22. In an electrical computing machine, a series of digit lines corresponding to the different digits of one class of digits to be computed; digit keys for controlling the closure of said digit lines; a computing switchboard comprising a plurality of incoming terminals arranged in a series of levels, said levels corresponding to said digit lines, and also arranged in a series of transverse rows, said rows corresponding to the different digits of another class of digits to be computed with said first mentioned class of digits, each incoming terminal thus representing two digit numbers; a series of outgoing terminals corresponding to the different digits; connecting circuits connecting each of said incoming terminals with that one of the outgoing terminals that represents the result of a computation of the two digits represented by the said incoming terminal; a series of result lines extending from said outgoing terminals; means, corresponding to said different transverse rows of terminals for controlling the extension of a closed digit line to one of said incoming terminals; and electrically actuated registering mechanisms each responsive to the closure of a circuit through a corresponding result line.

23. In an electrical computing machine, the combination with a computing switchboard comprising insulated metallic plates corresponding to the different digits, a series of terminal pins extending from one face of said switchboard, each pin being electrically connected to one only of said plates, said pins being arranged in levels and in transverse rows corresponding, respectively, to the different digits, each pin thus representing two digits and said pins being electrically connected, respectively, to the plates corresponding to the result of a computation of the digits represented by said pins, and an outgoing terminal for each of said plates; of a series of digit lines, corresponding to the different digits, extending to said switchboard; digit keys for controlling the closure of said digit lines; result lines extending from said outgoing terminals; computing magnets in the circuits of said result lines; and registering switches controlled by said computing magnets, each of said switches being arranged when actuated to close the terminals of the corresponding transverse row of terminals in circuit with the corresponding terminals of the several levels of terminals.

24. In an electrical computing machine, the combination with a plurality of series of digit lines and a plurality of series of result lines, each series of lines corresponding to the different digits of different denominations; of switching mechanism for each denomination for extending said digit lines to the result lines of the same denomination; and carrying means controlled by said switching mechanism of one denomination for closing the circuit of a result line of the next higher denomination.

25. In an electrical computing machine, the combination with a series of switchboards each representing a different denomination of digits, each of said switchboards being provided with connecting circuits arranged according to mathematical tables; of a series of incoming lines and a series of outgoing lines for each switchboard, each of said series of lines corresponding to the different digits, said incoming lines representing digits to be computed and said outgoing lines representing the results of computations, said incoming lines and said outgoing lines being arranged to be interconnected by said connecting circuits; and carrying means controlled by said switchboards for extending a circuit representing a digit of a higher denomination resulting from a computation to the corresponding incoming line of the switchboard representing such digit of higher denomination.

26. In an electrical computing machine, a series of digit lines corresponding to the different digits, digit keys for closing said digit lines, electrically actuated registering mechanism controlled by said digit lines, and carrying means controlled by said registering mechanism for closing a digit line of the next higher denomination of digits.

27. In an electrical computing machine, a series of digit lines corresponding to the different digits, digit keys for closing said digit lines, a series of result lines representing the results of computations adapted to be performed on said machine, switching mechanism for extending said digit lines to said result lines, electrically actuated registering mechanism responsive to the closure of a circuit over a result line, and carrying means controlled by said registering mechanism for closing the No. 1 digit line of the next higher denomination of digits.

28. In an electrical computing machine, a series of digit keys corresponding to the different digits; digit lines corresponding to said keys and arranged to have their circuits controlled thereby; a switchboard to which said digit lines extend, said switchboard having connecting circuits arranged in accordance with mathematical tables; a series of outgoing result lines extending from said switchboard; means coöperating with said digit keys to close a circuit over an incoming digit line, a connecting circuit and an outgoing result line; electrically actuated registering mechanism responsive to the closure of said circuit; and carrying means controlled by said registering mechanism for closing the No. 1 digit line of the next higher denomination of digits.

29. In an electrical computing machine, a series of digit lines corresponding to the different digits of one class of digits to be computed; digit keys for controlling the closure of said digit lines; electrically controlled registering means corresponding to the different digits of another class of digits to be computed; a series of result lines controlling said registering means; connecting circuits, arranged according to mathematical tables, for extending the circuits from said digit lines to said result lines, said connecting circuits being under the joint control of said digit keys and said registering means; and a carrying magnet having a circuit controlled by said registering means for closing the No. 1 digit line of the next higher denomination of digits.

30. In an electrical computing machine adapted to multiply, a series of digit keys corresponding to the different digits and representing one set of factors; digit lines corresponding to said keys and controlled thereby; result lines corresponding to the different digits; switching mechanism and means for operating the same representing another set of factors, said switching mechanism being arranged to switch said digit lines to result lines representing the product of two factors; and electrically actuated adding mechanism having circuits controlled by the circuits of said result lines.

31. In an electrical computing machine adapted to multiply, the combination with a multiplying switchboard provided with connecting circuits arranged according to tables of multiplication; of a series of digit lines corresponding to the different digits; digit keys for controlling the closure of said digit lines; a series of result lines corresponding to the different digits and each representing the product of two factors, said digit lines and said result lines being arranged to be interconnected by said connecting circuits; and adding mechanism controlled by the extension of the circuits from said digit lines to said result lines.

32. In an electrical computing machine adapted to multiply, a series of digit keys corresponding to the different digits and representing one set of factors; digit lines corresponding to said keys and controlled thereby; a multiplying switchboard to which said digit lines extend, said switchboard comprising switch-panels representing the different digits of another set of factors, each switch-panel having circuits therein for continuing an incoming digit line with its value unchanged and also connecting circuits representing the table of multiplication for that particular factor digit for extending an incoming digit line to a result line representing the product of two factors corresponding to the said incoming line and the said switch panel; and electrically actuated adding mechanism controlled by the extension of the circuits from said digit lines through said multiplying switchboard.

33. In an electrical computing machine adapted to multiply, the combination with a plurality of series of digit lines corresponding to the different digits of different denominations of one set of factors; of digit keys corresponding to said digit lines for controlling the closure thereof; a multiplying switchboard to which said digit lines extend, said switchboard comprising switch-panels representing the different digits of another set of factors, each of said panels being provided with sections corresponding to the denominations of said series of digit lines, each section of each switch-panel having circuits therein for continuing an incoming digit line with its value unchanged and also connecting circuits representing the table of multiplication for that particular factor digit for extending an incoming digit line to a result line representing the product of two factors corresponding to the said incoming line and the said switch-panel; and electrically actuated adding mechanism controlled by the extension of the circuits from said digit lines through said multiplying switchboard.

34. In an electrical computing machine, the combination with electrically operated computing mechanism and registering mechanism operated thereby for recording the results of computations, of storage mechanism for storing in the machine in latent condition the records of said registering mechanism, and means, under the control of the operator, for transforming the latent storage records into active records.

35. In an electrical computing machine, a series of digit lines corresponding to the different digits, digit keys for controlling the closure of said digit lines, a series of result lines representing the results of computations adapted to be performed on said machine, switching mechanism for extending said digit lines to said result lines, storage mechanism for storing in the machine in latent condition the results of computations performed on said machine, and means under the control of the operator for operatively closing a circuit from said storage mechanism to the corresponding digit lines.

36. In an electrical computing machine, a plurality of series of digit lines, each series corresponding to a different denomination and the several lines of each series corresponding to the different digits, a denomination switchboard to which said digit lines extend, said switchboard being provided with switching mechanism for switching a digit line of one denomination to a corresponding digit line of another denomination, and electrically actuated computing mechanism controlled from said digit lines.

37. In an electrical computing machine, a series of digit lines corresponding to the different digits, digit keys for controlling the closure of said digit lines, computing electromagnets representing the results of computations adapted to be performed on said machine, recording electromagnets and printing mechanism controlled thereby, and means for closing a circuit in parallel from each of said digit lines through a recording and a computing magnet, and thereby simultaneously to record the items computed and register the result of the computation.

38. In an electrical computing machine, a series of digit lines corresponding to the different digits, digit keys for controlling the closure of said digit lines, recording mechanism, a series of electromagnets controlling said recording mechanism, said electromagnets corresponding to the different digits, a series of computing electromagnets representing the results of computations performed on said machine, circuits for the recording electromagnets, under the control of the operator, and arranged to be closed by said digit keys, and a total key for closing the circuit of a recording magnet corresponding to the results registered by said computing magnets.

39. In an electrical computing machine, a series of digit lines corresponding to the different digits of a given denomination, digit keys for controlling the closure of said digit lines, electrically actuated computing means controlled by said digit lines, a total line representing the result of a computation, switching means actuated by said computing means for connecting said total line to that one of said digit lines corresponding to the digit registered on said total line, a total key for closing the circuit of said total line, recording electromagnets representing the different digits and having circuits connected to the corresponding digit lines, and printing mechanism controlled by said recording magnets.

40. In an electrical computing machine, the combination with a keyboard having a plurality of series of digit keys corresponding to the different digits of different denominations; of corresponding plurality of series of recording electromagnets having circuits controlled by said digit keys; and a plurality of distinct sets of printing mechanism, each set actuated from said recording electromagnets and each set corresponding to the keys of said keyboard.

41. In a computing machine, the combination with a series of digit keys corresponding to the different digits, said keys also corresponding to symbols; of a plurality of printing mechanisms each corresponding to said series of keys and actuated therefrom, some of said printing mechanisms being provided with type to print digits and others with type to print symbols corresponding to said digits.

42. In an electrical computing machine, the combination with a series of digit lines representing the different digits, a series of recording electromagnets corresponding to the digits lines and having circuits controlled thereby, printing mechanism, means for actuating said printing mechanism controlled by said electromagnets, and paper-feeding mechanism actuated by said means for actuating the printing mechanism.

43. In an electrical computing machine, the combination with electrically actuated computing mechanism, of electrically actuated recording mechanism controlled by said computing mechanism, and electrically controlled ribbon-shifting mechanism actuated by said recording mechanism.

In witness whereof, I, hereunto subscribe my name this 25th day of August, A. D., 1911.

JOHN BRICKEN.

Witnesses:
  Geo. C. Davison,
  George E. Folk.